US008289534B2

(12) United States Patent
Takahashi et al.

(10) Patent No.: US 8,289,534 B2
(45) Date of Patent: Oct. 16, 2012

(54) PRINT APPARATUS, SYSTEM, AND PRINT JOB PROCESSING METHOD

(75) Inventors: Hiroyuki Takahashi, Yokohama (JP); Kazuhiko Ushiyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 1268 days.

(21) Appl. No.: 11/623,951

(22) Filed: Jan. 17, 2007

(65) Prior Publication Data

US 2007/0171454 A1    Jul. 26, 2007

(30) Foreign Application Priority Data

Jan. 20, 2006  (JP) .................................. 2006-013090
Dec. 7, 2006   (JP) .................................. 2006-331142

(51) Int. Cl.
*G06K 15/00*  (2006.01)

(52) U.S. Cl. ...................... 358/1.14; 358/1.13; 358/1.15

(58) Field of Classification Search ................. 358/1.15, 358/1.14; 399/75, 76, 82, 407, 408, 410
See application file for complete search history.

(56) References Cited

U.S. PATENT DOCUMENTS

| 5,053,831 | A | * | 10/1991 | Ishiguro et al. ............... 399/370 |
| 5,236,185 | A |   | 8/1993  | Taneda et al. |
| 5,358,238 | A |   | 10/1994 | Mandel et al. |
| 5,435,544 | A |   | 7/1995  | Mandel |
| 5,452,068 | A | * | 9/1995  | Farrell .......................... 399/367 |
| 5,544,583 | A |   | 8/1996  | Banike |
| 6,430,382 | B1 | * | 8/2002  | Okamoto et al. ............... 399/82 |
| 6,989,908 | B1 | * | 1/2006  | Ito ................................ 358/1.15 |
| 7,254,355 | B2 | * | 8/2007  | Sahay ............................. 399/82 |
| 7,522,855 | B2 | * | 4/2009  | Nakamichi et al. ............. 399/82 |
| 2004/0190057 | A1 | * | 9/2004  | Takahashi et al. ........... 358/1.15 |
| 2005/0017426 | A1 |   | 1/2005  | Hirata et al. |
| 2005/0082735 | A1 | * | 4/2005  | Nakamura et al. ................ 271/1 |

(Continued)

FOREIGN PATENT DOCUMENTS

DE    10205724 A1    8/2002

(Continued)

OTHER PUBLICATIONS

Related co-pending U.S. Appl. No. 11/623,964; Masahiko Tominaga; "Print Apparatus, System, Print Job Processing Method, Storage Medium, And Program"; filing date Jan. 17, 2007; Spec. pp. 1-193; Figs. 1-33.

Office action issued in corresponding Korean application No. 10-2007-0006028, dated Feb. 22, 2008. No English translation readily available.

(Continued)

*Primary Examiner* — Marivelisse Santiago Cordero
*Assistant Examiner* — Kent Yip
(74) *Attorney, Agent, or Firm* — Rossi, Kimms & McDowell LLP

(57) ABSTRACT

In a print system constituted so as to enable a supplying of sheets from a printing apparatus to a sheet processing apparatus, wherein the printing apparatus having a print unit that executes a print process of data of a job stored in a storage unit can store data of a plurality of jobs, wherein the sheet processing apparatus having a sheet processing unit that executes a sheet processing operation to sheets of job printed by the printing apparatus, a controller unit allows the print unit to execute a print process of a second job required before a sheet process of the second job in case that a plurality of jobs including the second job after a first job are accepted and in case that a sheet process of the first job required after a print process of the first job is in execution by the sheet processing unit.

26 Claims, 43 Drawing Sheets

U.S. PATENT DOCUMENTS

| | | |
|---|---|---|
| 2005/0084277 A1* | 4/2005 | Kushida et al. .................. 399/81 |
| 2005/0084308 A1* | 4/2005 | Nakamura et al. ............ 399/407 |
| 2005/0105129 A1 | 5/2005 | Takahashi |
| 2005/0141022 A1 | 6/2005 | Aiyama |
| 2007/0036574 A1 | 2/2007 | Nakamichi et al. |

FOREIGN PATENT DOCUMENTS

| | | |
|---|---|---|
| EP | 1 531 610 A2 | 5/2005 |
| JP | 11286159 A | 10/1999 |
| JP | 2005055868 A | 3/2005 |
| JP | 2005131984 A | 5/2005 |
| JP | 2005-165722 A | 6/2005 |
| JP | 2006001044 A | 1/2006 |
| KR | 1994-0008788 B1 | 9/1994 |
| KR | 10-2005-0075229 A | 7/2005 |

OTHER PUBLICATIONS

Extended European Search Report issued in corresponding European Patent Application No. 07100848.6 dated Mar. 24, 2011.

Office Action issued Sep. 16, 2011 for corresponding Japanese Patent Application No. 2006-331142.

Extended European Search Report for corresponding EP 07100819.7, dated Nov. 7, 2011. Cited in co-pending application US 2007-0171455.

Office Action issued Jan. 10, 2012 for corresponding JP2006-331142.

Korean Office Action issued in counterpart application No. KR10-2008-0058314, dated Mar. 27, 2012.

Korean Office Action issued in counterpart application No. KR10-2008-0058314, dated Mar. 27, 2012. Previously cited in a IDS filed May 11, 2012. English Translation provided.

* cited by examiner

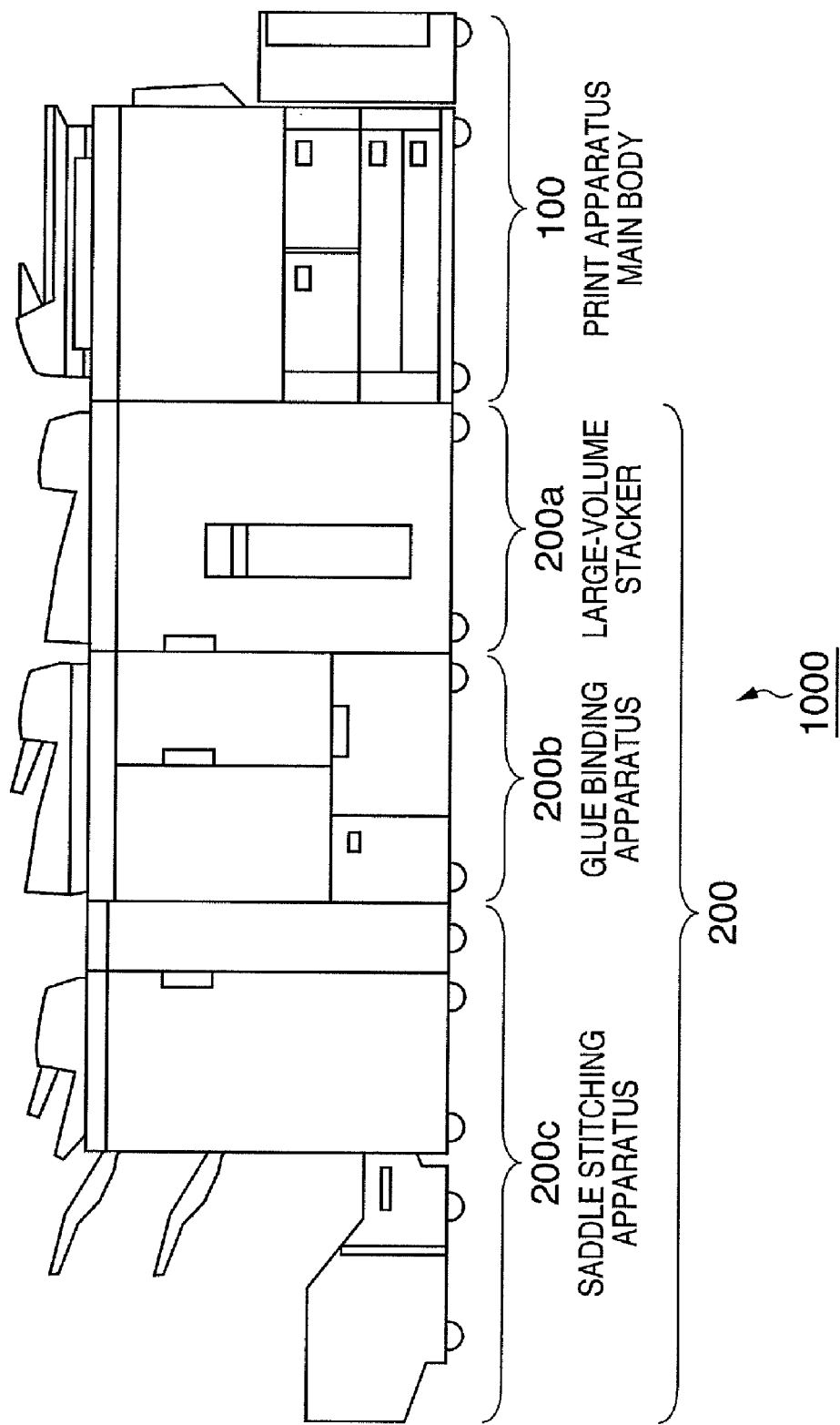

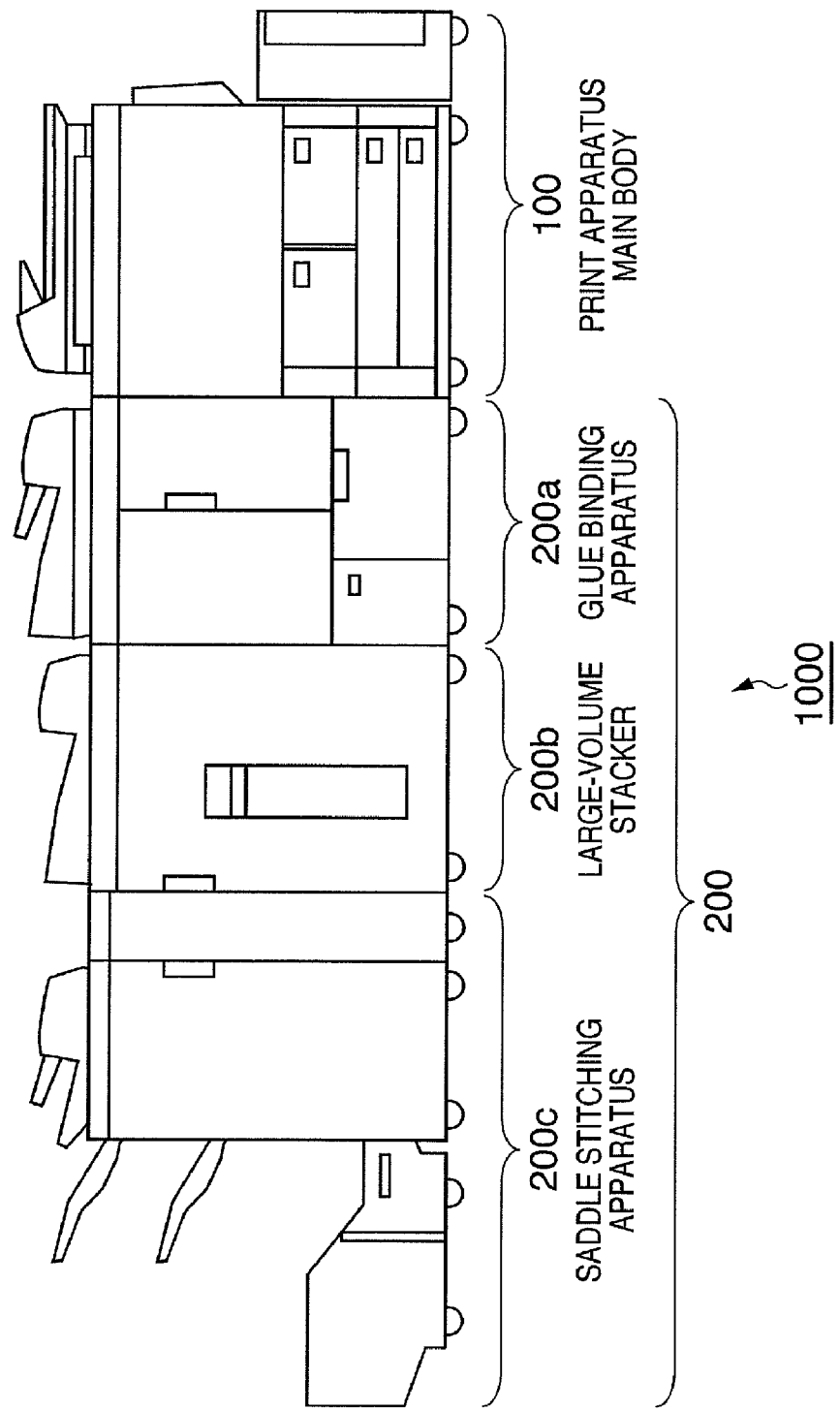

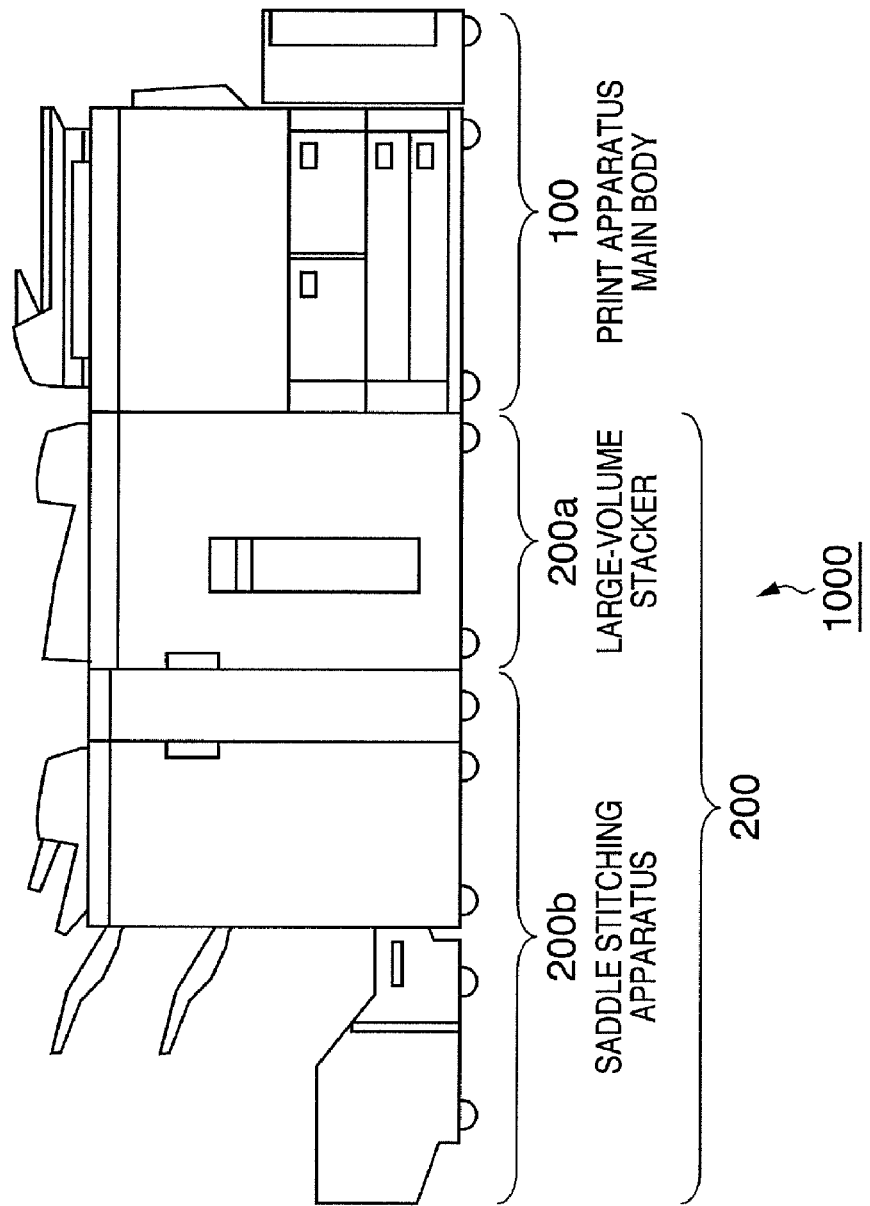

FIG. 15
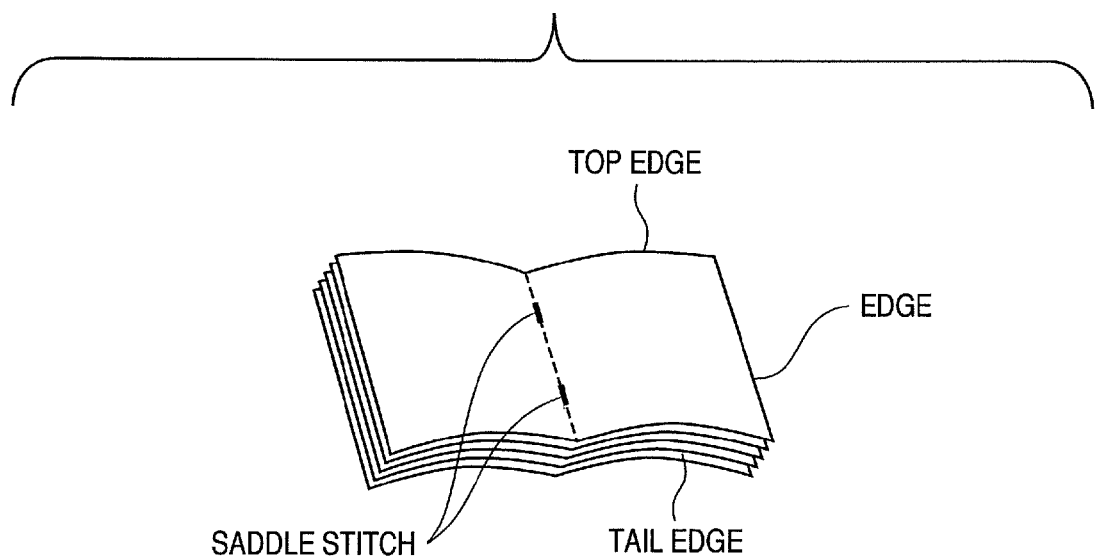
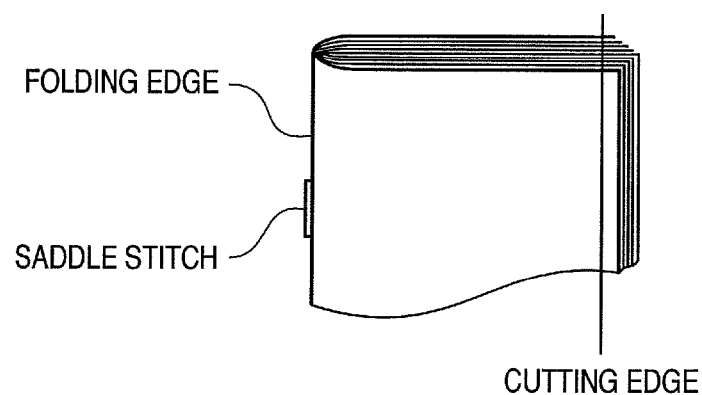

FIG. 17A

PAGE SETUP | FINISHING | PAPER SOURCE | QUALITY

1701

PROFILE (F): [DEFAULT SETTINGS ▽]

PAGE SIZE (S): [A4 ▽]

OUTPUT SIZE (Z): [MATCH PAGE SIZE ▽]

COPIES (C): [1 ◁▷] COPIES (1~2000)

ORIENTATION (T): ⊙ PORTRAIT  ○ LANDSCAPE

PAGE LAYOUT (L): [1 PAGE PER SHEET (STANDARD) ▽]

☐ MANUAL SCALING (M): [100 ◁▷] % (25~200)

☐ WATERMARK (W): [CONFIDENTIAL ▽]

[EDIT WATERMARK (I)...]

A4 (SCALING: AUTO)

[VIEW SETTINGS (V)]

[USER-DEFINED PAPER (U)...] [PAGE OPTIONS (N)...] [RESTORE DEFAULTS (R)]

[🖶 PRINT]

[OK] [CANCEL] [HELP]

FIG. 18B

✳ SYSTEM MANAGEMENT SETTING

[REGISTRATION SETTING OF INLINE SHEET PROCESSING APPARATUS]

PLEASE REGISTER TYPES OF SHEET PROCESSING APPARATUSES TO BE CONNECTED TO PRINT APPARATUS AND THEIR CONNECTION ORDER. YOU CAN CONNECT MAXIMUM OF FIVE SHEET PROCESSING APPARATUSES.
PLEASE CONNECT SADDLE STITCHING APPARATUS LAST.

| 1 | LARGE-VOLUME STACKER | ▲ | ADVANCED SETTINGS |
| 2 | GLUE BINDING APPARATUS | ▲ | ADVANCED SETTINGS |
| 3 | SADDLE STITCHING APPARATUS | ▲ | ADVANCED SETTINGS |
| 4 | | ▲ | ADVANCED SETTINGS |

REGISTER   CLOSE ↲

FIG. 18D

 SYSTEM MANAGEMENT SETTING

[REGISTRATION SETTING OF INLINE SHEET PROCESSING APPARATUS]

PLEASE REGISTER TYPES OF SHEET PROCESSING APPARATUSES TO BE CONNECTED TO PRINT APPARATUS AND THEIR CONNECTION ORDER. YOU CAN CONNECT MAXIMUM OF FIVE SHEET PROCESSING APPARATUSES.
PLEASE CONNECT SADDLE STITCHING APPARATUS LAST.

| 1 | LARGE-VOLUME STACKER | ▲ | ADVANCED SETTINGS |
| 2 | SADDLE STITCHING APPARATUS | ▲ | ADVANCED SETTINGS |
| 3 | | ▲ | ADVANCED SETTINGS |
| 4 | | ▲ | ADVANCED SETTINGS |

REGISTER            CLOSE ↵

JOB STATUS

| ✓ | TYPE | JOB NAME | PAPER | PAGE | STATUS |
|---|---|---|---|---|---|
| 1 | 📄 | JOB A  CASE BINDING | A4 | 200 | DURING CASING |
| 2 | 📄 | JOB B  CASE BINDING | A4 | 200 | WAITING FOR PRINTING |
| 3 | 📄 | JOB C  STACKER | A3 | 800 | WAITING FOR PRINTING |
| 4 | 📄 | JOB D  SADDLE STITCHING | A4 | 060 | WAITING FOR PRINTING |

◀ ▶ ↵

CLOSE

SYSTEM STATUS/STOP

JOB STATUS

| | TYPE | JOB NAME | PAPER | PAGE | STATUS |
|---|---|---|---|---|---|
| 1 | 📄 | JOB A  CASE BINDING | A4 | 200 | DURING CASING |
| 2 | 📄 | JOB C  STACKER | A3 | 800 | DURING PRINTING |
| 3 | 📄 | JOB D  SADDLE STITCHING | A4 | 060 | WAITING FOR PRINTING |
| 4 | 📄 | JOB B  CASE BINDING | A4 | 200 | WAITING FOR PRINTING |

CLOSE

SYSTEM STATUS/STOP

2101 — SYSTEM CONFIGURATION INFORMATION OF PRINT SYSTEM 1000

| | |
|---|---|
| (INFORMATION 1) | PRESENCE/ABSENCE OF INLINE SHEET PROCESSING APPARATUS IN SYSTEM 1000: [CONNECTED] |
| (INFORMATION 2) | NUMBER OF CONNECTED INLINE SHEET PROCESSING APPARATUSES IN SYSTEM 1000: [THREE] |
| (INFORMATION 3) | TYPES OF CONNECTED INLINE SHEET PROCESSING APPARATUSES IN SYSTEM 1000: [LARGE-VOLUME STACKER, GLUE BINDING APPARATUS, AND SADDLE STITCHING APPARATUS] |
| (INFORMATION 4) | TYPES OF EXECUTABLE SHEET PROCESSES IN SYSTEM 1000: [NINE TYPES (STAPLING, PUNCHING, CUTTING, SHIFT DELIVERY, SADDLE STITCHING, FOLDING, CASE BINDING, PAD BINDING, AND LARGE-VOLUME STACKING)] |
| (INFORMATION 5) | CONNECTION ORDER OF INLINE SHEET PROCESSING APPARATUSES IN SYSTEM 1000: [PRINT APPARATUS→LARGE-VOLUME STACKER→GLUE BINDING APPARATUS→SADDLE STITCHING APPARATUS] |

2102

| | SHEET PROCESS TYPE NECESSARY FOR PRECEDING JOB | SHEET PROCESS TYPE NECESSARY FOR SUCCEEDING JOB | DECISION |
|---|---|---|---|
| RULE 1 | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | INHIBIT EXECUTION OF PRINT OPERATION OF SUCCEEDING JOB IN PARALLEL WITH SHEET PROCESSING OPERATION OF PRECEDING JOB (INHIBIT START OF PRINT PROCESS OF SUCCEEDING JOB DURING EXECUTION OF SHEET PROCESSING OPERATION OF PRECEDING JOB) |

FIG. 21B

| | | | |
|---|---|---|---|
| RULE 2 | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | SHEET PROCESS BY GLUE BINDING APPARATUS ((1)CASE BINDING PROCESS OR (2)PAD BINDING PROCESS) | PERMIT EXECUTION OF PRINT OPERATION OF SUCCEEDING JOB IN PARALLEL WITH SHEET PROCESSING OPERATION OF PRECEDING JOB (PERMIT START OF PRINT PROCESS OF SUCCEEDING JOB DURING EXECUTION OF SHEET PROCESSING OPERATION OF PRECEDING JOB) |
| RULE 3 | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | SHEET PROCESS BY LARGE-VOLUME STACKER ((1)STACKING PROCESS) | PERMIT EXECUTION OF PRINT OPERATION OF SUCCEEDING JOB IN PARALLEL WITH SHEET PROCESSING OPERATION OF PRECEDING JOB (PERMIT START OF PRINT PROCESS OF SUCCEEDING JOB DURING EXECUTION OF SHEET PROCESSING OPERATION OF PRECEDING JOB) |
| RULE 4 | SHEET PROCESS BY GLUE BINDING APPARATUS ((1)CASE BINDING PROCESS OR (2)PAD BINDING PROCESS) | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | INHIBIT EXECUTION OF PRINT OPERATION OF SUCCEEDING JOB IN PARALLEL WITH SHEET PROCESSING OPERATION OF PRECEDING JOB (INHIBIT START OF PRINT PROCESS OF SUCCEEDING JOB DURING EXECUTION OF SHEET PROCESSING OPERATION OF PRECEDING JOB) |
| RULE 5 | SHEET PROCESS BY GLUE BINDING APPARATUS ((1)CASE BINDING PROCESS OR (2)PAD BINDING PROCESS) | SHEET PROCESS BY GLUE BINDING APPARATUS ((1)CASE BINDING PROCESS OR (2)PAD BINDING PROCESS) | INHIBIT EXECUTION OF PRINT OPERATION OF SUCCEEDING JOB IN PARALLEL WITH SHEET PROCESSING OPERATION OF PRECEDING JOB |

| | | | |
|---|---|---|---|
| RULE 6 | SHEET PROCESS BY GLUE BINDING APPARATUS ((1)CASE BINDING PROCESS OR (2)PAD BINDING PROCESS) | SHEET PROCESS BY LARGE-VOLUME STACKER ((1)STACKING PROCESS) | PERMIT EXECUTION OF PRINT OPERATION OF SUCCEEDING JOB IN PARALLEL WITH SHEET PROCESSING OPERATION OF PRECEDING JOB (PERMIT START OF PRINT PROCESS OF SUCCEEDING JOB DURING EXECUTION OF SHEET PROCESSING OPERATION OF PRECEDING JOB) |
| RULE 7 | SHEET PROCESS BY LARGE-VOLUME STACKER ((1)STACKING PROCESS) | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | INHIBIT EXECUTION OF PRINT OPERATION OF SUCCEEDING JOB IN PARALLEL WITH SHEET PROCESSING OPERATION OF PRECEDING JOB (INHIBIT START OF PRINT PROCESS OF SUCCEEDING JOB DURING EXECUTION OF SHEET PROCESSING OPERATION OF PRECEDING JOB) |
| RULE 8 | SHEET PROCESS BY LARGE-VOLUME STACKER ((1)STACKING PROCESS) | SHEET PROCESS BY GLUE BINDING APPARATUS ((1)CASE BINDING PROCESS OR (2)PAD BINDING PROCESS) | INHIBIT EXECUTION OF PRINT OPERATION OF SUCCEEDING JOB IN PARALLEL WITH SHEET PROCESSING OPERATION OF PRECEDING JOB (INHIBIT START OF PRINT PROCESS OF SUCCEEDING JOB DURING EXECUTION OF SHEET PROCESSING OPERATION OF PRECEDING JOB) |
| RULE 9 | SHEET PROCESS BY LARGE-VOLUME STACKER ((1)STACKING PROCESS) | SHEET PROCESS BY LARGE-VOLUME STACKER ((1)STACKING PROCESS) | INHIBIT EXECUTION OF PRINT OPERATION OF SUCCEEDING JOB IN PARALLEL WITH SHEET PROCESSING OPERATION OF PRECEDING JOB (INHIBIT START OF PRINT PROCESS OF SUCCEEDING JOB DURING EXECUTION OF SHEET PROCESSING OPERATION OF PRECEDING JOB) |

JOB STATUS

| ✓ | TYPE | JOB NAME | PAPER | PAGE | STATUS |
|---|---|---|---|---|---|
| 1 | ▭ | JOB A  CASE BINDING | A4 | 200 | DURING CASING |
| 2 | ▭ | JOB D  SADDLE STITCHING | A4 | 060 | DURING PRINTING |
| 3 | ▭ | JOB B  CASE BINDING | A4 | 200 | WAITING FOR PRINTING |
| 4 | ▭ | JOB C  STACKER | A3 | 800 | WAITING FOR PRINTING |

◀ ▶ ↵

CLOSE

SYSTEM STATUS/STOP

FIG. 23

| TYPE | JOB NAME | PAPER | PAGE | STATUS |
|---|---|---|---|---|
| 1 | JOB C_STACKER | A3 | 800 | DURING STACKING |
| 2 | JOB D_SADDLE STITCHING | A4 | 060 | DURING PRINTING |
| 3 | JOB B_CASE BINDING | A4 | 200 | WAITING FOR PRINTING |

JOB STATUS

CLOSE

SYSTEM STATUS/STOP

F I G. 26A

2600

SYSTEM CONFIGURATION INFORMATION OF PRINT SYSTEM 1000 (2601)

| | |
|---|---|
| (INFORMATION 1) | PRESENCE/ABSENCE OF INLINE SHEET PROCESSING APPARATUS IN SYSTEM 1000: [CONNECTED] |
| (INFORMATION 2) | NUMBER OF CONNECTED INLINE SHEET PROCESSING APPARATUSES IN SYSTEM 1000: [THREE] |
| (INFORMATION 3) | TYPES OF CONNECTED INLINE SHEET PROCESSING APPARATUSES IN SYSTEM 1000: [LARGE-VOLUME STACKER, GLUE BINDING APPARATUS, AND SADDLE STITCHING APPARATUS] |
| (INFORMATION 4) | TYPES OF EXECUTABLE SHEET PROCESSES IN SYSTEM 1000: [NINE TYPES (STAPLING, PUNCHING, CUTTING, SHIFT DELIVERY, SADDLE STITCHING, FOLDING, CASE BINDING, PAD BINDING, AND LARGE-VOLUME STACKING)] |
| (INFORMATION 5) | CONNECTION ORDER OF INLINE SHEET PROCESSING APPARATUSES IN SYSTEM 1000: [PRINT APPARATUS→GLUE BINDING APPARATUS→LARGE-VOLUME STACKER→SADDLE STITCHING APPARATUS] |

2602

| | SHEET PROCESS TYPE NECESSARY FOR PRECEDING JOB | SHEET PROCESS TYPE NECESSARY FOR SUCCEEDING JOB | DECISION |
|---|---|---|---|
| RULE 1 | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | INHIBIT EXECUTION OF PRINT OPERATION OF SUCCEEDING JOB IN PARALLEL WITH SHEET PROCESSING OPERATION OF PRECEDING JOB (INHIBIT START OF PRINT PROCESS OF SUCCEEDING JOB DURING EXECUTION OF SHEET PROCESSING OPERATION OF PRECEDING JOB) |

FIG. 26B

| | | | |
|---|---|---|---|
| RULE 2 | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | SHEET PROCESS BY GLUE BINDING APPARATUS ((1)CASE BINDING PROCESS OR (2)PAD BINDING PROCESS) | PERMIT EXECUTION OF PRINT OPERATION OF SUCCEEDING JOB IN PARALLEL WITH SHEET PROCESSING OPERATION OF PRECEDING JOB (PERMIT START OF PRINT PROCESS OF SUCCEEDING JOB DURING EXECUTION OF SHEET PROCESSING OPERATION OF PRECEDING JOB) |
| RULE 3 | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | SHEET PROCESS BY LARGE-VOLUME STACKER ((1)STACKING PROCESS) | PERMIT EXECUTION OF PRINT OPERATION OF SUCCEEDING JOB IN PARALLEL WITH SHEET PROCESSING OPERATION OF PRECEDING JOB (PERMIT START OF PRINT PROCESS OF SUCCEEDING JOB DURING EXECUTION OF SHEET PROCESSING OPERATION OF PRECEDING JOB) |
| RULE 4 | SHEET PROCESS BY GLUE BINDING APPARATUS ((1)CASE BINDING PROCESS OR (2)PAD BINDING PROCESS) | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | INHIBIT EXECUTION OF PRINT OPERATION OF SUCCEEDING JOB IN PARALLEL WITH SHEET PROCESSING OPERATION OF PRECEDING JOB (INHIBIT START OF PRINT PROCESS OF SUCCEEDING JOB DURING EXECUTION OF SHEET PROCESSING OPERATION OF PRECEDING JOB) |
| RULE 5 | SHEET PROCESS BY GLUE BINDING APPARATUS ((1)CASE BINDING PROCESS OR (2)PAD BINDING PROCESS) | SHEET PROCESS BY GLUE BINDING APPARATUS ((1)CASE BINDING PROCESS OR (2)PAD BINDING PROCESS) | INHIBIT EXECUTION OF PRINT OPERATION OF SUCCEEDING JOB IN PARALLEL WITH SHEET PROCESSING OPERATION OF PRECEDING JOB |

| | | |
|---|---|---|
| RULE 6 | SHEET PROCESS BY GLUE BINDING APPARATUS ((1)CASE BINDING PROCESS OR (2)PAD BINDING PROCESS) | SHEET PROCESS BY LARGE-VOLUME STACKER ((1)STACKING PROCESS) | INHIBIT EXECUTION OF PRINT OPERATION OF SUCCEEDING JOB IN PARALLEL WITH SHEET PROCESSING OPERATION OF PRECEDING JOB (INHIBIT START OF PRINT PROCESS OF SUCCEEDING JOB DURING EXECUTION OF SHEET PROCESSING OPERATION OF PRECEDING JOB) |
| RULE 7 | SHEET PROCESS BY LARGE-VOLUME STACKER ((1)STACKING PROCESS) | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | INHIBIT EXECUTION OF PRINT OPERATION OF SUCCEEDING JOB IN PARALLEL WITH SHEET PROCESSING OPERATION OF PRECEDING JOB (INHIBIT START OF PRINT PROCESS OF SUCCEEDING JOB DURING EXECUTION OF SHEET PROCESSING OPERATION OF PRECEDING JOB) |
| RULE 8 | SHEET PROCESS BY LARGE-VOLUME STACKER ((1)STACKING PROCESS) | SHEET PROCESS BY GLUE BINDING APPARATUS ((1)CASE BINDING PROCESS OR (2)PAD BINDING PROCESS) | PERMIT EXECUTION OF PRINT OPERATION OF SUCCEEDING JOB IN PARALLEL WITH SHEET PROCESSING OPERATION OF PRECEDING JOB (PERMIT START OF PRINT PROCESS OF SUCCEEDING JOB DURING EXECUTION OF SHEET PROCESSING OPERATION OF PRECEDING JOB) |
| RULE 9 | SHEET PROCESS BY LARGE-VOLUME STACKER ((1)STACKING PROCESS) | SHEET PROCESS BY LARGE-VOLUME STACKER ((1)STACKING PROCESS) | INHIBIT EXECUTION OF PRINT OPERATION OF SUCCEEDING JOB IN PARALLEL WITH SHEET PROCESSING OPERATION OF PRECEDING JOB (INHIBIT START OF PRINT PROCESS OF SUCCEEDING JOB DURING EXECUTION OF SHEET PROCESSING OPERATION OF PRECEDING JOB) |

| SYSTEM CONFIGURATION INFORMATION OF PRINT SYSTEM 1000 | (INFORMATION 1) | PRESENCE/ABSENCE OF INLINE SHEET PROCESSING APPARATUS IN SYSTEM 1000: [CONNECTED] |
| --- | --- | --- |
| | (INFORMATION 2) | NUMBER OF CONNECTED INLINE SHEET PROCESSING APPARATUSES IN SYSTEM 1000: [TWO] |
| | (INFORMATION 3) | TYPES OF CONNECTED INLINE SHEET PROCESSING APPARATUSES IN SYSTEM 1000: [LARGE-VOLUME STACKER AND SADDLE STITCHING APPARATUS] |
| | (INFORMATION 4) | TYPES OF EXECUTABLE SHEET PROCESSES IN SYSTEM 1000: [SEVEN TYPES (STAPLING, PUNCHING, CUTTING, SHIFT DELIVERY, SADDLE STITCHING, FOLDING, AND LARGE-VOLUME STACKING)] |
| | (INFORMATION 5) | CONNECTION ORDER OF INLINE SHEET PROCESSING APPARATUSES IN SYSTEM 1000: [PRINT APPARATUS→LARGE-VOLUME STACKER→SADDLE STITCHING APPARATUS] |

2701

| | SHEET PROCESS TYPE NECESSARY FOR PRECEDING JOB | SHEET PROCESS TYPE NECESSARY FOR SUCCEEDING JOB | DECISION |
| --- | --- | --- | --- |
| RULE 1 | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | INHIBIT EXECUTION OF PRINT OPERATION OF SUCCEEDING JOB IN PARALLEL WITH SHEET PROCESSING OPERATION OF PRECEDING JOB (INHIBIT START OF PRINT PROCESS OF SUCCEEDING JOB DURING EXECUTION OF SHEET PROCESSING OPERATION OF PRECEDING JOB) |

| | | |
|---|---|---|
| RULE 2 | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | SHEET PROCESS BY LARGE-VOLUME STACKER ((1)STACKING PROCESS) | PERMIT EXECUTION OF PRINT OPERATION OF SUCCEEDING JOB IN PARALLEL WITH SHEET PROCESSING OPERATION OF PRECEDING JOB (PERMIT START OF PRINT PROCESS OF SUCCEEDING JOB DURING EXECUTION OF SHEET PROCESSING OPERATION OF PRECEDING JOB) |
| RULE 3 | SHEET PROCESS BY LARGE-VOLUME STACKER ((1)STACKING PROCESS) | SHEET PROCESS BY SADDLE STITCHING APPARATUS ((1)STAPLING PROCESS, (2)PUNCHING PROCESS, (3)CUTTING PROCESS, (4)SHIFT DELIVERY PROCESS, (5)SADDLE STITCHING PROCESS, OR (6)FOLDING PROCESS) | INHIBIT EXECUTION OF PRINT OPERATION OF SUCCEEDING JOB IN PARALLEL WITH SHEET PROCESSING OPERATION OF PRECEDING JOB (INHIBIT START OF PRINT PROCESS OF SUCCEEDING JOB DURING EXECUTION OF SHEET PROCESSING OPERATION OF PRECEDING JOB) |
| RULE 4 | SHEET PROCESS BY LARGE-VOLUME STACKER ((1)STACKING PROCESS) | SHEET PROCESS BY LARGE-VOLUME STACKER ((1)STACKING PROCESS) | INHIBIT EXECUTION OF PRINT OPERATION OF SUCCEEDING JOB IN PARALLEL WITH SHEET PROCESSING OPERATION OF PRECEDING JOB (INHIBIT START OF PRINT PROCESS OF SUCCEEDING JOB DURING EXECUTION OF SHEET PROCESSING OPERATION OF PRECEDING JOB) |

JOB STATUS

| ✓ | TYPE | JOB NAME | PAPER | PAGE | STATUS |
|---|---|---|---|---|---|
| 1 | 📄 | JOB A_CASE BINDING | A4 | 200 | JAM IN GLUE BINDING APPARATUS |
| 2 | 📄 | JOB C_STACKER | A3 | 800 | DURING PRINTING |
| 3 | 📄 | JOB B_CASE BINDING | A4 | 200 | WAITING FOR PRINTING |
| 4 | 📄 | JOB D_SADDLE STITCHING | A4 | 060 | WAITING FOR PRINTING |

◀  ▶  ↵

CLOSE

SYSTEM STATUS/STOP

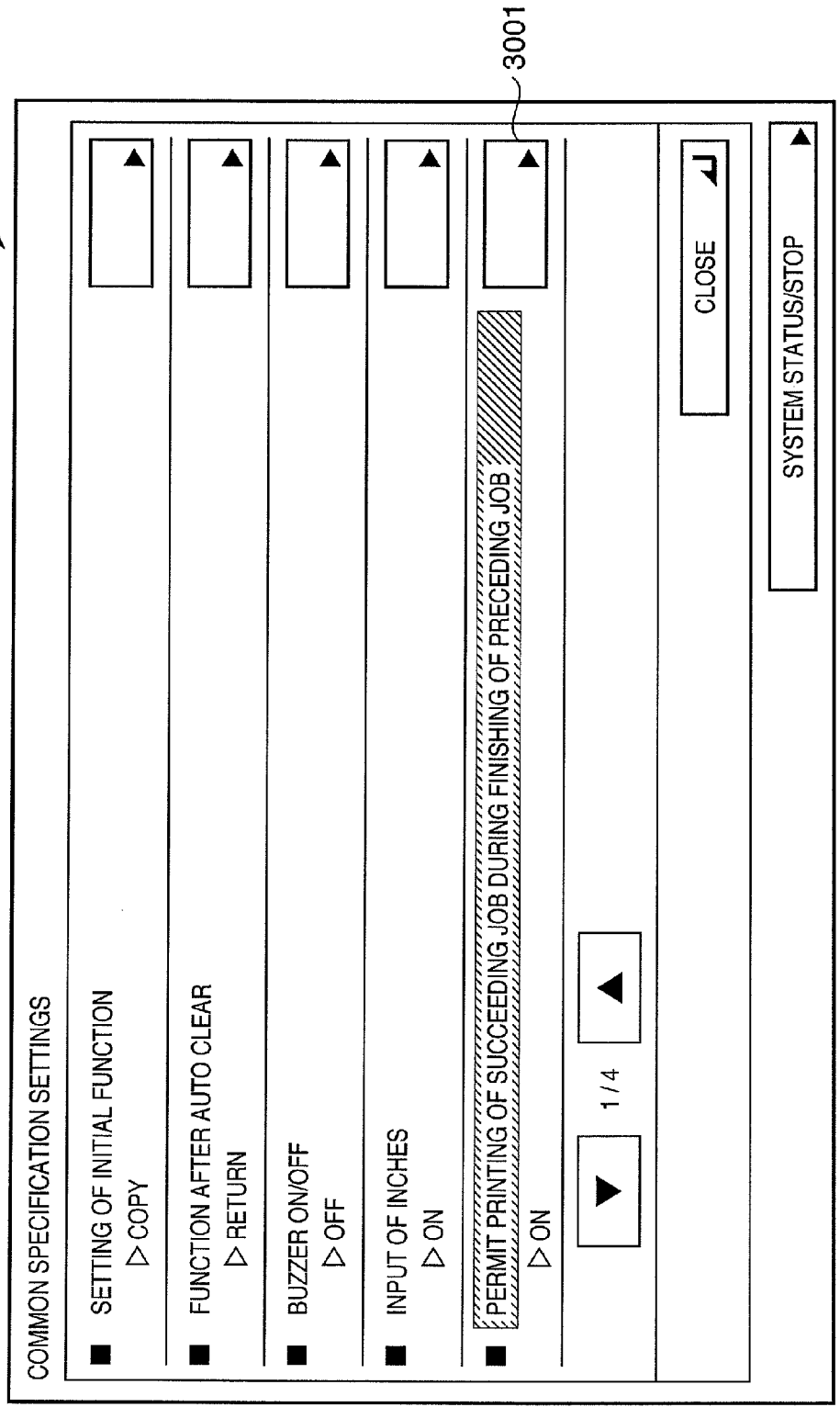

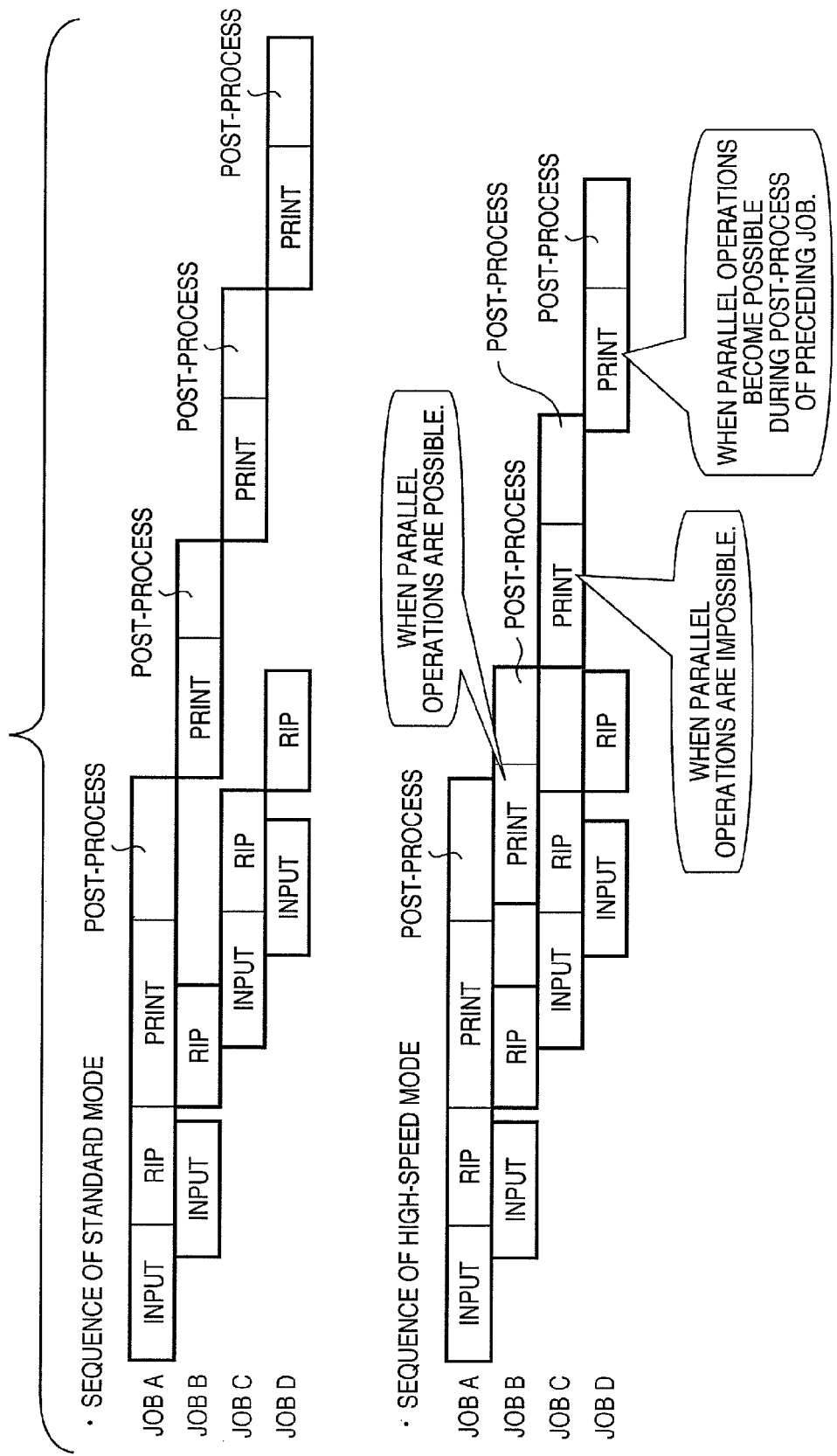

PRINT APPARATUS, SYSTEM, AND PRINT JOB PROCESSING METHOD

BACKGROUND OF THE INVENTION

1. Field of the Invention

The present invention relates to a print system capable of accepting a plurality of jobs, a job processing method and a print apparatus.

2. Description of the Related Art

Conventionally in the commercial printing industry, a publication is issued through various work steps such as entry of a document, designing of the document, layout editing, comprehensive layout (presentation by printing), proofreading (layout correction and color correction), proof (proof print), block copy preparation, printing, post-process, and shipping.

In particular, the commercial printing industry often uses an offset reproduction printing press in the printing step, and the block copy preparation step is inevitable. However, once the block copy is prepared, it is difficult and disadvantageous in cost to correct the block copy. In block copy preparation, therefore, careful proofreading (i.e., careful layout check and color confirmation) is indispensable. Some period of time is generally taken until issuing of a publication is complete.

In the commercial printing industry, most apparatuses used in respective work steps are bulky and expensive. In addition, work in each step requires expert knowledge, and the know-how of experts is indispensable.

With the advent of high-speed and high-quality electrophotographic and inkjet print apparatuses, a so-called print-on-demand (to be referred to as POD hereinafter) market is coming into being, competing against the commercial offset printing industry.

The POD market appears to replace large-scale printing presses and printing methods so as to deal with jobs of relatively small lots within a short period without using any bulky apparatus or system.

In the POD market, digital printing using electronic data can be implemented to provide printing services and the like by making the best of print apparatuses such as digital copying machines and digital multifunction peripherals.

In the POD market, digitization advances more than in the conventional commercial printing industry, management and control using computers becomes widespread, and a printed material can be actually issued within a short period. As another advantage, the POD market does not require any know-how of the operator. Recently, the image quality of printed materials by POD printing is coming close to the level of the commercial printing industry.

In this situation, office-equipment makers are expanding into this new POD market (see Japanese Patent Laid-Open No. 2005-165722).

In order to enter the POD market, office-equipment makers have to consider circumstances which hardly occur in the office environment. In other words, office-equipment makers and the like are making extensive studies toward practical use of digital print systems suited to the POD environment.

For example, it is expected that the functions of an apparatus such as a digital copying machine or digital multifunction peripheral, which is satisfactorily adapted to the office environment, may not always match the POD environment or the like. In the POD environment, an operator must make detailed settings and work in order to create a final product which meets a customer's request. This environment is aware of shortening of the work time and cost reduction. The apparatus is desirably applicable to such an environment.

More specifically, a print apparatus processes many jobs in the POD environment, and it is important how many jobs are processible by the print system within a short time. From another viewpoint, it is expected that a client requests various sheet processes (e.g., stapling, punching, saddle stitching, case binding, and cutting) for a target job. From still another viewpoint, downsizing of the print apparatus and system and reduction of the space may also be important. It is, therefore, desirable to establish a convenient, flexible printing environment capable of coping with use cases and needs assumed in the POD environment. It is important to examine a mechanism capable of minimizing problems such as a decrease in productivity of jobs to be processed by the system, and maximizing their productivity when establishing a convenient, flexible printing environment capable of coping with use cases and needs assumed in the POD environment. In practice, no product is commercially available which can address all the user requirements of an environment (POD environment) different from the office environment.

There is room for further study in commercializing a print apparatus, print system, and the like adaptable not only to the office environment but also to the POD environment.

SUMMARY OF THE INVENTION

The present invention has been made to address the conventional drawbacks, and has as its object to provide a convenient print system suitable not only to the office environment but also to the POD environment, a job processing method, a storage medium, a program, and a print apparatus.

It is another object of the present invention to provide a mechanism of minimizing intervention work by an operator that may occur in the POD environment due to, e.g., the specifications of an image forming apparatus designed in consideration of only the office environment. It is still another object of the present invention to implement efficient work by reducing the workload of the operator.

It is still another object of the present invention to provide a mechanism capable of flexibly coping with various needs from various users as much as possible in consideration of various situations and use environments.

According to a first aspect of the present invention, there is provided a print system constituted so as to enable a supplying of sheets from a printing apparatus to a sheet processing apparatus, wherein the printing apparatus having a print unit that executes a print process of data of a job stored in a storage unit can store data of a plurality of jobs, wherein the sheet processing apparatus having a sheet processing unit that executes a sheet processing operation to sheets of job printed by the printing apparatus, further comprising:

a controller unit that allows the print unit to execute a print process of a second job required before a sheet process of the second job in case that a plurality of jobs including the second job after a first job are accepted and in case that a sheet process of the first job required after a print process of the first job is in execution by the sheet processing unit.

According to a second aspect of the present invention, there is provided a job processing method for a print system constituted so as to enable a supplying of sheets from a printing apparatus to a sheet processing apparatus, wherein the printing apparatus having a print unit that executes a print process of data of a job stored in a storage unit can store data of a plurality of jobs, wherein the sheet processing apparatus having a sheet processing unit that executes a sheet processing operation to sheets of job printed by the printing apparatus, comprising the step of:

allowing the print unit to execute a print process of a second job required before a sheet process of the second job in case that a plurality of jobs including the second job after a first job are accepted and in case that a sheet process of the first job required after a print process of the first job is in execution by the sheet processing unit.

Further features of the present invention will become apparent from the following description of exemplary embodiments with reference to the attached drawings.

BRIEF DESCRIPTION OF THE DRAWINGS

FIG. 8A is a view for explaining a control example of the print system 1000 to be controlled in the embodiment;

FIG. 9A is a view for explaining a control example of the print system 1000 to be controlled in the embodiment;

FIG. 10A is a view for explaining a control example of the print system 1000 to be controlled in the embodiment;

FIG. 15 is a view for explaining a control example when the print system 1000 to be controlled in the embodiment creates a printed material;

FIG. 17A is a view for explaining an example of display control on the UI unit to be controlled in the embodiment;

FIG. 17B is a view for explaining an example of display control on the UI unit to be controlled in the embodiment;

FIG. 18B is a view for explaining an example of display control on the UI unit to be controlled in the embodiment;

FIG. 18D is a view for explaining an example of display control on the UI unit to be controlled in the embodiment;

FIG. 19 is a view for explaining an example of display control on the UI unit to be controlled in the embodiment;

FIG. 20 is a view for explaining an example of display control on the UI unit to be controlled in the embodiment;

FIGS. 21A-21C are tables for explaining a control example for a plurality of jobs to be processed by the print system 1000 to be controlled in the embodiment;

FIG. 22 is a view for explaining an example of display control on the UI unit to be controlled in the embodiment;

FIG. 23 is a view for explaining an example of display control on the UI unit to be controlled in the embodiment;

FIGS. 26A-26C are tables for explaining a control example for a plurality of jobs to be processed by the print system 1000 to be controlled in the embodiment;

FIGS. 27A and 27B are tables for explaining a control example for a plurality of jobs to be processed by the print system 1000 to be controlled in the embodiment;

FIG. 28 is a view for explaining an example of display control on the UI unit to be controlled in the embodiment;

FIG. 30 is a view for explaining an example of display control on the UI unit to be controlled in the embodiment; and FIG. 31 is a chart for explaining a control example for a plurality of jobs to be processed by the print system 1000 to be controlled in the embodiment.

DESCRIPTION OF THE EMBODIMENTS

Figure 1:
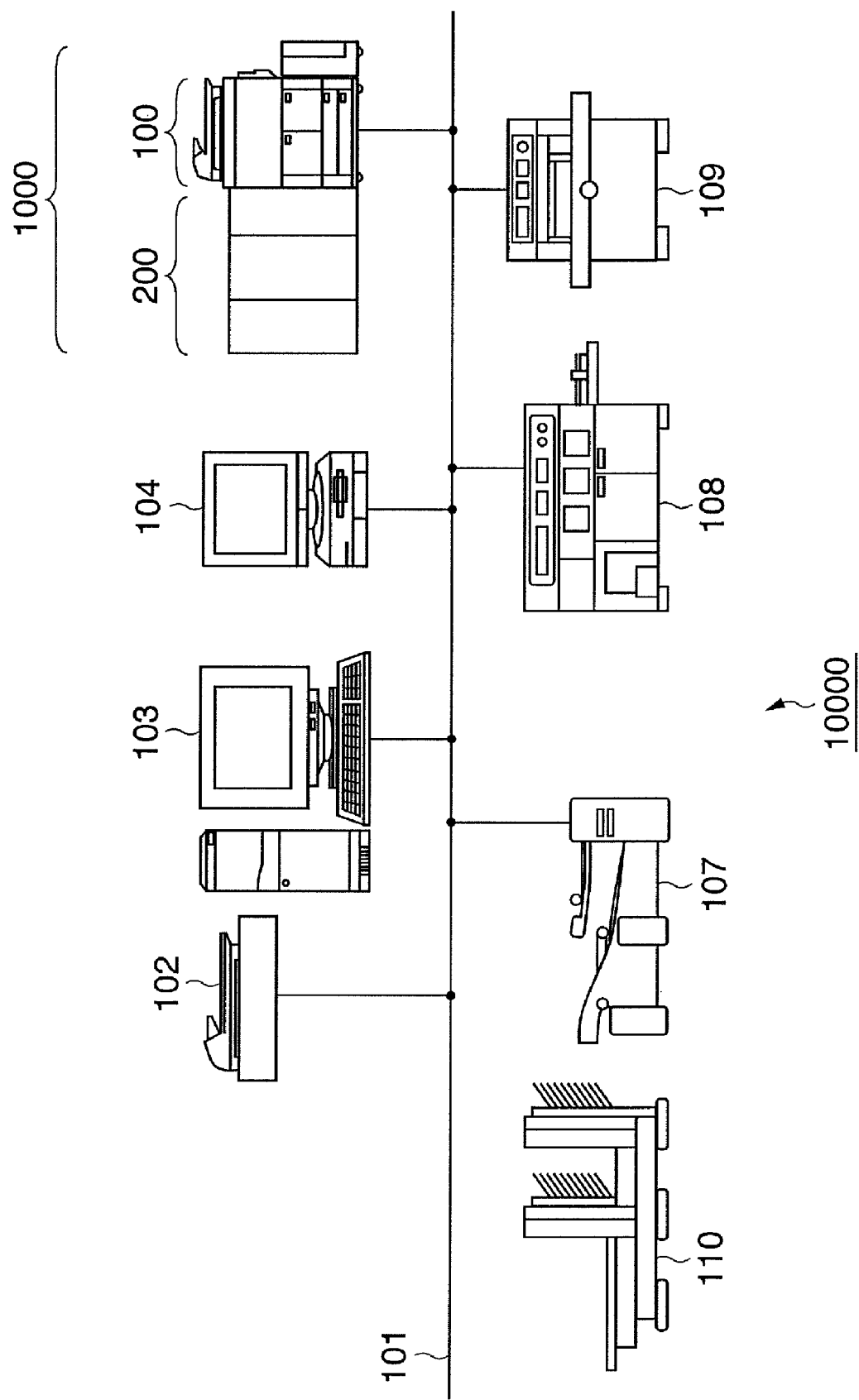
FIG. 1 is a view for explaining an example of the overall configuration of a printing environment 10000 including a print system 1000 to be controlled in an embodiment.

Preferred embodiments of the present invention will be described in detail below with reference to the accompanying drawings.

[Description of System Configuration of Entire Printing Environment 10000 Including Print System 1000]

The embodiment assumes a printing environment (POD environment) different from the office environment in order to solve problems described in Description of the Related Art. The embodiment will explain the system environment of an entire POD environment site (printing environment 10000 in FIG. 1) including a print system 1000. The printing environment itself is a feature of the embodiment.

In the embodiment, the printing environment 10000 where the print system 1000 is applicable is also suited to the POD environment and is called the POD system 10000.

The POD system 10000 in FIG. 1 comprises, as building components, the print system 1000 of the embodiment, and a server computer 103 and client computer 104 (to be referred to as PCs hereinafter). The POD system 10000 also comprises a paper folding apparatus 107, cutting apparatus 109, saddle stitching apparatus 110, case binding apparatus 108, scanner unit 102, and the like. In this manner, a plurality of apparatuses are prepared in the POD system 10000.

The print system 1000 comprises a print apparatus 100 and sheet processing apparatus 200 as building components. As an example of the print apparatus 100, the embodiment will explain a multifunction peripheral having a plurality of functions such as the copy function and PC print function. However, the print apparatus 100 may be a single function type print apparatus having only the PC function or copy function. The multi function peripheral will also be called an MFP hereinafter.

The paper folding apparatus 107, cutting apparatus 109, saddle stitching apparatus 110, and case binding apparatus 108 in FIG. 1 are defined as sheet processing apparatuses, similar to the sheet processing apparatus 200 of the print system 1000. This is because these apparatuses can execute sheet processes for sheets of a job printed by the print apparatus 100 of the print system 1000. For example, the paper folding apparatus 107 can fold sheets of a job printed by the print apparatus 100. The cutting apparatus 109 can cut a bundle of sheets printed by the print apparatus 100. The saddle stitching apparatus 110 can saddle-stitch sheets of a job printed by the print apparatus 100. The case binding apparatus 108 can case-bind sheets of a job printed by the print apparatus 100. To execute various sheet processes by these sheet processing apparatuses, an operator must take out a printed material of a job printed by the print apparatus 100 from the delivery unit of the print apparatus 100, and set the printed material in a target sheet processing apparatus.

The use of a sheet processing apparatus other than the sheet processing apparatus 200 of the print system 1000 requires intervention work by the operator after the print apparatus 100 executes a print process.

In other words, when the sheet processing apparatus 200 of the print system 1000 executes a sheet process required for a job printed by the print apparatus 100, no intervention work by the operator is necessary after the print apparatus 100 executes a print process. This is because the print apparatus 100 can directly supply sheets printed by it to the sheet processing apparatus 200. More specifically, the sheet feeding path in the print apparatus 100 can couple to that in the sheet processing apparatus 200. In this manner, the sheet processing apparatus 200 and print apparatus 100 of the print system 1000 physically cooperate with each other. In addition, the print apparatus 100 and sheet processing apparatus 200 comprise CPUs so as to communicate data. That is, the print apparatus 100 and sheet processing apparatus 200 are electrically coupled to each other.

In the embodiment, the control unit of the print system comprehensively controls the print apparatus 100 and sheet processing apparatus 200. For example, in the embodiment, a controller unit 205 in the print apparatus 100 in FIG. 2 performs comprehensive control. In this embodiment we will call these sheet processing apparatuses post-processing apparatuses or post-presses.

All these apparatuses in the POD system 10000 of FIG. 1 except the saddle stitching apparatus 110 connect to a network 101 so as to communicate data with each other.

For example, the print apparatus 100 prints the print data of a target job whose print execution request is transmitted via the network 101 from an information processing apparatus serving as an example of external apparatuses such as the PCs 103 and 104.

For example, the PC 103 manages all jobs to be processed in the POD environment 10000 by transmitting/receiving data to/from another apparatus by network communication. In other words, the PC 103 functions as a computer which comprehensively manages a series of workflow steps including a plurality of process steps. The PC 103 determines post-process conditions capable of finishing in the POD environment 10000 on the basis of a job instruction accepted from an operator. In addition, the PC 103 designates a post-process (finishing process) step complying with a request from an end user (client who requests printing in this example). At this time, the server 103 uses information exchange tools such as JDF to exchange information with respective post-processing devices using commands and statuses in post-presses.

As a point of the embodiment in the POD environment 10000 having the above building components, the embodiment classifies the above sheet processing apparatuses into three categories and defines them as follows.

[Definition 1] A sheet processing apparatus which satisfies both (condition 1) and (condition 2) listed below is defined as an "inline finisher". The embodiment also refers to an apparatus satisfying this definition as an inline type sheet processing apparatus.

(Condition 1) The paper path (sheet feeding path) physically connects to the print apparatus 100 so as to directly receive sheets conveyed from the print apparatus 100 without any operator intervention.

(Condition 2) A sheet processing apparatus electrically connects to another apparatus so as to communicate data necessary for an operation instruction, status confirmation, or the like with another apparatus. More specifically, a sheet processing apparatus electrically connects to the print apparatus 100 so as to communicate data with it, or electrically connects to an apparatus (e.g., the PC 103 or 104) other than the print apparatus 100 via the network 101 so as to communicate data with the apparatus. A sheet processing apparatus which satisfies either condition meets (condition 2).

More specifically, the sheet processing apparatus 200 of the print system 1000 corresponds to an "inline finisher". This is because the sheet processing apparatus 200 physically and electrically connects to the print apparatus 100, as described above.

[Definition 2] A sheet processing apparatus which does not satisfy condition 1 above but satisfies (condition 2) is defined as a "near-line finisher". In this embodiment we will refer to an apparatus satisfying this definition as a near-line type sheet processing apparatus.

For example, the paper path does not connect to the print apparatus 100, and a sheet processing apparatus requires intervention work by an operator such as carrying of a printed material. However, the sheet processing apparatus can electrically exchange information such as an operation instruction or status confirmation via a communication means such as the network 101. A sheet processing apparatus which meets these conditions will be defined as a "near-line finisher".

More specifically, the paper folding apparatus 107, cutting apparatus 109, saddle stitching apparatus 110, and case binding apparatus 108 in FIG. 1 correspond to "near-line finishers". This is because these sheet processing apparatuses do not physically connect to the print apparatus 100, but electrically connect to another apparatus such as the PC 103 or 104 via the network 101 so as to communicate data.

[Definition 3] A sheet processing apparatus which satisfies neither (condition 1) nor (condition 2) listed above is defined as an "offline finisher". The embodiment also refers to an apparatus satisfying this definition as an offline type sheet processing apparatus.

For example, the paper path does not connect to the print apparatus 100, and a sheet processing apparatus requires intervention work by an operator such as carrying of a printed material. Further, the sheet processing apparatus does not comprise any communication unit necessary for an operation instruction and status confirmation, and cannot communicate data with another apparatus. Thus, the operator carries an output material, sets it, manually inputs an operation, and manually gives a status report from the device. A sheet processing apparatus which meets these conditions will be defined as an "offline finisher".

More specifically, the saddle stitching apparatus 110 in FIG. 1 corresponds to an "offline finisher". This is because this sheet processing apparatus does not physically connect to the print apparatus 100, cannot connect to the network 101, and does not electrically connect to another apparatus to communicate data.

Various sheet processes are executable in the POD environment 10000 having various sheet processing apparatuses classified into these three categories.

For example, printed media of a job printed by the print apparatus 100 can undergo various sheet processes such as a cutting process, saddle stitching process, case binding process, sheet folding process, punching process, sealing process, and collating process. A sheet process is possible in a bookbinding printing style desired by an end user (client).

Near-line finishers and offline finishers managed by the PC 103 include various finishers such as a dedicated stapler, dedicated puncher, inserter, and collator. The server 103 grasps a device status and job status from near-line finishers via the network 101 by sequential polling or the like using a predetermined protocol. In addition, the server 103 manages the execution statuses (progresses) of many jobs processed in the POD environment 10000.

In the embodiment, different sheet processing apparatuses may execute a plurality of print sheet processes, or one sheet processing apparatus may execute a plurality of types of print sheet processes. The system may comprise any sheet processing apparatuses.

Another point of the embodiment will be explained.

The print system 1000 in FIG. 1 comprises the print apparatus 100, and the sheet processing apparatus 200 detachable from the print apparatus 100. The sheet processing apparatus 200 can directly receive, via the sheet feeding path, sheets of a job printed by the print apparatus 100. The sheet processing apparatus 200 executes a sheet process requested by a user together with a print execution request via a user interface unit for sheets of a job printed by a printer unit 203 of the print apparatus 100. This is apparent from the fact that the sheet processing apparatus 200 is an inline type sheet processing apparatus, as described above.

It should be noted that the sheet processing apparatus 200 in the embodiment can also be defined as a group of sheet processing apparatuses 200. This is because in the embodiment, a plurality of sheet processing apparatuses, which are independent housings and independently available, couple to the print apparatus 100 and are available as the sheet processing apparatus 200. For example, the print system 1000 shown in FIG. 1 comprises the print apparatus 100 and three sheet processing apparatuses. In other words, in the print system 1000 in FIG. 1, three sheet processing apparatuses series-connect to the print apparatus 100. In this example, an arrangement in which a plurality of sheet processing apparatuses connect to the print apparatus 100 is called a cascade connection. The embodiment handles, as inline finishers, all sheet processing apparatuses contained in a group of sheet processing apparatuses 200 cascade-connected to the print apparatus 100. The controller 205 in FIG. 2 serving as an example of the control unit of the print system 1000 comprehensively controls the print apparatus 100 and a plurality of inline type sheet processing apparatuses, and executes various control examples to be described below in the embodiment. The embodiment also has this feature. This arrangement will be described later with reference to FIG. 3 and the like.

[Internal Configuration (Mainly Software Configuration) of System 1000]

The internal configuration (mainly software configuration) of the print system 1000 will be explained with reference to the system block diagram of FIG. 2. In this example, the print apparatus 100 incorporates all the units of the print system 1000 shown in FIG. 2 except the sheet processing apparatus 200 (strictly speaking, a group of sheet processing apparatuses configurable by a plurality of inline type sheet processing apparatuses). The sheet processing apparatus 200 is detachable from the print apparatus 100, and is providable as an option of the print apparatus 100. This configuration aims to provide a necessary number of inline finishers in the POD environment. For this purpose, the embodiment adopts the following configuration.

The print apparatus 100 comprises a nonvolatile memory such as a hard disk 209 (to be also referred to as an HDD hereinafter) capable of storing a plurality of job data to be processed in the print apparatus 100. The print apparatus 100 has the copy function of printing, by the printer unit 203 via the HDD, job data accepted from a scanner unit 201 of the print apparatus 100. The print apparatus 100 also has the print function of printing, by the printer unit 203 via the HDD, job data accepted from an external apparatus such as the PC 103 or 104 via an external I/F unit 202 serving as an example of a communication unit. The print apparatus 100 is an MFP type print apparatus (to be also referred to as image forming apparatus) having a plurality of functions.

The print apparatus according to the embodiment can take any configuration of a color or monochrome print apparatus as long as it can execute various control examples described in the embodiment.

The print apparatus 100 according to the embodiment comprises the scanner unit 201 which scans an original document image and processes scanned image data. The print apparatus 100 also comprises the external I/F unit 202 which transmits/receives image data to/from a facsimile device, network connection device, or external dedicated device. The print apparatus 100 comprises the hard disk 209 capable of storing image data of jobs to be printed that are accepted from either the scanner unit 201 or external I/F unit 202. The print apparatus 100 comprises the printer unit 203 which prints target job data stored in the hard disk 209 on a print medium. The print apparatus 100 further comprises an operation unit 204 which has a display unit and serves as an example of the user interface unit of the print system 1000. Other examples of the user interface unit provided by the print system 1000 are the display unit, keyboard, and mouse of an external apparatus such as the PC 103 or 104.

The controller unit (to be also referred to as a control unit or CPU) 205 serving as an example of the control unit of the print system 1000 comprehensively controls the processes, operations, and the like of various units of the print system 1000. A ROM 207 stores various control programs necessary in the embodiment including programs for executing various processes of a flowchart shown in FIG. 29 (to be described later) and the like. The ROM 207 also stores a display control program for displaying various UI windows on the display unit of the operation unit 204 including user interface windows (to be referred to as UI windows hereinafter) shown in the accompanying drawings. The control unit 205 reads out and executes programs from the ROM 207 to cause the print apparatus to execute various operations described in the embodiment. The ROM 207 also stores, e.g., a program for executing an operation to analyze PDL (Page Description Language) code data received from an external apparatus (e.g., the PC 103 or 104) via the external I/F unit 202, and expand the PDL code data into raster image data (bitmap image data). Software processes these programs.

The ROM 207 is a read-only memory, and stores programs (e.g., a boot sequence and font information) and various programs (e.g., the above-mentioned programs) in advance. A RAM 208 is a readable/writable memory, and stores image data, various programs, and setting information sent from the scanner unit 201 or external I/F unit 202 via the controller unit 205.

The HDD (hard disk) 209 is a large-capacity storage device which stores image data compressed by a compression/decompression unit 210. The HDD 209 can hold a plurality of data such as print data of a job to be processed. The control unit 205 controls to print, by the printer unit 203 via the HDD 209, target job data input via various input units such as the scanner unit 201 and external I/F unit 202. The control unit 205 also controls to transmit job data to an external apparatus via the external I/F unit 202. In this fashion, the controller unit 205 controls to execute various output processes for target job data stored in the HDD 209. The compression/decompression unit 210 compresses/decompresses image data and the like stored in the RAM 208 and HDD 209 in accordance with various compression schemes such as JBIG and JPEG.

With the above configuration, the control unit 205 serving as an example of the control unit of the print system controls even the operation of the inline type sheet processing apparatus 200, as shown in FIG. 1. The mechanical structure of the print system 1000 including a description of this operation will be explained with reference to FIG. 3 and the like.

[Apparatus Configuration (Mainly Mechanical Structure) of System 1000]

The configuration (mainly mechanical structure) of the print system 1000 will be explained with reference to the view of FIG. 3 for explaining the apparatus configuration.

As described above, in the print system 1000, a plurality of inline type sheet processing apparatuses cascade-connect to the print apparatus 100. An arbitrary number of inline type sheet processing apparatuses connectable to the print apparatus 100 can be installed in accordance with the use environment in order to enhance the effects of the embodiment under specific limitations.

To make the description clearer, N sheet processing apparatuses 200 are connectable as a group of sheet processing apparatuses. Sheet processing apparatuses are defined as sheet processing apparatuses 200a, 200b, . . . sequentially from the first sheet processing apparatus, and the Nth sheet processing apparatus is a sheet processing apparatus 200n. For descriptive convenience, each sheet processing apparatus 200 has a shape as shown in FIGS. 1 to 3, but has an original appearance to be described later.

A mechanical structure will be explained when the print apparatus 100 executes a print process corresponding to a step preceding to sheet processes executed by the inline type sheet processing apparatuses 200. A paper handling operation in which sheets of a printed job are supplied from the printer unit 203 into the sheet processing apparatus 200 will be explained. The controller unit (to be also referred to as a control unit or CPU hereinafter) 205 in FIG. 2 causes the print apparatus 100 to mainly execute this paper handling operation.

Figure 2:
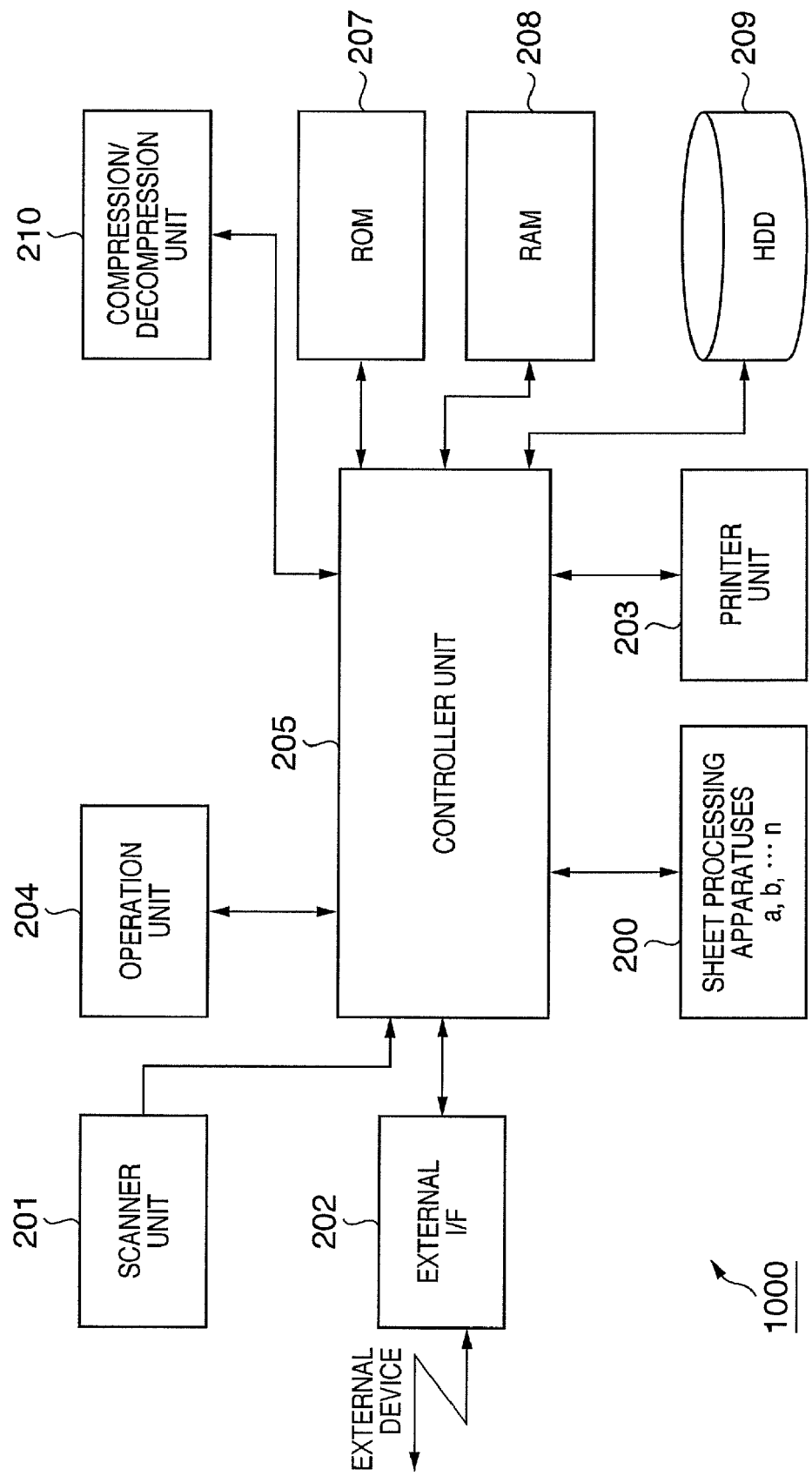
FIG. 2 is a block diagram for explaining an example of the configuration of the print system 1000 to be controlled in the embodiment.
Figure 3:
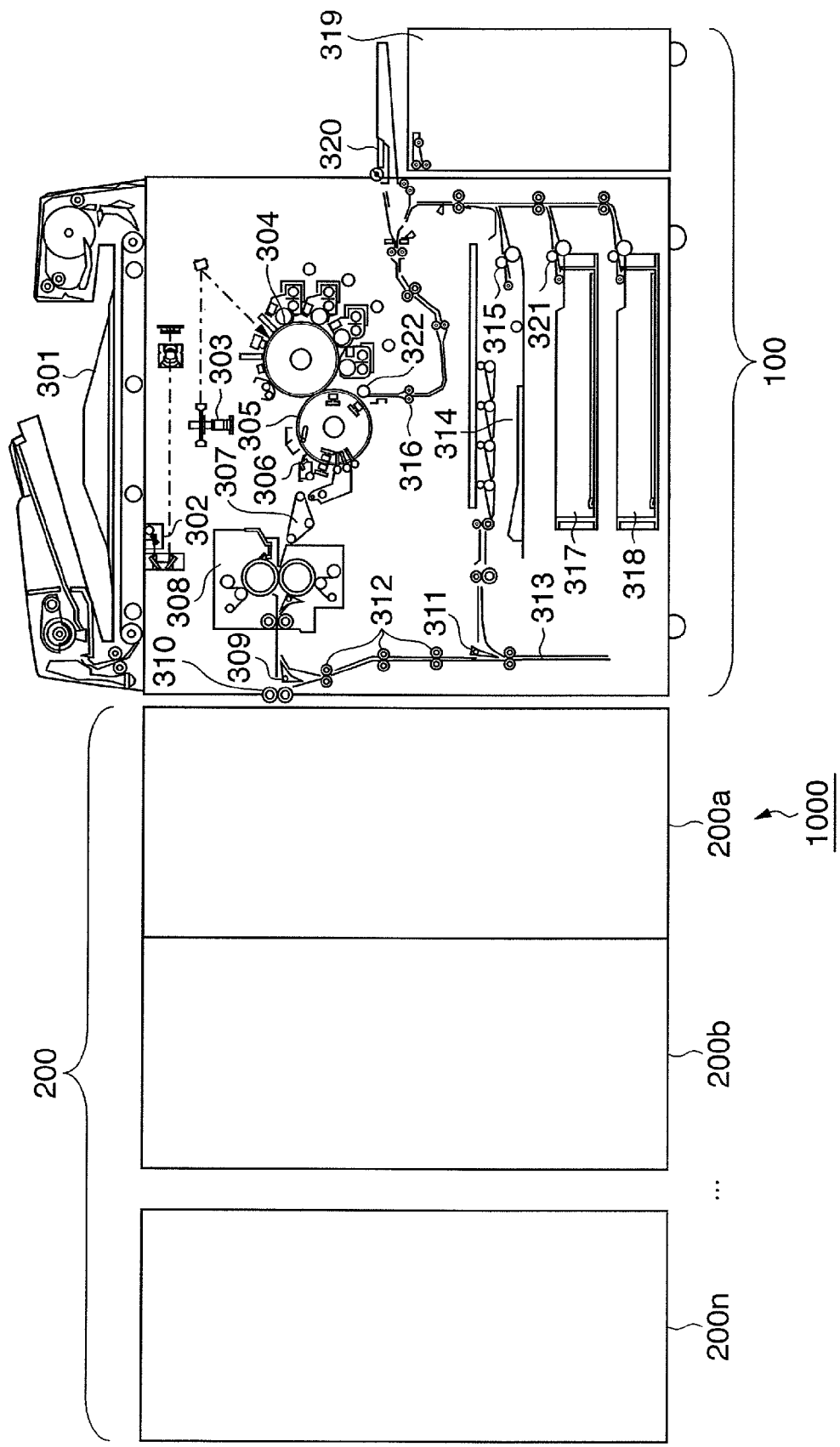
FIG. 3 is a view for explaining an example of the configuration of the print system 1000 to be controlled in the embodiment.

Of reference numerals 301 to 322 shown in FIG. 3, reference numeral 301 corresponds to the mechanical structure of the scanner unit 201 in FIG. 2. Reference numerals 302 to 322 correspond to the mechanical structure of the printer unit 203 in FIG. 2. The embodiment will describe the structure of a 1D type color MFP. A 4D type color MFP and monochrome MFP are also examples of the print apparatus according to the embodiment, but a description thereof will be omitted.

The auto document feeder (ADF) 301 in FIG. 3 separates the first and subsequent original document sheets in the order of pages from an original document bundle set on the support surface of the document tray, and feeds each original document sheet to the document table glass in order to scan the original document sheet by the scanner 302. The scanner 302 scans the image of the original document sheet fed onto the document table glass, and converts the image into image data by a CCD. The rotary polygon mirror 303 receives a light ray (e.g., a laser beam) modulated in accordance with the image data, and irradiates the photosensitive drum 304 with the scan beam reflected via a reflecting mirror. A latent image formed by the laser beam on the photosensitive drum 304 is developed with toner, and the toner image is transferred onto a sheet material adhered onto the transfer drum 305. A series of image forming processes are executed sequentially with yellow (Y), magenta (M), cyan (C), and black (K) toners, forming a full-color image.

After four image forming processes, the sheet material bearing the full-color image is separated by the separation gripper 306 from the transfer drum 305, and conveyed to the fixing unit 308 by the pre-fixing conveyor 307. The fixing unit 308 comprises a combination of rollers and belts, and incorporates a heat source such as a halogen heater. The fixing unit 308 fuses and fixes, by heat and pressure, toner on a sheet material bearing a toner image. The delivery flapper 309 is swingable about the swing shaft, and regulates the sheet material conveyance direction. When the delivery flapper 309 swings clockwise in FIG. 3, a sheet material is conveyed straight, and discharged outside the apparatus by the delivery rollers 310.

To form images on the two surfaces of a sheet material, the delivery flapper 309 swings counterclockwise in FIG. 3, and the course of the sheet material changes downward to supply the sheet material to the double-sided conveyor. The double-sided conveyor comprises the reverse flapper 311, reverse rollers 312, reverse guide 313, and double-sided tray 314. The reverse flapper 311 is swingable about the swing shaft, and regulates the sheet material conveyance direction. To process a double-sided print job, the control unit 205 controls to swing the reverse flapper 311 counterclockwise in FIG. 3 and supply a sheet having the first surface printed by the printer unit 203 to the reverse guide 313 via the reverse rollers 312.

While the reverse rollers 312 clamp the trailing end of the sheet material, the reverse rollers 312 temporarily stop, the reverse flapper 311 swings clockwise in FIG. 3, and the reverse rollers 312 rotate backward. The sheet is switched back to replace its trailing and leading ends, and then the sheet is guided to the double-sided tray 314. The double-sided tray 314 temporarily supports the sheet material, and the refeed roller 315 supplies the sheet material again to the registration rollers 316. At this time, the sheet material is sent with a surface opposite to the first surface in the transfer step facing the photosensitive drum.

The second image is formed on the second surface of the sheet by the same process as that described above. After the images are formed on the two surfaces of the sheet material, the sheet undergoes the fixing step and is discharged from the print apparatus main body to outside the apparatus via the delivery rollers 310. The control unit 205 executes this double-sided print sequence, and causes the print apparatus to execute double-sided printing of target job data on the first and second surfaces of a sheet.

The sheet feed/conveyance section comprises the sheet feed cassettes 317 and 318 (each capable of storing, e.g., 500 sheets) serving as sheet feed units storing sheets necessary for a print process, the paper deck 319 (capable of storing, e.g., 5,000 sheets), and the manual feed tray 320. Units for feeding sheets stored in these sheet feed units are the sheet feed rollers 321, registration rollers 316, and the like. The sheet feed cassettes 317 and 318 and the paper deck 319 can set sheets of various materials at various sheet sizes so as to discriminate these sheets in these sheet feed units. The manual feed tray 320 can also set various print media including a special sheet such as an OHP sheet.

The sheet feed cassettes 317 and 318, the paper deck 319, and the manual feed tray 320 respectively have the sheet feed rollers 321 so as to successively feed sheets one by one. For example, a pickup roller sequentially picks up stacked sheet materials, a separation roller facing the sheet feed roller 321 prevents overlapping feed, and sheet materials are supplied one by one to the conveyance guide. The separation roller receives, via a torque limiter (not shown), a driving force for driving the separation roller in a direction opposite to the conveyance direction. When only one sheet material enters a nip portion formed between the separation roller and the sheet feed roller, the separation roller rotates in the conveyance direction following the sheet material. If overlapping feed occurs, the separation roller rotates in the direction opposite to the conveyance direction to set back the overlapping-fed sheet material and supply only one top sheet material.

The supplied sheet material is guided between the conveyance guides, and conveyed to the registration rollers 316 by a plurality of conveyance rollers. At this time, the registration rollers 316 stop, the leading end of the sheet material abuts against the nip portion formed between the pair of registration rollers 316. Then, the sheet material forms a loop to correct skew. The registration rollers 316 start rotating to convey the sheet material in synchronism with the timing of a toner image formed on the photosensitive drum 304 in the image forming section. The attraction roller 322 electrostatically attracts the sheet material sent by the registration rollers 316 onto the surface of the transfer drum 305. The sheet material discharged from the fixing unit 308 is introduced into the sheet feeding path in the sheet processing apparatus 200 via the delivery rollers 310.

Through the above print process, the control unit 205 processes a job to be printed.

The control unit 205 causes the printer unit 203 by the above-described method to print job print data stored in the HDD 209 from a data generation source on the basis of a print execution request accepted from a user via the UI unit.

For example, the data generation source of a job whose print execution request is accepted from the operation unit 204 means the scanner unit 201. The data generation source of a job whose print execution request is accepted from a host computer means the host computer.

The control unit 205 stores print data of a job to be processed sequentially from the start page in the HDD 209, and reads out the print data sequentially from the start page from the HDD 209 to form the image of the print data on a sheet. The control unit 205 performs this start page process. In addition, the control unit 205 supplies printed sheets sequentially from the start page to the sheet feeding path in the sheet processing apparatus 200 with the image surfaces of the sheets facing down. For this purpose, immediately before the delivery rollers 310 introduce a sheet into the sheet processing apparatus 200, the control unit 205 causes the units 309 and 312 and the like to execute a switchback operation to reverse the sheet traveling from the fixing unit 308. The control unit 205 also executes paper handling control for the start page process.

The arrangement of the inline type sheet processing apparatus 200 of the print system 1000 also having the print apparatus 100 will be explained.

As shown in FIG. 3, the print system 1000 according to the embodiment comprises a total of n inline type sheet processing apparatuses cascade-connectable to the print apparatus 100. The number of installed inline type sheet processing apparatuses is arbitrary as much as possible. However, the print system 1000 must utilize at least a sheet processing apparatus which can supply a sheet printed by the printer unit 203 to an internal sheet processing unit without any intervention work by an operator. In other words, the print system 1000 must utilize a sheet processing apparatus having a sheet feeding path (paper path) capable of conveying, within the apparatus, a printed material discharged from the printer unit 203 via the delivery rollers 310 of the print apparatus 100. The print system 1000 follows this restriction.

However, the print system 1000 is flexibly configurable as long as it follows this restriction, as one mechanism for enhancing the effects of the embodiment.

For example, the number of connected inline type sheet processing apparatuses is arbitrary such as three or five. The embodiment also assumes a POD environment where an administrator determines that no inline type sheet processing apparatus is necessary, in order to increase the use efficiency of an offline type sheet processing apparatus. For example, even when no inline type sheet processing apparatus is used (i.e., the number of inline type sheet processing apparatuses is 0), the print apparatus 100 of the embodiment is available.

When cascade-connecting a plurality of inline type sheet processing apparatuses to the print apparatus 100, a specific user (e.g., administrator) can arbitrarily change and determine their connection order under the restriction.

The above mechanism aims to improve user friendliness, and is not an indispensable constituent feature. In other words, the present invention is not limited to this arrangement. For example, the present invention is applicable to a system configuration which uniformly defines the number of inline type sheet processing apparatuses available in the print system 1000 and their connection order. The present invention incorporates any system configuration and apparatus configuration as long as at least one of various job control examples (to be described later) is executable.

How many and what kinds of inline type sheet processing apparatuses are connectable to the print apparatus 100 in the print system 1000, how to connect them, and what kinds of sheet processes they can execute will be described later.

[Arrangement of Operation Unit 204 as Example of UI Unit of System 1000]

Figure 4:
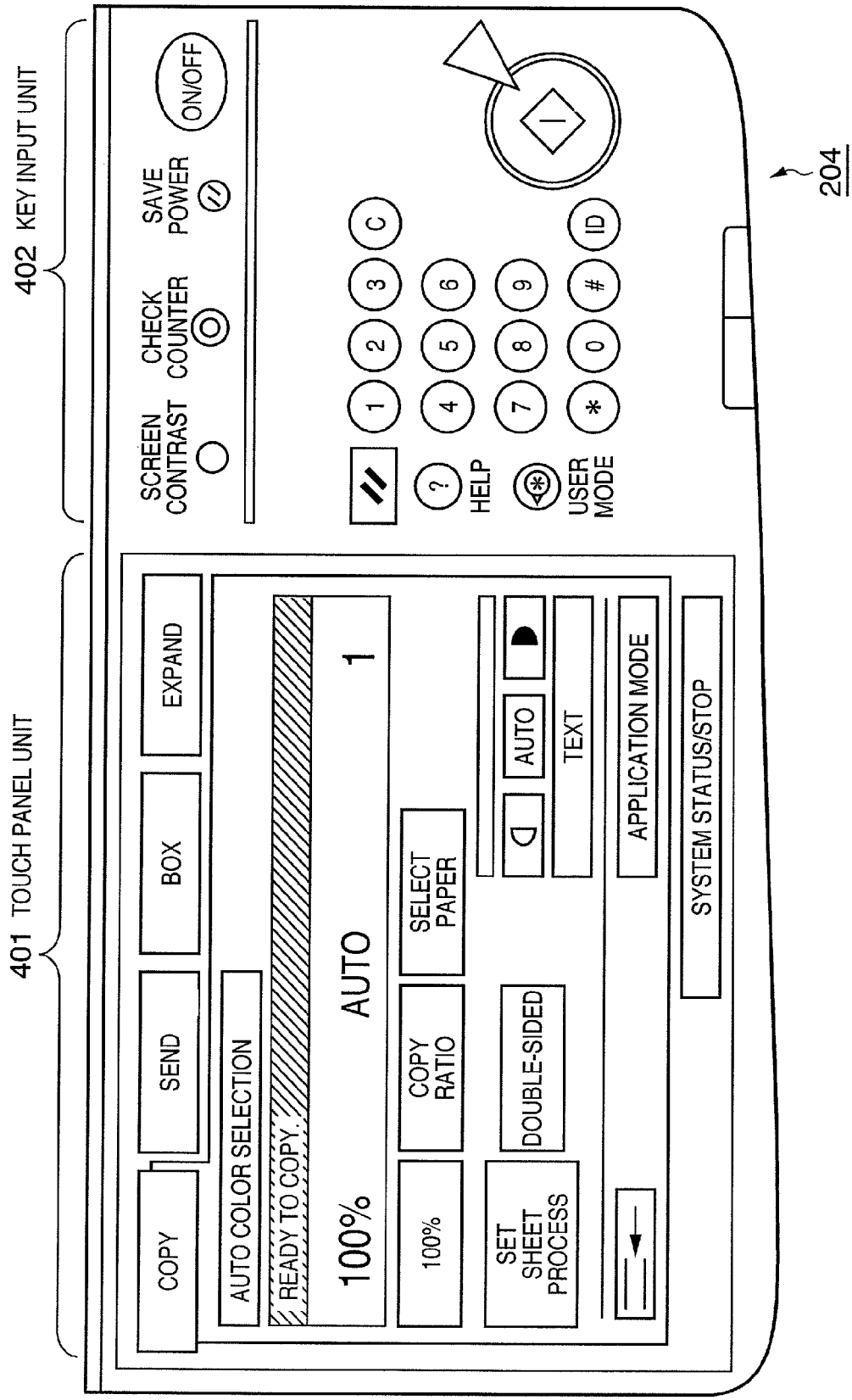
FIG. 4 is a view for explaining an example of a UI unit to be controlled in the embodiment.

The operation unit 204 serving as an example of the user interface unit (to be referred to as a UI unit hereinafter) of the print apparatus 100 in the print system 1000 will be explained with reference to FIG. 4.

The operation unit 204 comprises a key input unit 402 capable of accepting a user operation with hard keys, and a touch panel unit 401 serving as an example of a display unit capable of accepting a user operation with soft keys (display keys).

Figure 5:
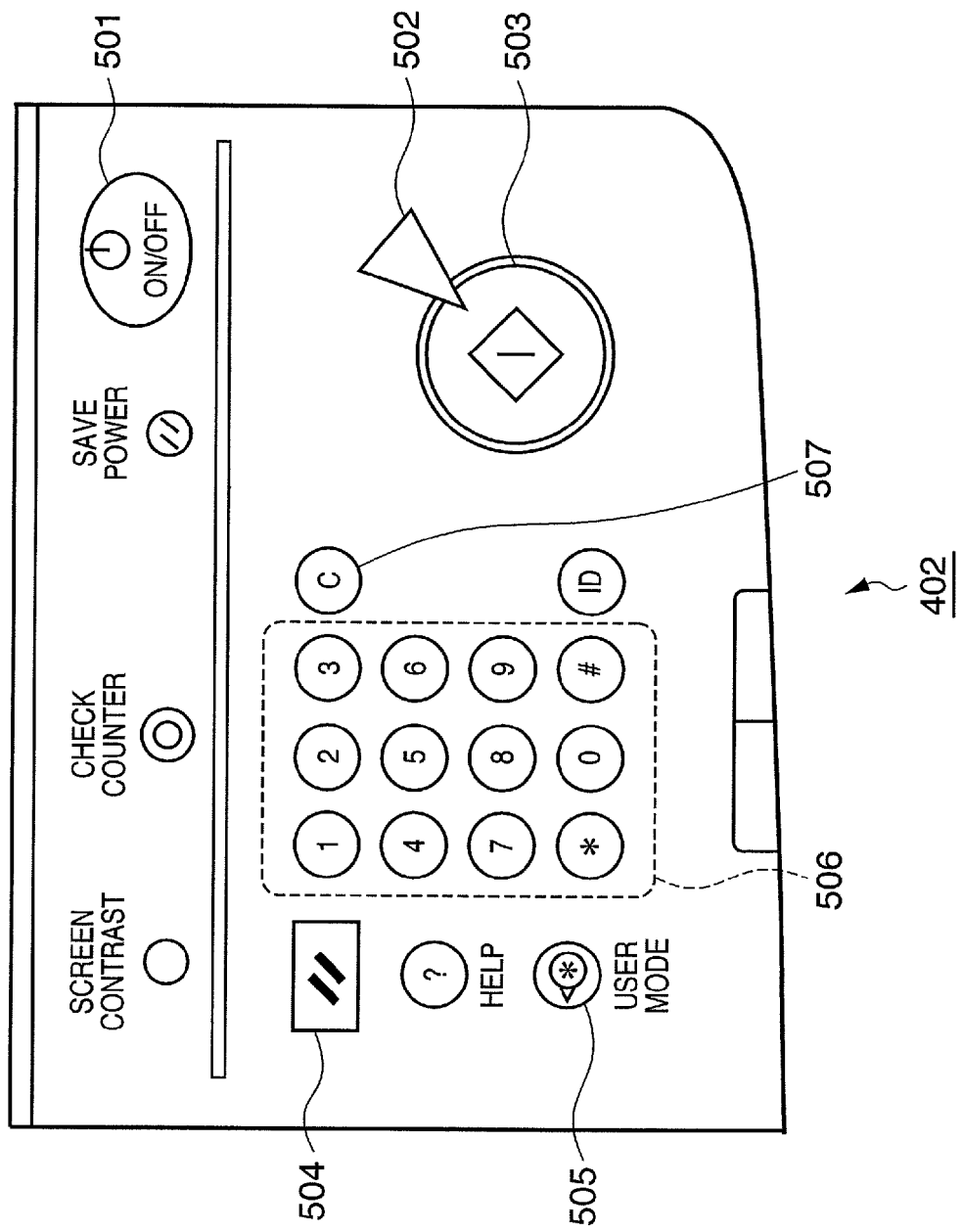
FIG. 5 is a view for explaining an example of the UI unit to be controlled in the embodiment.

As shown in FIG. 5, the key input unit 402 comprises an operation unit power switch 501. In response to a user operation to the operation unit power switch 501, the control unit 205 controls to selectively switch between the standby mode (normal operation state) and the sleep mode (state in which the program stops in wait for an interrupt by network printing, facsimile transmission, or the like, suppressing power consumption). The control unit 205 controls to accept a user operation to the operation unit power switch 501 while a main power switch (not shown) for supplying power to the whole system is ON.

A start key 503 enables accepting, from a user, an instruction to cause the print apparatus to start a kind of job process designated by a user, such as copying or transmission of a job to be processed. A stop key 502 enables accepting, from the user, an instruction to cause the print apparatus to interrupt the process of an accepted job. A ten-key pad 506 allows the user to set the entries of various settings. A clear key 507 is used to cancel various parameters such as entries set by the user via the ten-key pad 506. A reset key 504 is used to accept, from the user, an instruction to invalidate various settings of a job to be processed by the user and restore the setting values to defaults. A user mode key 505 is used to shift to a system setup window for each user.

Figure 6:
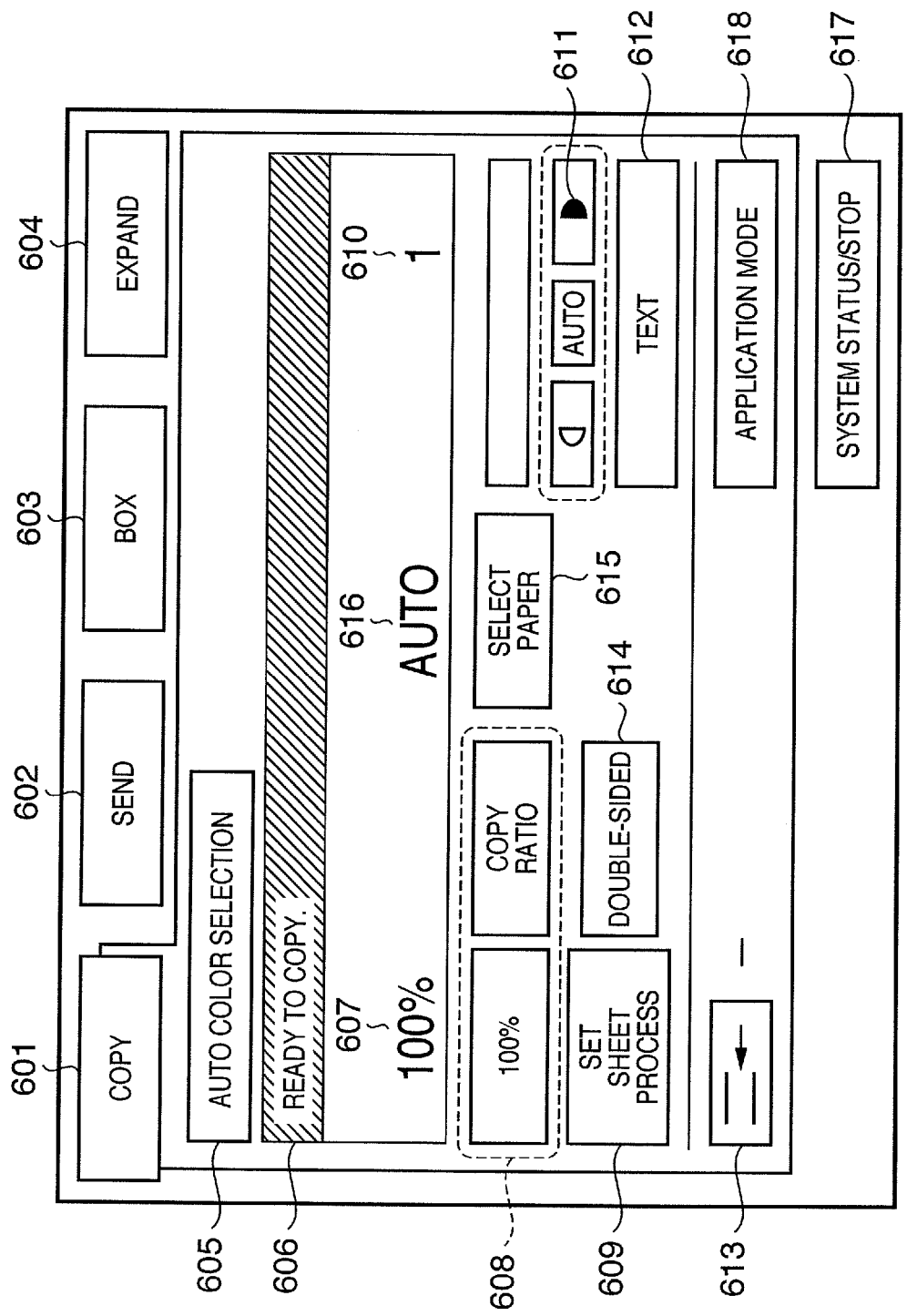
FIG. 6 is a view for explaining an example of display control on the UI unit to be controlled in the embodiment.

FIG. 6 is a view for explaining the touch panel unit (to be also referred to as a display unit) 401 serving as an example of a user interface unit provided by the print system. The touch panel unit 401 has an LCD (Liquid Crystal Display), and a touch panel display formed from a transparent electrode adhered onto the LCD. The touch panel unit 401 has both a function of accepting various settings from an operator and a function of presenting information to the operator. For example, when it is detected that a user presses a portion corresponding to an effective display key on the LCD, the control unit 205 controls to display an operation window corresponding to the key operation on the display unit 401 in accordance with a display control program stored in advance in the ROM 207. FIG. 6 shows an example of an initial window displayed on the display unit 401 when the print apparatus is in the standby mode (state in which there is no job to be processed by the print apparatus).

When the user presses a copy tab 601 on the display unit 401 shown in FIG. 6, the control unit 205 causes the display unit 401 to display the operation window of the copy function provided by the print apparatus. When the user presses a send tab 602, the control unit 205 causes the display unit 401 to display the operation window of the data send function (e.g., FAX transmission or E-mail sending) provided by the print apparatus. When the user presses a box tab 603, the control unit 205 causes the display unit 401 to display the operation window of the box function provided by the print apparatus.

The box function uses a plurality of data storage boxes (to be referred to boxes hereinafter) which are virtually ensured in the HDD 209 in advance and are available discriminately for respective users. With the box function, the control unit 205 allows a user to select a desired one of boxes via the user interface unit, and accepts a desired operation from the user. For example, the control unit 205 responds to an instruction input from the user via the operation unit 204, and controls the HDD 209 to store document data of a job accepted from the scanner unit 201 of the print apparatus in a box selected by the user. The control unit 205 also makes it possible to store, e.g., text data of a job accepted from an external apparatus (e.g., the PC 103 or 104) via the external I/F unit 202 in a box designated by the user in accordance with an instruction designated by the user of the external apparatus via the user interface unit of the external apparatus. The control unit 205 controls, e.g., the printer unit 203 to print job data stored in a box in the desired output form of a user in accordance with a user instruction from the operation unit 204, or controls the external I/F unit 202 to transmit the job data to an external apparatus desired by the user.

To allow the user to execute various box operations, the control unit 205 controls the display unit 401 to display the box function operation window in response to press of the box tab 603 by the user. When the user presses an expand tab 604 on the display unit 401 of FIG. 6, the control unit 205 causes the display unit 401 to display a window for setting expansion functions such as scanner setting. When the user presses a system monitor key 617, the control unit 205 causes the display unit 401 to display a display window for notifying the user of the MFP state or status.

A color selection setting key 605 allows the user to select color copying, monochrome copying, or auto selection in advance. A copy ratio setting key 608 causes the display unit 401 to display a setup window which allows the user to set a copy ratio such as equal magnification, enlargement, or reduction.

When the user presses a double-sided key 614, the control unit 205 causes the display unit 401 to display a window which allows the user to set (select) which of single-sided printing and double-sided printing is executed in the print process of a target job. In response to press of a sheet selection key 615 by the user, the control unit 205 causes the display unit 401 to display a window which allows the user to set a sheet feed unit, sheet size, and sheet type (medium type) necessary for the print process of a target job. In response to pressing of a key 612 by the user, the control unit 205 causes the display unit 401 to display a window which allows the user to select an image process mode (e.g., a text mode or photo mode) suited to an original document image. By operating a density setting key 611, the user can adjust the density of the output image of a job to be printed.

Referring to FIG. 6, the control unit 205 causes a status display field 606 of the display unit 401 to display the operation state (e.g., standby, warm-up, printing, jam, or error) of a current event in the print apparatus in order to confirm it by the user. The control unit 205 causes a display field 607 to display information for prompting the user to confirm the copy ratio of a job to be processed. The control unit 205 causes a display field 616 to display information for prompting the user to confirm the sheet size and sheet feed mode of a job to be processed. The control unit 205 causes a display field 610 to display information for prompting the user to confirm the number of copies of a job to be processed, and information for prompting the user to confirm the sheet number during printing. In this manner, the control unit 205 causes the display unit 401 to display various types of information to be announced to the user.

When a user presses an interrupt key 613, the control unit 205 stops printing a current job by the print apparatus, and executes printing of a job from the user. When the user presses an application mode key 618, the control unit 205 causes the display unit 401 to display a window for setting various image processes and layouts, such as two-page separation, cover sheet/slip sheet setting, reduction layout, and image movement.

Still another point of the embodiment will be described.

As a setting for a job to be processed, the control unit 205 causes the UI unit to execute a display for accepting a request from a user to execute a sheet process by the sheet processing unit of the inline type sheet processing apparatus 200 of the print system 1000. The control unit 205 also causes the UI unit to execute a display for accepting an instruction from the user to cause the UI unit to execute this display.

For example, the control unit 205 causes the display unit 401 to display a sheet process setting key 609 in FIG. 6. Assume that the user presses the sheet process setting key 609. Then, the control unit 205 causes the display unit 401 to execute a display for allowing the user to specify a desired sheet process among sheet process selection candidates executable using the inline type sheet processing apparatus of the print system 1000.

Figure 7:
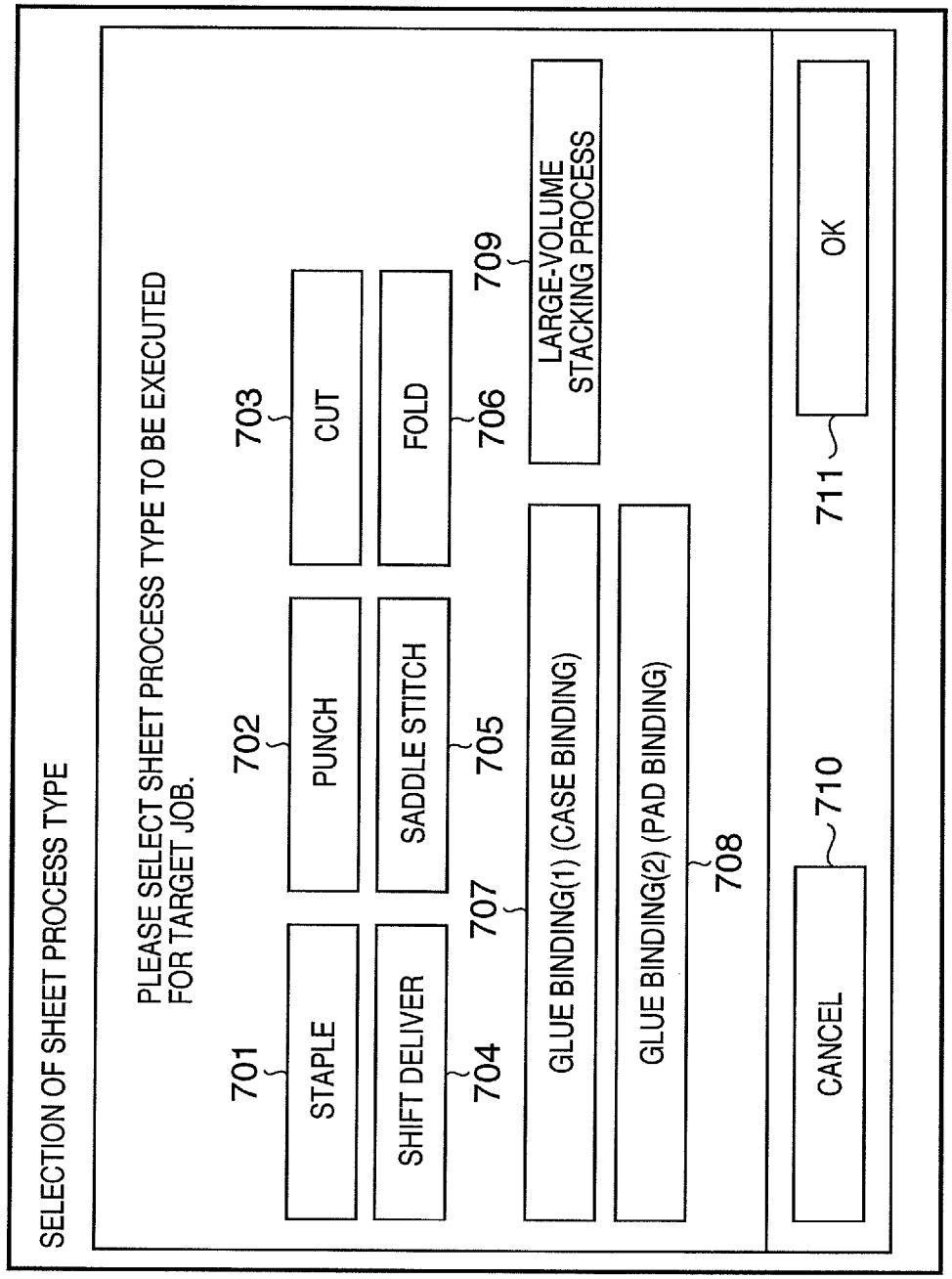
FIG. 7 is a view for explaining an example of display control on the UI unit to be controlled in the embodiment.

In this example, the control unit 205 causes the display unit 401 to execute a display in FIG. 7 in response to press of the sheet process setting key 609 by the user. The control unit 205 controls to accept, via the display of FIG. 7, a request to execute a sheet process by the inline sheet processing apparatus 200 for a printed sheet of a job to be processed.

The control unit 205 determines sheet processing apparatus candidates selectable via the display of FIG. 7 in accordance with the kind of sheet processing apparatus attached to the print system 1000 and the mounting status of the sheet processing apparatus. For example, the display of FIG. 7 permits accepting a request from a user to execute any type of sheet process among types of sheet processes listed below for a sheet printed by the printer unit 203:

(1) a stapling process,
(2) a punching process,
(3) a folding process,
(4) a shift delivery process,
(5) a cutting process,
(6) a saddle stitching process,
(7) a case binding process as an example of glue binding process,
(8) a pad binding process as another example of glue binding process, and
(9) a large-volume stacking process.

In the UI control example of FIG. 7, the control unit 205 controls the operation unit 204 to set these nine sheet processes as selection candidates. This is because the inline type sheet processing apparatuses of the print system 1000 can be used to selectively execute these nine sheet processes.

In other words, the control unit 205 controls the UI unit to exclude a sheet process unexecutable by the print system 1000 from selection candidates in the display of FIG. 7. For example, when the print system 1000 does not comprise one sheet processing apparatus capable of selectively executing a case binding process and pad binding process, or this sheet processing apparatus is out of order, the control unit 205 controls to invalidate keys 707 and 708. For example, the control unit 205 grays out and hatches the keys 707 and 708. With this setting, the control unit 205 controls not to accept a request from a user to execute corresponding sheet processes. Further, when the print system 1000 comprises a sheet processing apparatus capable of executing a sheet process different from the above-mentioned nine candidates, the control unit 205 controls the display of FIG. 7 to validate a display key for accepting a request from a user to execute the different sheet process. With this display key, the control unit 205 permits accepting a request from a user to execute the sheet process. The embodiment can execute this display control together with job process control (to be described later), preventing any user operation error.

In executing this control, the control unit 205 acquires system configuration information for specifying what kind of sheet processing apparatus the print system 1000 comprises as the sheet processing apparatus 200. In this control, the control unit 205 also uses, e.g., status information for specifying whether an error occurs in the sheet processing apparatus 200. The control unit 205 acquires these pieces of information by manually inputting them by a user via the UI unit, or automatically on the basis of a signal output from the sheet processing apparatus 200 via a signal line when the sheet processing apparatus 200 connects to the print apparatus 100. On the premise of this configuration, the control unit 205 causes the display unit 401 to execute the display of FIG. 7 with display contents based on the acquired information.

The print system 1000 can accept, from an external apparatus such as the PC 103 or 104, a request to print a target job and a request to execute a sheet process necessary for the job. When inputting a job from the external apparatus, the control unit 205 controls the display unit of the external apparatus serving as a print data transmission source to display the same functions as those of the display in FIG. 7. In this example, the control unit 205 causes the display unit of a computer such as the PC 103 or 104 to display a printer driver setup window (to be described later). When the UI of the external apparatus executes the display, the control unit of the external apparatus executes the above control. For example, when the display unit of the PC 103 or 104 displays a printer driver UI window, the control entity is the CPU of the PC.

[Concrete Example of Configuration of Print System 1000 Controlled in Embodiment]

A system configuration representing how many and what kinds of inline type sheet processing apparatuses are connectable to the print apparatus 100 in the print system 1000, how to connect them, and what kinds of sheet processes they can execute will be explained with reference to FIGS. 8A and 8B and the like in association of a feature of the embodiment.

Figure 8B:
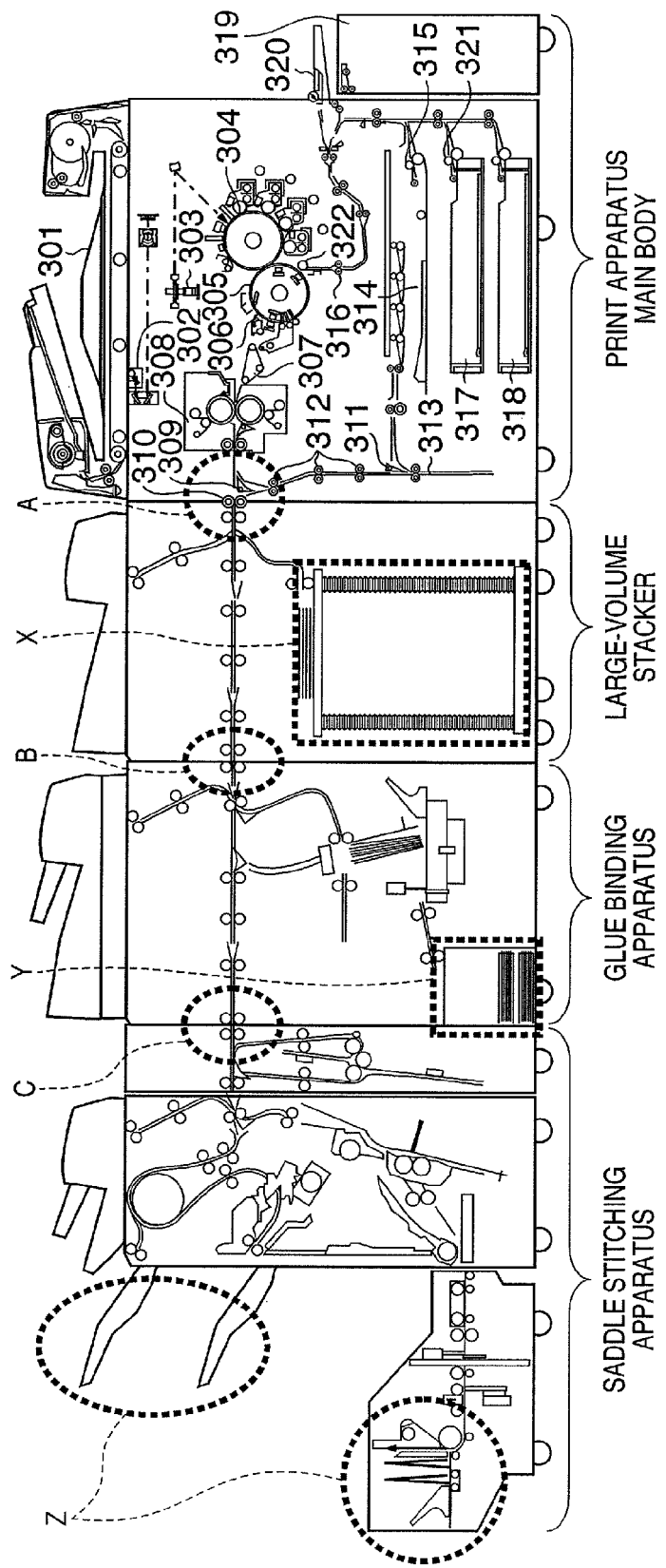
FIG. 8B is a view for explaining the control example of the print system 1000 to be controlled in the embodiment.

The embodiment can implement, for example, a system configuration as shown in FIGS. 8A and 8B as the print system 1000 shown in FIGS. 1 to 3.

In the system configuration example of FIG. 8A, the print system 1000 comprises a total of three inline type sheet processing apparatuses, i.e., a large-volume stacker, glue binding apparatus, and saddle stitching apparatus as a group of sheet processing apparatuses 200. In the configuration example of FIG. 8A, the large-volume stacker, glue binding apparatus, and saddle stitching apparatus connect in the order named to the print apparatus 100 of the print system 1000. The control unit 205 serving as an example of the control unit of the print system 1000 comprehensively controls the print system 1000 having the system configuration as shown in FIGS. 8A and 8B.

In this example, the large-volume stacker is a sheet processing apparatus capable of stacking a large number (e.g., 5,000) of sheets from the printer unit 203.

The glue binding apparatus in this example is a sheet processing apparatus capable of executing a case binding process requiring a sheet gluing process when attaching a cover and binding a bundle of sheets printed by the printer unit 203. The glue binding apparatus can also execute a pad binding process corresponding to a sheet process to glue and bind a bundle of sheets without attaching any cover. The glue binding apparatus is also called a case binding apparatus because it is a sheet processing apparatus capable of executing at least a case binding process.

The saddle stitching apparatus is a sheet processing apparatus capable of selectively executing a stapling process, punching process, cutting process, shift delivery process, saddle stitching process, and folding process for sheets from the printer unit 203.

In the embodiment, the control unit 205 registers, in a specific memory, various types of system configuration information on these sheet processing apparatuses as management information necessary for various control examples. For example, when the print system 1000 has the system configuration as shown in FIG. 8A, the control unit 205 registers the following pieces of information in the HDD 209.

(Information 1) Apparatus presence/absence information which allows the control unit 205 to confirm that the print system 1000 comprises an inline type sheet processing apparatus. This information corresponds to information which allows the control unit to specify whether the print system 1000 comprises an inline type sheet processing apparatus.

(Information 2) Inline sheet processing apparatus count information which allows the control unit 205 to confirm that the print system 1000 the print system 1000 comprises three inline type sheet processing apparatuses 200. This information corresponds to information which allows the control unit to specify the number of inline type sheet processing apparatuses of the print system 1000.

(Information 3) Inline sheet processing apparatus type information which allows the control unit 205 to specify that the print system 1000 comprises the large-volume stacker, glue binding apparatus, and saddle stitching apparatus. This information corresponds to information which allows the control unit to confirm the types of inline type sheet processing apparatuses of the print system 1000.

(Information 4) Information which allows the control unit 205 to confirm that one of the three inline type sheet processing apparatuses is a large-volume stacker capable of stacking sheets from the printer unit 203. Apparatus performance information which allows the control unit 205 to confirm that another inline type sheet processing apparatuses is a glue binding apparatus capable of executing a glue binding process (case binding process and/or pad binding process) for sheets from the printer unit 203. Information which allows the control unit 205 to confirm that the remaining inline type sheet processing apparatuses is a saddle stitching apparatus capable of selectively executing stapling, punching, cutting, shift delivery, saddle stitching, and folding for sheets from the printer unit 203. In other words, information which allows the control unit 205 to specify that sheet processes executable by the system are a total of nine processes: stapling, punching, cutting, shift delivery, saddle stitching, folding, case binding, pad binding, and large-volume stacking. This information corresponds to information which allows the control unit to confirm performance information of sheet processes executable by the inline type sheet processing apparatuses of the print system 1000.

(Information 5) Information which allows the control unit 205 to confirm that the three sheet processing apparatuses cascade-connect to the print apparatus 100 in the order of the large-volume stacker, glue binding apparatus, and saddle stitching apparatus. This information corresponds to connection order information of these sheet processing apparatuses in the system when a plurality of inline finishers are connected.

The control unit 205 registers, in the HDD 209, various types of information as represented by (information 1) to (information 5) as system configuration information necessary for various control examples. The control unit 205 utilizes the information as criterion information necessary for job control (to be described later).

On the premise of the above configuration, for example, the print system 1000 has the system configuration as shown in FIG. 8A. Control executed by the control unit 205 in this system configuration will be exemplified.

For example, when the print system 1000 has the system configuration in FIGS. 8A and 8B, it can execute all the nine sheet processes. The control unit 205 recognizes this on the basis of the criteria of (information 1) to (information 5). Based on the recognition result, the control unit 205 controls the UI unit so as to set all the nine sheet processes in the display of FIG. 7 as selection candidates. In addition, the control unit 205 executes the following control in response to a user operation.

For example, the control unit 205 accepts, from a user, a stapling process execution request for a target job via the UI unit in response to press of a key 701 by the user in the display of FIG. 7 executed by the UI unit under the control of the control unit 205. In response to this request, the control unit 205 causes the saddle stitching apparatus corresponding to the sheet processing apparatus 200c in FIG. 8A to staple printed sheets of the job.

For example, the control unit 205 accepts, from the user, a (sheet) punching process execution request for a target job via the UI unit in response to pressing of a key 702 by the user in the display of FIG. 7 executed by the UI unit under the control of the control unit 205. In response to this request, the control unit 205 causes the saddle stitching apparatus corresponding to the sheet processing apparatus 200c in FIG. 8A to punch printed sheets of the job.

For example, the control unit 205 accepts, from the user, a cutting process execution request for a target job via the UI unit in response to pressing of a key 703 by the user in the display of FIG. 7 executed by the UI unit under the control of the control unit 205. In response to this request, the control unit 205 causes the saddle stitching apparatus corresponding to the sheet processing apparatus 200c in FIG. 8A to cut printed sheets of the job.

For example, the control unit 205 accepts, from the user, a cutting process execution request for a target job via the UI unit in response to pressing of a key 704 by the user in the display of FIG. 7 executed by the UI unit under the control of the control unit 205. In response to this request, the control unit 205 causes the saddle stitching apparatus corresponding to the sheet processing apparatus 200c in FIG. 8A to cut printed sheets of the job.

For example, the control unit 205 accepts, from the user, a saddle stitching process execution request for a target job via the UI unit in response to pressing of a key 705 by the user in the display of FIG. 7 executed by the UI unit under the control of the control unit 205. In response to this request, the control unit 205 causes the saddle stitching apparatus corresponding to the sheet processing apparatus 200c in FIG. 8A to saddle-stitch printed sheets of the job.

For example, the control unit 205 accepts, from the user, a folding process execution request for a target job via the UI unit in response to pressing of a key 706 by the user in the display of FIG. 7 executed by the UI unit under the control of the control unit 205. In response to this request, the control unit 205 causes the saddle stitching apparatus corresponding to the sheet processing apparatus 200c in FIG. 8A to fold (e.g., Z-fold) printed sheets of the job.

For example, the control unit 205 accepts, from the user, a case binding process execution request for a target job via the UI unit in response to pressing of the key 707 by the user in the display of FIG. 7 executed by the UI unit under the control of the control unit 205. In response to this request, the control unit 205 causes the glue binding apparatus corresponding to the sheet processing apparatus 200b in FIG. 8A to case-bind printed sheets of the job.

For example, the control unit 205 accepts, from the user, a pad binding process execution request for a target job via the UI unit in response to pressing of the key 708 by the user in the display of FIG. 7 executed by the UI unit under the control of the control unit 205. In response to this request, the control unit 205 causes the glue binding apparatus corresponding to the sheet processing apparatus 200b in FIG. 8A to pad-bind printed sheets of the job.

For example, the control unit 205 accepts, from the user, a large-volume stacking process execution request for a target job via the UI unit in response to pressing of a key 709 by the user in the display of FIG. 7 executed by the UI unit under the control of the control unit 205. In response to this request, the control unit 205 causes the large-volume stacker corresponding to the sheet processing apparatus 200a in FIG. 8A to stack a large number of printed sheets of the job.

As described above, the control unit 205 controls to accept, via the UI unit together with a print execution request, a request to execute a sheet process desired by the user among selection candidates corresponding to sheet processes executable by the sheet processing apparatuses of the print system 1000. In response to accepting a request from the user via the UI unit provided by the embodiment to print a target job, the control unit 205 causes the printer unit 203 to execute a print process necessary for the job. Further, the control unit 205 causes a sheet processing apparatus of the print system 1000 to execute a sheet process necessary for printed sheets of the job.

As another feature of the embodiment, the control unit 205 executes the following control in the print system 1000.

For example, the print system 1000 has the system configuration as shown in FIG. 8A. That is, the print system 1000 is built by connecting the print apparatus 100→the large-volume stacker→the glue binding apparatus→the saddle stitching apparatus in the order named. The internal system configuration in this case is as shown in FIG. 8B.

FIG. 8B is a sectional view of the apparatuses of the whole print system 1000 when the print system 1000 has the system configuration in FIG. 8A. The apparatus configuration in FIG. 8B corresponds to that in FIG. 8A.

As is apparent from the internal apparatus configuration in FIG. 8B, a sheet printed by the printer unit 203 of the print apparatus 100 is capable of being supplied into the respective sheet processing apparatuses. More specifically, as shown in FIG. 8B, the respective sheet processing apparatuses comprise sheet feeding paths capable of feeding a sheet via points A, B, and C in the apparatuses.

Each inline type sheet processing apparatus such as the sheet processing apparatus 200a or 200b in FIG. 8B has a function of receiving a sheet from a preceding apparatus connected to the input side of the sheet processing apparatus even if a target job does not require a sheet process executable by the sheet processing apparatus. Each inline type sheet processing apparatus has a function of transferring a sheet received from the preceding apparatus to a succeeding apparatus connected to the output side of the sheet processing apparatus.

As described above, in the print system 1000 of the embodiment, a sheet processing apparatus, which executes a sheet process different from sheet processes necessary for a target job, has a function of conveying sheets of the target job from a preceding apparatus to a succeeding apparatus. This configuration is also a feature of the embodiment.

For example, when the print system 1000 has the system configuration as shown in FIGS. 8A and 8B on the premise of the above system configuration, the control unit 205 executes the following control for the print system 1000 in accordance with a job for which a user issues a print execution request via the UI unit according to the above-described method. A control example called (case 1) in FIG. 8B, a control example called (case 2) in FIG. 8B, and a control example called (case 3) in FIG. 8B will be sequentially explained as control examples executed by the control unit 205 for the print system 1000 on condition that the print system 1000 has the system configuration shown in FIGS. 8A and 8B.

The control example (case 1) in FIG. 8B will be described which corresponds to control executed by the control unit 205 for the print system 1000 on condition that the print system 1000 has the system configuration illustrated in FIGS. 8A and 8B. For example, when the print system 1000 has the system configuration in FIGS. 8A and 8B, a target job whose print execution request is accepted from a user requires a sheet process (e.g., a stacking process) by the large-volume stacker after a print process. This job is called a "stacker job".

A case will be explained in which the print system 1000 having the system configuration shown in FIGS. 8A and 8B processes the stacker job. In this case, the control unit 205 makes job sheets printed by the print apparatus 100 pass through point A in FIG. 8B, and causes the large-volume stacker to execute the sheet process. The control unit 205 holds the print result of the stacker job having undergone the sheet process (e.g., the stacking process) by the large-volume stacker, at a delivery destination X inside the large-volume stacker shown in FIG. 8B without conveying the print result to another apparatus (e.g., an inline finisher positioned on the output side of the large-volume stacker in the system of FIG. 8B).

An operator can directly take out, from the delivery destination X, the printed material of the stacker job held at the delivery destination X in FIG. 8B. In other words, this configuration can omit a series of apparatus operations and operator operations to convey sheets to a most downstream delivery destination Z in the sheet conveyance direction in FIG. 8B and take out the printed material of the stacker job from the delivery destination Z.

A series of control operations executed by the control unit 205 when the print system 1000 has the system configuration in FIGS. 8A and 8B corresponds to a control example (case 1) in FIG. 8B.

The control example (case 2) in FIG. 8B will be described which corresponds to control executed by the control unit 205 for the print system 1000 on condition that the print system 1000 has the system configuration illustrated in FIGS. 8A and 8B. For example, when the print system 1000 has the system configuration in FIGS. 8A and 8B, a target job whose print execution request is accepted from a user requires a sheet process (e.g., a case binding process or pad binding process) by the glue binding apparatus after a print process. This job is called a "glue binding job".

A case will be explained in which the print system 1000 having the system configuration shown in FIGS. 8A and 8B processes the glue binding job. In this case, the control unit 205 makes job sheets printed by the print apparatus 100 pass through points A and B in FIG. 8B, and causes the glue binding apparatus to execute the sheet process. The control unit 205 holds the print result of the glue binding job having undergone the sheet process (e.g., the case binding process or pad binding process) by the glue binding apparatus, at a delivery destination Y inside the glue binding apparatus shown in FIG. 8B without conveying the print result to another apparatus (e.g., an inline finisher positioned on the output side of the glue binding apparatus in the system of FIG. 8B).

The operator can directly take out, from the delivery destination Y, the printed material of the glue binding job held at the delivery destination Y in FIG. 8B. In other words, this configuration can omit a series of apparatus operations and operator operations to convey sheets to the most downstream delivery destination Z in the sheet conveyance direction in FIG. 8B and take out the printed material of the glue binding job from the delivery destination Z.

A series of control operations executed by the control unit 205 when the print system 1000 has the system configuration in FIGS. 8A and 8B corresponds to a control example (case 2) in FIG. 8B.

The control example (case 3) in FIG. 8B will be described which corresponds to control executed by the control unit 205 for the print system 1000 on condition that the print system 1000 has the system configuration illustrated in FIGS. 8A and 8B. For example, when the print system 1000 has the system configuration in FIGS. 8A and 8B, a target job whose print execution request is accepted from a user requires a sheet process (e.g., a saddle stitching process, punching process, cutting process, shift delivery process, or folding process) by the saddle stitching apparatus after a print process. This job is called a "saddle stitching job".

A case will be explained in which the print system 1000 having the system configuration shown in FIGS. 8A and 8B processes the saddle stitching job. In this case, the control unit 205 makes job sheets printed by the print apparatus 100 pass through points A, B, and C in FIG. 8B, and causes the saddle stitching apparatus to execute the sheet process. The control unit 205 holds the print result of the saddle stitching job having undergone the sheet process by the saddle stitching apparatus, at the delivery destination Z of the saddle stitching apparatus shown in FIG. 8B without conveying the print result to another apparatus.

The delivery destination Z in FIG. 8B has a plurality of delivery destination candidates. This is because the saddle stitching apparatus of the embodiment can execute a plurality of sheet processes and the delivery destination changes in each sheet process, which will be described with reference to FIG. 13.

A series of control operations executed by the control unit 205 when the print system 1000 has the system configuration in FIGS. 8A and 8B corresponds to a control example (case 3) in FIG. 8B.

As described above, the control unit 205 serving as an example of the control unit of the embodiment also executes paper handling control based on system configuration information of the print system 1000 that is stored in the HDD 209.

Information corresponding to the system configuration information contains information representing whether the system comprises an inline finisher, and when the system comprises an inline finisher, information on the number of inline finishers and their performance information. When the system comprises a plurality of inline finishers, their connection order information also corresponds to the system configuration information.

As shown in FIGS. 1 to 3, 8A, 8B, and the like, the print system 1000 according to the embodiment enables connecting a plurality of inline type sheet processing apparatuses to the print apparatus 100. As is apparent from a comparison between FIGS. 8A and 8B and FIGS. 9A, 9B, 10A, and 10B (to be described later), a plurality of inline type sheet processing apparatuses can be independently connected or disconnected, or a free combination of them can be attached to the print apparatus 100. The connection order of inline type sheet processing apparatuses is arbitrary as long as they are physically connectable. However, the embodiment imposes restrictions on the system configuration.

For example, an apparatus permitted to be adopted as an inline type sheet processing apparatus in the print system 1000 must satisfy the following constituent components.

A sheet processing apparatus can execute a sheet process for sheets of a job requiring a sheet process executable by the sheet processing apparatus, and has a sheet conveyance function of receiving, from a preceding apparatus, sheets of a job requiring no sheet process by the sheet processing apparatus and transferring them to a succeeding apparatus. In this example, this sheet processing apparatus corresponds to the large-volume stacker and glue binding apparatus shown in the system configuration of FIGS. 8A and 8B and that of FIGS. 9A and 9B (to be described later).

The embodiment also permits the use of a sheet processing apparatus, which does not meet the above configuration, as an inline type sheet processing apparatus in the print system 1000. For example, this apparatus satisfies the following components.

A sheet processing apparatus can execute a sheet process for sheets of a job requiring a sheet process executable by the sheet processing apparatus, but does not have the sheet conveyance function of receiving, from a preceding apparatus, sheets of a job requiring no sheet process by the sheet processing apparatus and transferring them to a succeeding apparatus. In this example, this sheet processing apparatus corresponds to the saddle stitching apparatus shown in the system configuration of FIGS. 8A and 8B, that of FIGS. 9A and 9B, and that of FIGS. 10A and 10B (to be described later). The embodiment imposes restrictions on an apparatus of this type.

For example, when the print system 1000 employs an inline finisher (e.g., the saddle stitching apparatus in FIGS. 8A and 8B) having no function of conveying sheets to a succeeding apparatus, the number of apparatuses of this type is limited to one. However, the embodiment permits simultaneous use of inline finishers of another type.

For example, the embodiment permits the use of the large-volume stacker and glue binding apparatus together with the saddle stitching apparatus, as represented by the system configuration in FIGS. 8A and 8B and that of FIGS. 9A and 9B (to be described later). When a plurality of sheet processing apparatuses are cascade-connected and used, an inline type sheet processing apparatus having no function of conveying sheets to a succeeding apparatus is installed at the most downstream position in the sheet conveyance direction.

For example, the saddle stitching apparatus is connected last in the print system 1000, as represented by the system configuration of FIGS. 8A and 8B and that of FIGS. 9A and 9B (to be described later). That is, it is inhibited to configure the system by interposing the saddle stitching apparatus between the large-volume stacker and the glue binding apparatus, as a system configuration different from that of FIGS. 8A and 8B and that of FIGS. 9A and 9B (to be described later).

The control unit of the system comprehensively controls the print system 1000 so as to operate under the above-described restrictions.

For example, if inline type sheet processing apparatuses are connected in a connection order which violates the restrictions, the control unit 205 causes the UI unit to display a warning. For example, when a user inputs the connection order of sheet processing apparatuses via the UI unit, as represented by the above-mentioned configuration, the control unit 205 controls to invalidate a user setting which violates the restrictions. For example, the control unit 205 executes gray-out display or hatching display to inhibit any improper connection setting.

By employing the above configuration, any user operation error, apparatus malfunction, and the like can be prevented in the configuration of the embodiment. That is, this configuration further enhances effects described in the embodiment.

On the premise of this configuration, the embodiment can freely build the system configuration of the print system 1000 under the restrictions.

For example, the operator of the POD system 10000 can arbitrarily determine and change the connection order of inline type sheet processing apparatuses and the number of connected inline type sheet processing apparatuses under the restrictions. The print system 1000 executes control corresponding to the system configuration status. An example of this control will be described.

The print system 1000 can also take the system configuration in FIG. 9A, as an example of a system configuration in which the connection order of inline type sheet processing apparatuses changes from that in the system configuration of FIG. 8A.

Figure 9B:
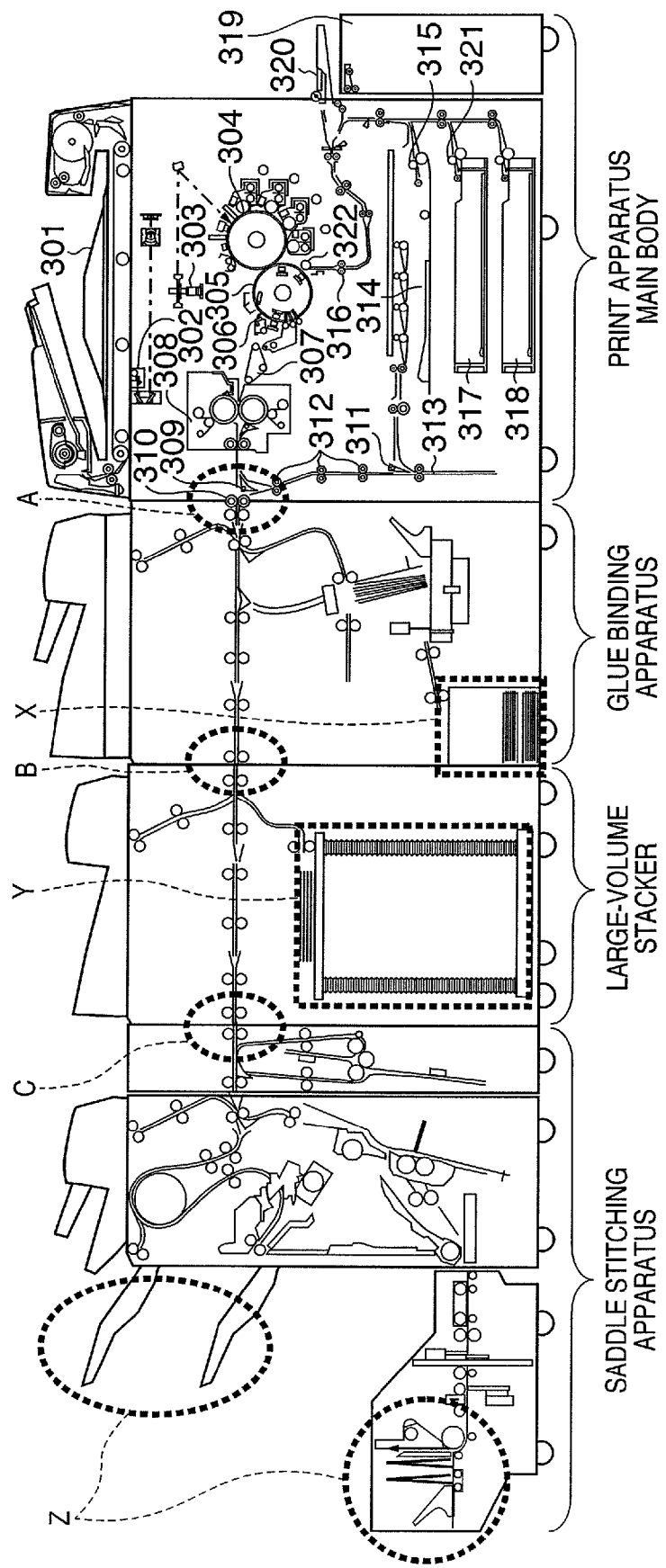
FIG. 9B is a view for explaining the control example of the print system 1000 to be controlled in the embodiment.

The system configuration of FIG. 9A is different from that of FIG. 8A in the connection order of inline sheet processing apparatuses of the print system 1000. More specifically, the print system 1000 is built by connecting the print apparatus 100→the glue binding apparatus→the large-volume stacker→the saddle stitching apparatus in the order named. The internal system configuration in this case is as shown in FIG. 9B.

FIG. 9B is a sectional view of the apparatuses of the whole print system 1000 when the print system 1000 has the system configuration in FIG. 9A. The system configuration in FIG. 9B corresponds to the internal system configuration in FIG. 9A.

Similar to the above-described system configuration example, the internal system configuration in FIG. 9B can also supply a sheet printed by the printer unit 203 of the print apparatus 100 into the respective sheet processing apparatuses. More specifically, as shown in FIG. 9B, the respective sheet processing apparatuses comprise sheet feeding paths capable of feeding a sheet from the printer unit 203 via points A, B, and C in the apparatuses.

The system configuration in FIGS. 9A and 9B also follows the above restrictions. For example, the sheet processing apparatuses cascade-connect to the print apparatus 100 so as to install the saddle stitching apparatus at the most downstream position in the sheet conveyance direction.

For example, when the print system 1000 has the system configuration as shown in FIGS. 9A and 9B on the premise of the above configuration, the control unit 205 executes the following control for a job for which a user issues a print execution request via the UI unit according to the above-described method. A control example called (case 1) in FIG. 9B, a control example called (case 2) in FIG. 9B, and a control example called (case 3) in FIG. 9B will be sequentially explained as control examples executed by the control unit 205 for the print system 1000 on condition that the print system 1000 has the system configuration shown in FIGS. 9A and 9B.

The control example (case 1) in FIG. 9B will be described which corresponds to control executed by the control unit 205 for the print system 1000 on condition that the print system 1000 has the system configuration illustrated in FIGS. 9A and 9B. For example, when the print system 1000 has the system configuration in FIGS. 9A and 9B, a target job whose print execution request is accepted from a user requires a sheet process (e.g., a stacking process) by the large-volume stacker after a print process. This job is called a "stacker job".

A case will be explained in which the print system 1000 having the system configuration shown in FIGS. 9A and 9B processes the stacker job. In this case, the control unit 205 makes job sheets printed by the print apparatus 100 pass through points A and B in FIG. 9B, and causes the large-volume stacker to execute the sheet process. The control unit 205 holds the print result of the stacker job having undergone the sheet process (e.g., the stacking process) by the large-volume stacker, at the delivery destination Y inside the large-volume stacker shown in FIG. 9B without conveying the print result to another apparatus (e.g., an inline finisher positioned on the output side of the large-volume stacker in the system of FIG. 9B).

An operator can directly take out, from the delivery destination Y, the printed material of the stacker job held at the delivery destination Y in FIG. 9B. In other words, this configuration can omit a series of apparatus operations and operator operations to convey sheets to the most downstream delivery destination Z in the sheet conveyance direction in FIG. 9B and take out the printed material of the stacker job from the delivery destination Z.

A series of control operations executed by the control unit 205 when the print system 1000 has the system configuration in FIGS. 9A and 9B corresponds to a control example (case 1) in FIG. 9B.

The control example (case 2) in FIG. 9B will be described which corresponds to control executed by the control unit 205 for the print system 1000 on condition that the print system 1000 has the system configuration illustrated in FIGS. 9A and 9B. For example, when the print system 1000 has the system configuration in FIGS. 9A and 9B, a target job whose print execution request is accepted from a user requires a sheet process (e.g., a case binding process or pad binding process) by the glue binding apparatus after a print process. This job is called a "glue binding job".

A case will be explained in which the print system 1000 having the system configuration shown in FIGS. 9A and 9B processes the glue binding job. In this case, the control unit 205 makes job sheets printed by the print apparatus 100 pass through point A in FIG. 9B, and causes the glue binding apparatus to execute the sheet process. The control unit 205 holds the print result of the glue binding job having undergone the sheet process (e.g., the case binding process or pad binding process) by the glue binding apparatus, at the delivery destination X inside the glue binding apparatus shown in FIG. 9B without conveying the print result to another apparatus (e.g., an inline finisher positioned on the output side of the glue binding apparatus in the system of FIG. 9B).

The operator can directly take out, from the delivery destination X, the printed material of the glue binding job held at the delivery destination X in FIG. 9B. In other words, this configuration can omit a series of apparatus operations and operator operations to convey sheets to the most downstream delivery destination Z in the sheet conveyance direction in FIG. 9B and take out the printed material of the glue binding job from the delivery destination Z.

A series of control operations executed by the control unit 205 when the print system 1000 has the system configuration in FIGS. 9A and 9B corresponds to a control example (case 2) in FIG. 9B.

The control example (case 3) in FIG. 9B will be described which corresponds to control executed by the control unit 205 for the print system 1000 on condition that the print system 1000 has the system configuration illustrated in FIGS. 9A and 9B. For example, when the print system 1000 has the system configuration in FIGS. 9A and 9B, a target job whose print execution request is accepted from a user requires a sheet process (e.g., a saddle stitching process, punching process, cutting process, shift delivery process, or folding process) by the saddle stitching apparatus after a print process. This job is called a "saddle stitching job".

A case will be explained in which the print system 1000 having the system configuration shown in FIGS. 9A and 9B processes the saddle stitching job. In this case, the control unit 205 makes job sheets printed by the print apparatus 100 pass through points A, B, and C in FIG. 9B, and causes the saddle stitching apparatus to execute the sheet process. The control unit 205 holds the print result of the saddle stitching job having undergone the sheet process by the saddle stitching apparatus, at the delivery destination Z of the saddle stitching apparatus shown in FIG. 9B without conveying the print result to another apparatus.

The delivery destination Z in FIG. 9B has a plurality of delivery destination candidates. This is because the saddle stitching apparatus of the embodiment can execute a plurality of sheet processes and the delivery destination changes in each sheet process, which will be described with reference to FIG. 13.

A series of control operations executed by the control unit 205 when the print system 1000 has the system configuration in FIGS. 9A and 9B corresponds to a control example (case 3) in FIG. 9B.

As illustrated in FIGS. 8A, 8B, 9A, and 9B, the print system 1000 can flexibly change the connection order of sheet processing apparatuses permitted to be used as inline sheet processing apparatuses under the restrictions. The present invention provides many mechanisms for maximizing the above-described effects of the embodiment.

From this viewpoint, in the embodiment, the print system 1000 can properly employ a configuration other than the system configurations as shown in FIGS. 8A, 8B, 9A, and 9B. An example of this configuration will be explained below.

For example, the system configurations in FIGS. 8A, 8B, 9A, and 9B each comprise three inline type sheet processing apparatuses. In the embodiment, a user can arbitrarily determine the number of inline type sheet processing apparatuses under the restrictions.

For example, the print system 1000 can also adopt the system configuration in FIG. 10A.

Figure 10B:
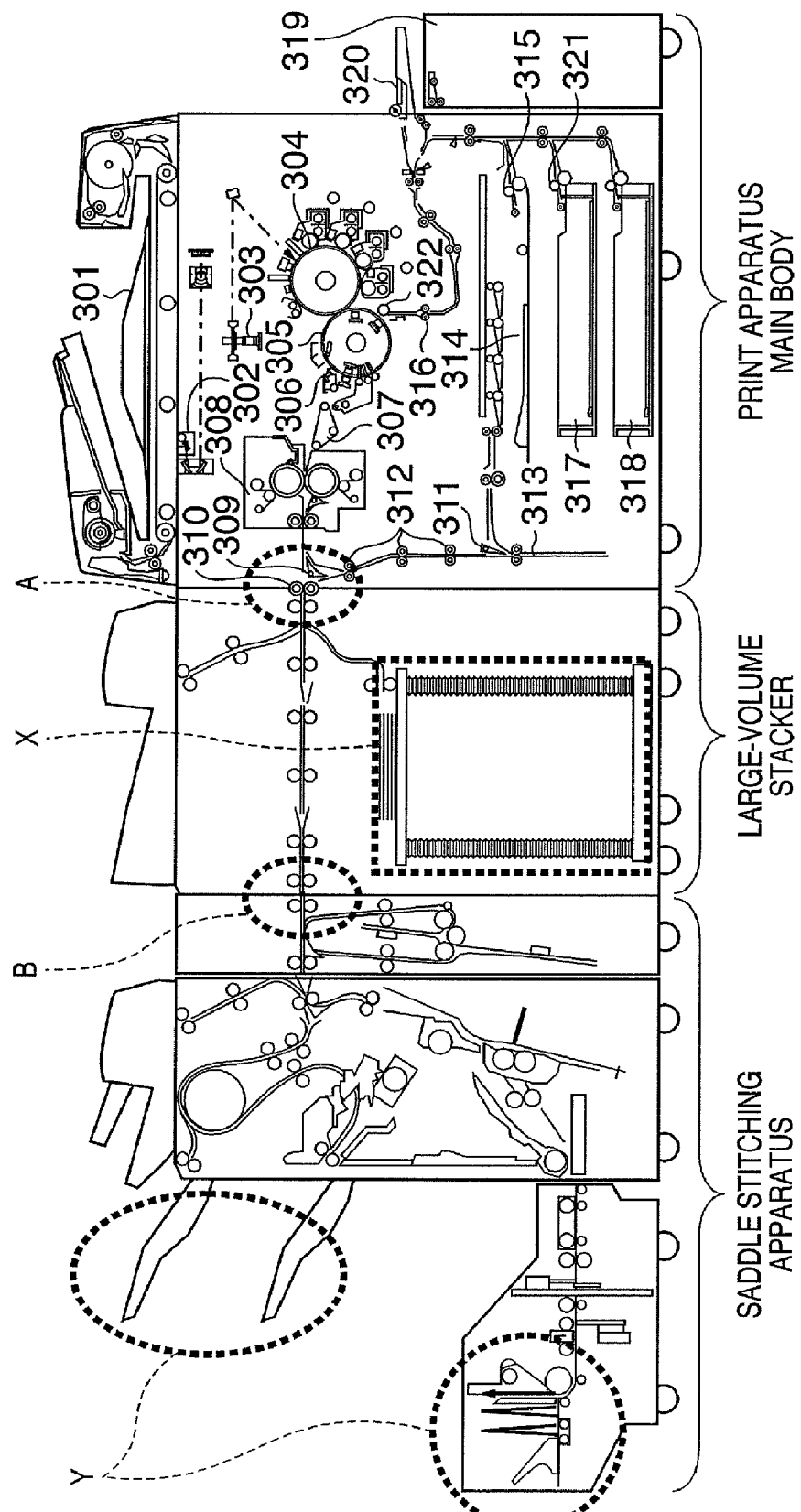
FIG. 10B is a view for explaining the control example of the print system 1000 to be controlled in the embodiment.

The system configuration of FIG. 10A is different from those of FIGS. 8A and 9A in the number of connected sheet processing apparatuses. More specifically, the print system 1000 is built by connecting two sheet processing apparatuses in the order of the print apparatus 100→the large-volume stacker→the saddle stitching apparatus. The internal system configuration in this case is as shown in FIG. 10B.

FIG. 10B is a sectional view of the system configuration of the overall print system 1000 when the print system 1000 has the system configuration in FIG. 10A. The apparatus configuration of FIG. 10B corresponds to that of FIG. 10A.

Similar to the above-described system configuration examples, the internal apparatus configuration in FIG. 10B can also supply a sheet printed by the printer unit 203 of the print apparatus 100 into the respective sheet processing apparatuses. More specifically, as shown in FIG. 10B, the respective sheet processing apparatuses comprise sheet feeding paths capable of feeding a sheet via points A and B in the apparatuses. This system configuration also follows the above restrictions. For example, the sheet processing apparatuses are so connected as to install the saddle stitching apparatus at the most downstream position in the sheet conveyance direction.

For example, when the print system 1000 has the system configuration as shown in FIGS. 10A and 10B on the premise of the above configuration, the control unit 205 executes the following control for a job for which a user issues a print execution request via the UI unit according to the above-described method. A control example called (case 1) in FIG. 10B, a control example called (case 2) in FIG. 10B, and a control example called (inhibition control) in FIG. 10B will be sequentially explained as control examples executed by the control unit 205 for the print system 1000 on condition that the print system 1000 has the system configuration shown in FIGS. 10A and 10B.

The control example (case 1) in FIG. 10B will be described which corresponds to control executed by the control unit 205 for the print system 1000 on condition that the print system 1000 has the system configuration illustrated in FIGS. 10A and 10B. For example, when the print system 1000 has the system configuration in FIGS. 10A and 10B, a target job whose print execution request is accepted from a user requires a sheet process (e.g., a stacking process) by the large-volume stacker after a print process. This job is called a "stacker job".

A case will be explained in which the print system 1000 having the system configuration shown in FIGS. 10A and 10B processes the stacker job. In this case, the control unit 205 makes job sheets printed by the print apparatus 100 pass through point A in FIG. 10B, and causes the large-volume stacker to execute the sheet process. The control unit 205 holds the print result of the stacker job having undergone the sheet process (e.g., the stacking process) by the large-volume stacker, at the delivery destination X inside the large-volume stacker shown in FIG. 10B without conveying the print result to another apparatus (e.g., an inline finisher positioned on the output side of the large-volume stacker in the system of FIG. 10B).

An operator can directly take out, from the delivery destination X, the printed material of the stacker job held at the delivery destination X in FIG. 10B. In other words, this configuration can omit a series of apparatus operations and operator operations to convey sheets to the most downstream delivery destination Y in the sheet conveyance direction in FIG. 10B and take out the printed material of the stacker job from the delivery destination Y.

A series of control operations executed by the control unit 205 when the print system 1000 has the system configuration in FIGS. 10A and 10B corresponds to a control example (case 1) in FIG. 10B.

The control example (case 2) in FIG. 10B will be described which corresponds to control executed by the control unit 205 for the print system 1000 on condition that the print system 1000 has the system configuration illustrated in FIGS. 10A and 10B. For example, when the print system 1000 has the system configuration in FIGS. 10A and 10B, a target job whose print execution request is accepted from a user requires a sheet process (e.g., a saddle stitching process, punching process, cutting process, shift delivery process, or folding process) by the saddle stitching apparatus after a print process. This job is called a "saddle stitching job".

A case will be explained in which the print system 1000 having the system configuration shown in FIGS. 10A and 10B processes the saddle stitching job. In this case, the control unit 205 makes job sheets printed by the print apparatus 100 pass through points A and B in FIG. 10B, and causes the saddle stitching apparatus to execute the sheet process. The control unit 205 holds the print result of the saddle stitching job having undergone the sheet process by the saddle stitching apparatus, at the delivery destination Y of the saddle stitching apparatus shown in FIG. 10B without conveying the print result to another apparatus.

The delivery destination Y in FIG. 10B has a plurality of delivery destination candidates. This is because the saddle stitching apparatus of the embodiment can execute a plurality of sheet processes and the delivery destination changes in each sheet process, which will be described with reference to FIG. 13.

A series of control operations executed by the control unit 205 when the print system 1000 has the system configuration in FIGS. 10A and 10B corresponds to a control example (case 2) in FIG. 10B.

In the system configuration of FIGS. 10A and 10B, the control unit 205 inhibits acceptance of a user request to execute a sheet process (e.g., a case binding process or pad binding process) by the glue binding apparatus. This control is (inhibition control) in FIG. 10B which corresponds to control executed by the control unit 205 for the print system 1000 on condition that the print system 1000 has the system configuration illustrated in FIGS. 10A and 10B. A more detailed example of (inhibition control) in FIG. 10B will be described.

For example, when the print system has the system configuration as in FIGS. 10A and 10B, the UI unit executes the display in FIG. 7 under the control of the control unit 205 so as to hatch or gray out the keys 707 and 708. In other words, the control unit 205 invalidates user operations to the keys 707 and 708.

When the print system 1000 has the system configuration as shown in FIGS. 10A and 10B, as described above, the control unit 205 inhibits the print system 1000 from executing the glue binding process.

Control executed by the control unit 205 when the print system 1000 has the system configuration in FIGS. 10A and 10B corresponds to (inhibition control) in FIG. 10B.

As described above, the control unit 205 executes various control examples depending on the number of connected inline type sheet processing apparatuses in the print system 1000. That is, the control unit 205 executes various control examples corresponding to sheet process types executable by the print system 1000.

As is apparent from the description of FIGS. 8A to 10B and the like, the control unit of the print system 1000 causes the print system 1000 to execute various control examples corresponding to system configuration statuses (the number of connected inline sheet processing apparatuses and the connection order) of the print system 1000.

The embodiment flexibly changes the connection order of inline sheet processing apparatuses and the number of connected inline sheet processing apparatuses in the print system 1000 so as to meet user needs because the embodiment considers all user merits.

The reason why each inline type sheet processing apparatus permitted to be used in the print system 1000 is an independent housing and is detachable from the print apparatus will be described.

As one reason, this mechanism considers a company or the like which does not require any case binding process but wants to perform a large-volume stacking process, as a POD company which is the delivery destination of the print system 1000.

In the system use environment, a need to implement all the nine sheet processes by inline sheet processing apparatuses is expected. A need to implement only a specific sheet process by an inline sheet processing apparatus may also arise. The embodiment provides a mechanism coping with various needs from respective POD companies serving as delivery destinations.

The reason why inline type sheet processing apparatuses permitted to be used in the print system 1000 can be arbitrarily changed in connection order and combined under the restrictions will be explained. This reason is also a reason for setting a delivery destination at which an operator can take out a printed material from each inline sheet processing apparatus, as shown in FIGS. 8A, 8B, 9A, and 9B.

As one reason, user friendliness of the print system 1000 improves by flexibly building the system in accordance with the use frequencies of sheet processes requested in the print system 1000.

For example, a POD company having the POD system 10000 in FIG. 1 tends to receive a relatively large number of print jobs requiring a case binding process for a user manual, guidebook, and the like, as print form needs from customers. In this use environment, it is more convenient to build the print system 1000 not in the connection order as shown in FIGS. 8A and 8B but in the connection order as shown in FIGS. 9A and 9B.

In other words, it is more convenient to connect the glue binding apparatus at a portion closer to the print apparatus 100. This is because a shorter sheet conveyance distance in the apparatus necessary to execute a case binding process for a case binding job is effective.

For example, as the sheet conveyance distance is longer, the time taken to complete a printed material as the final product of the job is longer. As the sheet conveyance distance is longer, the jam generation rate in the apparatus during a sheet conveyance operation is likely to be higher. These are reasons for the flexible connection order.

For a POD company which receives many case binding jobs as user needs, not the system configuration of FIGS. 8A and 8B but that of FIGS. 9A and 9B can shorten the sheet conveyance distance necessary to create a printed material of a case binding job, and allows quickly taking out the printed material.

Assume that another POD company tends to receive many jobs requiring large-volume sheet stacking. For this POD company, not the system configuration of FIGS. 9A and 9B but that of FIGS. 8A and 8B can shorten the sheet conveyance distance necessary to create a printed material of a stacker job, and allows quickly taking out the printed material.

In this fashion, the embodiment pays attention to an increase in productivity of jobs in the print system 1000 with an efficient, flexible system configuration suited to the use environment. In addition, the embodiment can provide many mechanisms which provide friendliness to a user who utilizes the print system 1000.

Concrete examples of the internal structures of various inline type sheet processing apparatuses available in the print system 1000 illustrated in FIGS. 8A to 10B will be described for each sheet processing apparatus.

[Internal Structure of Large-Volume Stacker]

Figure 11:
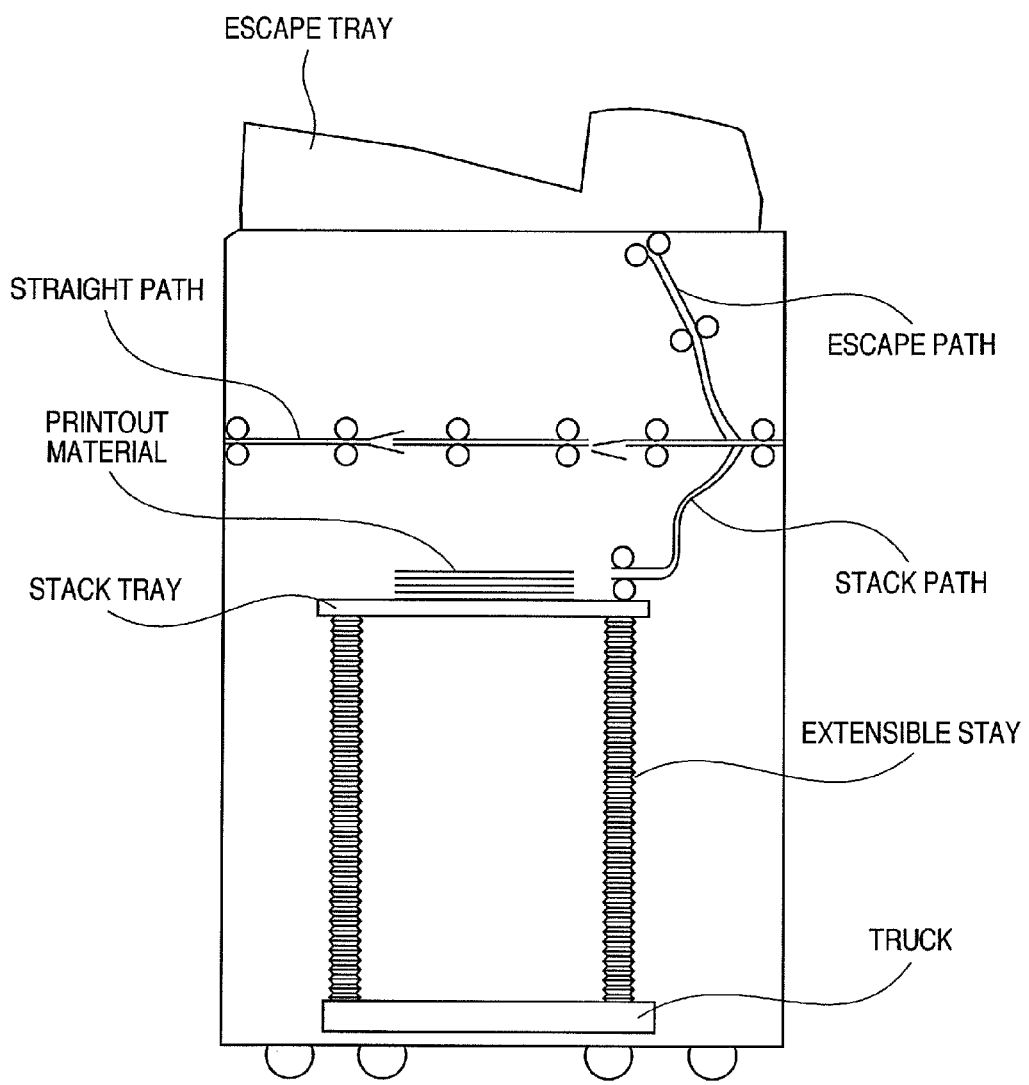
FIG. 11 is a sectional view for explaining an example of the internal structure of an inline finisher to be controlled in the embodiment.

FIG. 11 is a sectional view showing an example of the internal structure of the large-volume stacker in FIGS. 8A to 10B controlled by the control unit 205 in the embodiment.

In the large-volume stacker, the sheet feeding path extending from the print apparatus 100 is roughly divided into three: a straight path, escape path, and stack path, as shown in FIG. 11. The large-volume stacker incorporates these three sheet feeding paths.

Figure 12:
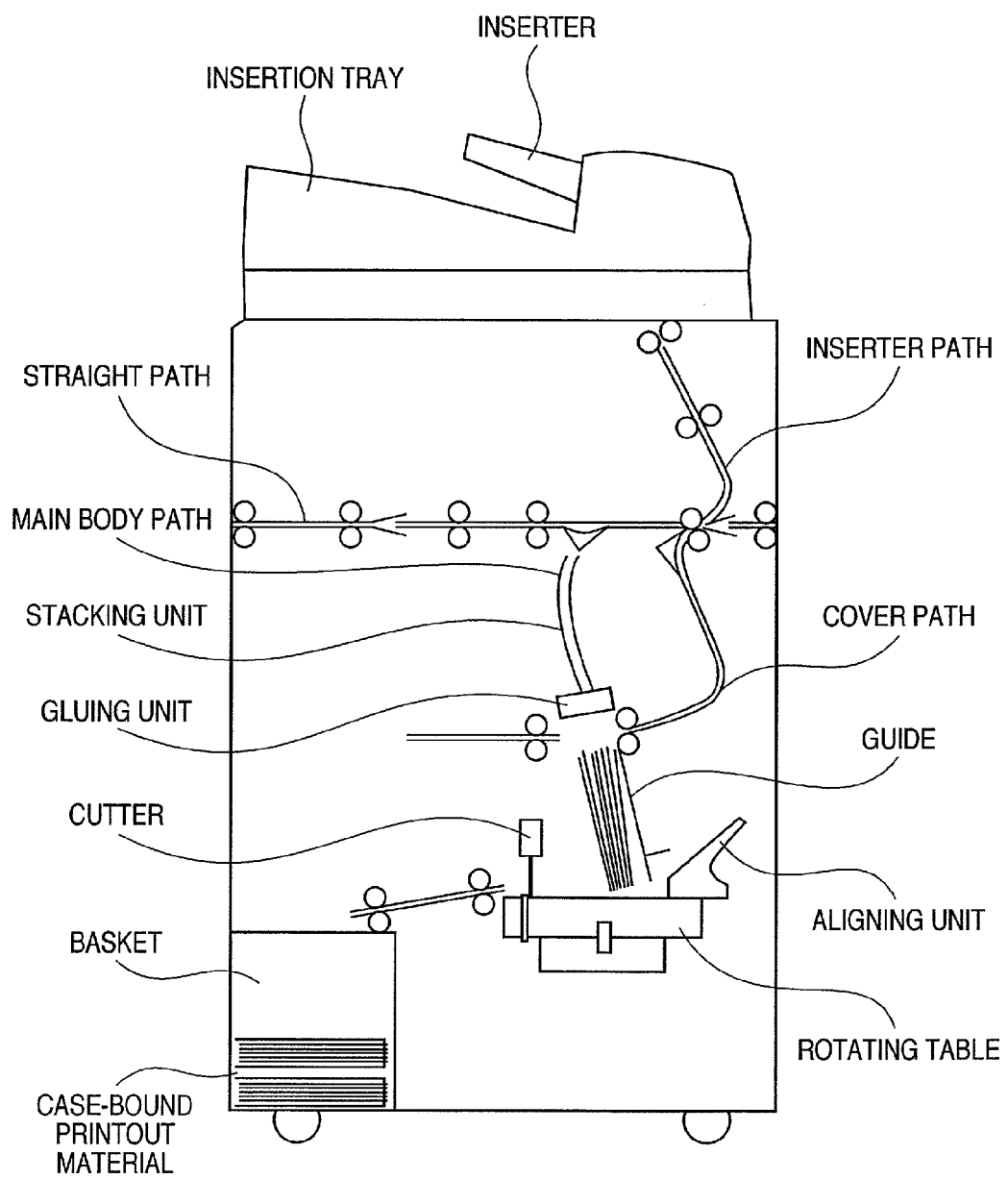
FIG. 12 is a sectional view for explaining an example of the internal structure of an inline finisher to be controlled in the embodiment.

The straight path of the large-volume stacker in FIG. 11 and that of the glue binding apparatus in FIG. 12 function to transfer sheets received from a preceding apparatus to a succeeding apparatus, and are also called through paths in inline sheet processing apparatuses in this example.

The straight path in the large-volume stacker is a sheet feeding path for transferring, to a succeeding apparatus, sheets of a job requiring no sheet stacking process by the stacking unit of the stacker. In other words, the straight path is a unit for conveying sheets of a job requiring no sheet process by the sheet processing apparatus from an upstream apparatus to a downstream apparatus.

The escape path in the large-volume stacker is used to output sheets without stacking them. For example, when no succeeding sheet processing apparatus is connected, a printed material is conveyed to the escape path and taken out from the stack tray so as to quickly take out the printed material from the stack tray for the purpose of output confirmation work (proof print) or the like.

The sheet feeding path in the large-volume stacker comprises a plurality of sheet sensors necessary to detect the sheet conveyance status and jam.

The CPU (not shown) of the large-volume stacker notifies the control unit 205 of sheet detection information from each sensor via a signal line (signal line shown in FIG. 2 for electrically connecting the sheet processing apparatus 200 and control unit 205) for communicating data with the control unit 205. On the basis of the information from the large-volume stacker, the control unit 205 grasps the sheet conveyance status and jam in the large-volume stacker. When the print system is configured by cascade-connecting another sheet processing apparatus between the large-volume stacker and the print apparatus 100, the CPU of the large-volume stacker notifies the control unit 205 via the CPU of the sheet processing apparatus of sensor information of the large-volume stacker. As described above, the large-volume stacker comprises an arrangement unique to an inline finisher.

The stack path in the large-volume stacker is a sheet feeding path for causing the large-volume stacker to stack sheets of a job requiring a sheet stacking process by the stacking unit of the stacker.

For example, the print system 1000 comprises the large-volume stacker shown in FIGS. 8A to 10B. In this system configuration status, the control unit 205 accepts a request from a user via the UI unit by a key operation to the key 709 in the display of FIG. 7 to execute a sheet stacking process executable by the stacker for a target job. The control unit 205 controls to convey sheets to the stack path of the large-volume stacker. The sheets conveyed to the stack path are delivered to the stack tray.

The stack tray in FIG. 11 is a stacking unit mounted on an extensible stay. A shock absorber or the like is attached to the joint between the stay and the stack tray. The control unit 205 controls the large-volume stacker to stack printed sheets of a target job using the stack tray. A truck supports the extensible stay from below it. When attaching a handle (not shown) to the truck, the truck can carry stacked outputs on it to another offline finisher.

When the front door of the stacker unit is kept closed, the extensible stay moves up to a position where outputs are easily stacked. If an operator opens the front door (or issues an opening instruction), the stack tray moves down.

Outputs can be stacked by flat stacking or shift stacking. Flat stacking means always stacking sheets at the same position. Shift stacking means stacking sheets with a shift in a far/near direction every number of copies or jobs so as to divide outputs and easily handle them.

The large-volume stacker permitted to be used as an inline type sheet processing apparatus in the print system 1000 can execute a plurality of stacking methods when stacking sheets from the printer unit 203. The control unit 205 controls various operations for the stacker.

[Internal Structure of Glue Binding Apparatus]

FIG. 12 is a sectional view showing an example of the internal structure of the glue binding apparatus in FIGS. 8A to 10B controlled by the control unit 205 in the embodiment.

In the glue binding apparatus, the sheet feeding path extending from the print apparatus 100 is roughly divided into three: a straight path, main body path, and cover path, as shown in FIG. 12. The glue binding apparatus incorporates these three sheet feeding paths.

The straight path (through path) of the glue binding apparatus in FIG. 12 is a sheet feeding path functioning to transfer, to a succeeding apparatus, sheets of a job requiring no sheet glue binding process by the glue binding unit of the apparatus. In other words, the straight path is a unit for conveying sheets of a job requiring no sheet process by the sheet processing apparatus from an upstream apparatus to a downstream apparatus.

The sheet feeding path in the glue binding apparatus comprises a plurality of sheet sensors necessary to detect the sheet conveyance status and jam.

The CPU (not shown) of the glue binding apparatus notifies the control unit 205 of sheet detection information from each sensor via a signal line (signal line shown in FIG. 2 for electrically connecting the sheet processing apparatus 200 and control unit 205) for communicating data with the control unit 205. On the basis of the information from the glue binding apparatus, the control unit 205 grasps the sheet conveyance status and jam in the glue binding apparatus. When the print system is configured by cascade-connecting another sheet processing apparatus between the glue binding apparatus and the print apparatus 100, the CPU of the glue binding apparatus notifies the control unit 205 via the CPU of the sheet processing apparatus of sensor information of the glue binding apparatus. In this manner, the glue binding apparatus comprises an arrangement unique to an inline finisher.

The main body path and cover path in the glue binding apparatus in FIG. 12 are sheet feeding paths for creating a case-bound printed material.

For example, according to the embodiment, the printer unit 203 prints the print data of a body by a case binding print process. Printed sheets are used as the body of an output material corresponding to a case-bounded printed material of one bundle. In case binding, a sheet bundle of a body on which print data corresponding to the body (contents) is printed is called a "main body" in this example. A process to wrap the main body with one cover sheet is executed in the case binding process. The control unit 205 executes various sheet conveyance control examples to convey a cover sheet through the cover path, and convey sheets of the main body printed by the printer unit 203 to the main body path.

In this configuration, the control unit 205 accepts a request from a user via the UI unit by a key operation to the key 707 in the display of FIG. 7 to execute a case binding process executable by the glue binding apparatus for a target job. The control unit 205 controls the apparatus as follows.

For example, the control unit 205 sequentially accumulates sheets printed by the printer unit 203 on the stacking unit via the main body path in FIG. 12. After the stacking unit accumulates sheets of all pages on which body data necessary for sheets of one bundle in a job to be processed are printed, the control unit 205 conveys a cover sheet necessary for the job via the cover path.

Case binding has a matter associated with one feature of the embodiment. In a case binding process as an example of a glue binding process in this example, the number of sheets processable as one sheet bundle is much larger than the number of sheets processable as one sheet bundle by a sheet process different from the glue binding process. For example, the case binding process can process a maximum of 200 sheets as one sheet bundle of the body. To the contrary, the stapling process or the like can process a maximum of 20 print sheets as one sheet bundle, and the saddle stitching process can process a maximum of 15 print sheets. The allowable number of print sheets to be processed as one sheet bundle is greatly different between the glue binding process and other sheet processes.

In the embodiment, the control unit 205 can control an inline type sheet processing apparatus to execute the case binding process as a glue binding process. Further, the embodiment can provide new finishing which is not requested in the office environment and is executable by an inline type sheet processing apparatus. In other words, the above arrangement is one mechanism assuming the POD environment, and is associated with control to be described later.

Case binding can use a cover data pre-printed sheet conveyed from the inserter tray of the inserter of the glue binding apparatus, as shown in FIG. 12. Case binding can also use a sheet bearing a cover image printed by the print apparatus 100. Either sheet is conveyed as a cover sheet to the cover path. Conveyance of the cover sheet is suspended below the stacking unit.

In parallel with this operation, the glue binding apparatus executes a gluing process for a main body of sheets which bear all the pages of the body and are stacked on the stacking unit. For example, the gluing unit applies a predetermined amount of glue to the lower portion of the main body. After the glue spreads sufficiently, the pasted portion of the main body is attached to the center of the cover, covered, and joined. In joining, the main body is pushed down, and the covered main body slides onto a rotating table along the guide. The guide moves so that the covered main body falls onto the rotating table.

The aligning unit aligns the covered main body laid on the rotating table, and the cutter cuts an edge. The rotating table rotates through 90°, the aligning unit aligns the main body, and the cutter cuts the top edge. The rotating table rotates through 180°, the aligning unit aligns the main body, and the cutter cuts the tail edge.

After cutting, the aligning unit pushes the main body to an inner portion, putting the completed covered main body into a basket.

After the glue is satisfactorily dried in the basket, an operator can take out the completed case-bound bundle.

The glue binding apparatus comprises a gluing unit which executes a glue binding process for sheets of a target job for which a user issues a glue binding process execution request together with a print execution request via the UI unit.

As described above with reference to the configuration, the glue binding process executable by an inline type sheet processing apparatus in the embodiment has many process steps and many preparations, compared to other sheet processes. In other words, the glue binding process is different in configuration from sheet processes such as stapling and saddle stitching often used in the office environment. The process time taken to complete a requested sheet process is likely to be longer than those of other finishing processes. The embodiment pays attention to this point.

As is apparent from merely the glue binding function, the embodiment adopts a mechanism which applies not only to the office environment but also to a new printing environment such as the POD environment, provides user friendliness and productivity, and puts a print system and product into practical use. For example, new functions such as the case binding function and large-volume stacking function which are not supported in the office environment are provided as constituent features available even in the POD environment. As illustrated in FIGS. 8A to 10B, system configurations capable of connecting a plurality of inline type sheet processing apparatuses are also mechanisms for achieving this purpose. It should be noted that the embodiment not only provides the above-described new functions and system configurations, but also finds out and examines problems to be tackled, such as use cases and user needs assumed in the use of the function configurations. One feature is to provide constituent features serving as solutions to the problems. In this way, the embodiment finds out and examines in advance market demands and the like as problems to newly equipped functions and system configurations, and employs mechanisms as configurations considering solutions to the problems when an office-equipment maker finds and enters a new market. This is also one feature of the embodiment. As an example of the constituent features, the control unit 205 executes various control examples in the embodiment.

[Internal Structure of Saddle Stitching Apparatus]

Figure 13:
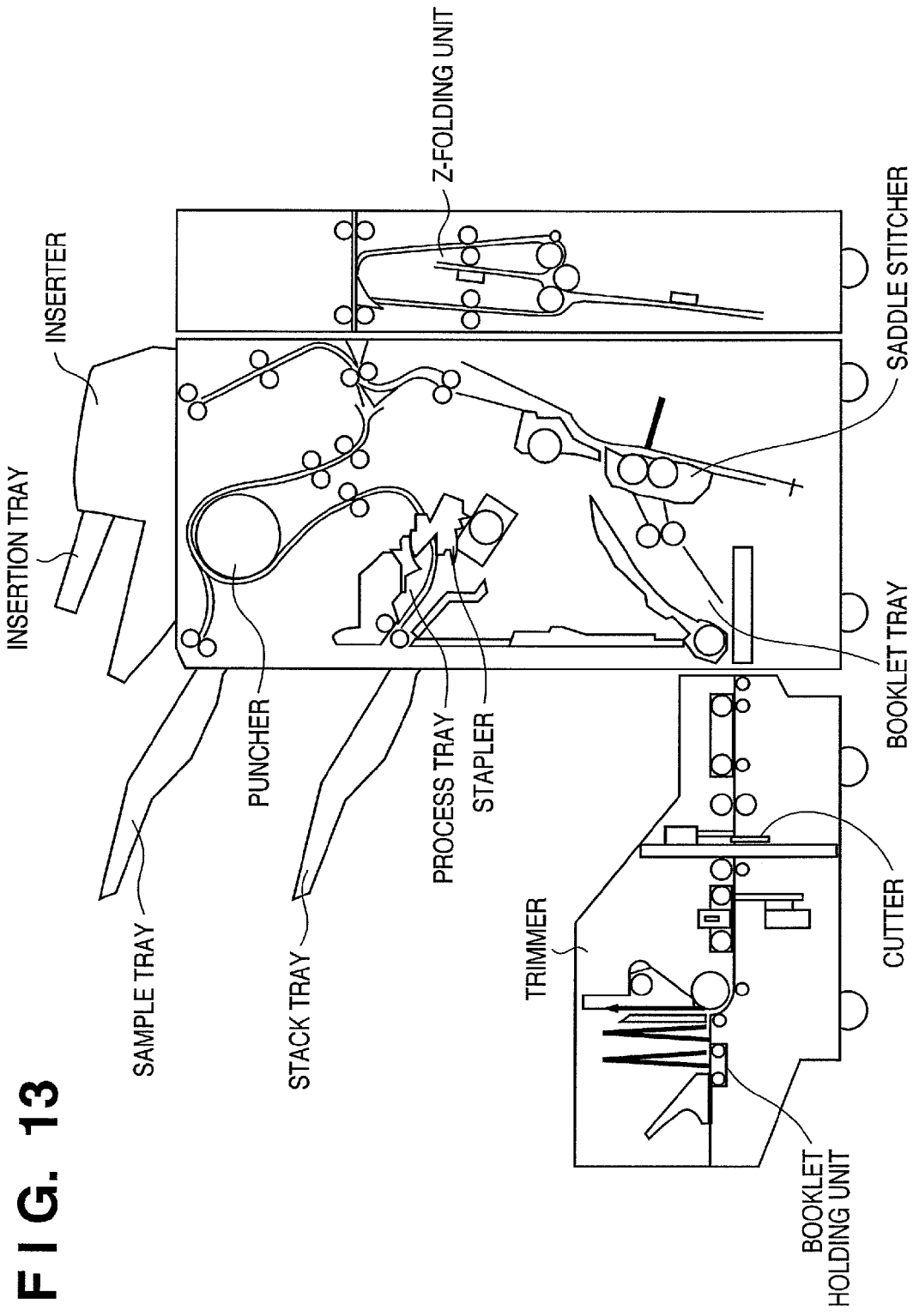
FIG. 13 is a sectional view for explaining an example of the internal structure of an inline finisher to be controlled in the embodiment.

FIG. 13 is a sectional view showing an example of the internal structure of the saddle stitching apparatus in FIGS. 8A to 10B controlled by the control unit 205 in the embodiment.

The saddle stitching apparatus incorporates various units for selectively executing a stapling process, cutting process, punching process, folding process, shift delivery process, and the like for sheets from the print apparatus 100. As described in the restrictions, the saddle stitching apparatus does not have a through path serving as the function of conveying sheets to a succeeding apparatus.

The sheet feeding path in the saddle stitching apparatus comprises a plurality of sheet sensors necessary to detect the sheet conveyance status and jam.

The CPU (not shown) of the saddle stitching apparatus notifies the control unit 205 of sheet detection information from each sensor via a signal line (signal line shown in FIG. 2 for electrically connecting the sheet processing apparatus 200 and control unit 205) for communicating data with the control unit 205. On the basis of the information from the saddle stitching apparatus, the control unit 205 grasps the sheet conveyance status and jam in the saddle stitching apparatus. When the print system is configured by cascade-connecting another sheet processing apparatus between the saddle stitching apparatus and the print apparatus 100, the CPU of the saddle stitching apparatus notifies the control unit 205 via the CPU in the sheet processing apparatus of sensor information of the saddle stitching apparatus. The saddle stitching apparatus comprises an arrangement unique to an inline finisher.

As shown in FIG. 13, the saddle stitching apparatus comprises a sample tray, stack tray, and booklet tray. The control unit 205 controls to switch the unit for use in accordance with the job type and the number of discharged print sheets.

For example, the control unit 205 accepts, from a user via the UI unit by a key operation to the key 701 in the display of FIG. 7, a request to execute a stapling process by the saddle stitching apparatus for a target job. The control unit 205 controls to convey sheets from the printer unit 203 to the stack tray. Before discharging print sheets to the stack tray, they are sequentially accumulated on the process tray in the saddle stitcher for each job, and bound by a stapler on the process tray to discharge the print sheet bundle onto the stack tray. According to this method, the control unit 205 causes the saddle stitching apparatus to staple sheets printed by the printer unit 203.

The saddle stitching apparatus further comprises a Z-folding unit for folding a sheet in three (Z shape), and a puncher for forming two (or three) holes for filing. The saddle stitching apparatus executes a process corresponding to each job type. For example, when the user sets the Z-folding process via the operation unit as a setting associated with a print sheet process for a job to be output, the control unit 205 controls the Z-folding unit to fold print sheets of the job. Then, the control unit 205 controls to make the print sheets pass through the apparatus, and deliver them onto a discharge tray such as the stack tray or sample tray. For example, when the user sets the punching process via the operation unit as a setting associated with a print sheet process for a job to be output, the control unit 205 controls the puncher to punch print sheets of the job. Then, the control unit 205 controls to make the print sheets pass through the apparatus, and deliver them onto a discharge tray such as the stack tray or sample tray.

The saddle stitcher performs a saddle stitching process to bind print sheets at two center portions, pinch the print sheets at their center by rollers, fold them in half, and create a booklet like a pamphlet.

Print sheets bound by the saddle stitcher are discharged onto the booklet tray. Whether a print sheet process operation such as a bookbinding process by the saddle stitcher is executable is also based on print sheet process settings made by the user for a job to be output.

The inserter sends print sheets set on the inserter tray to a discharge tray such as the stack tray or sample tray without supplying the print sheets to the printer. The inserter can insert a print sheet set on the inserter between print sheets (sheets printed by the printer unit) sent into the saddle stitcher. The user sets print sheets on the inserter tray of the inserter while the print sheets face up. The pickup roller sequentially feeds print sheets from the top. A print sheet from the inserter is directly conveyed to the stack tray or sample tray, and discharged while facing down. To send a print sheet to the saddle stitcher, the print sheet is fed to the puncher once, and then switched back and fed to adjust the face orientation.

Whether a print sheet process operation such as a print sheet insertion process by the inserter is executable is also based on print sheet process settings made by the user for a job to be output.

In the embodiment, for example, the saddle stitching apparatus also incorporates a cutter (trimmer), which will be described below.

A (saddle-stitched) booklet output from the saddle stitcher enters the trimmer. At this time, the booklet output is fed by a predetermined length by the roller, and cut by a predetermined length by the cutter to align uneven edges between pages of the booklet. The resultant booklet is stored in a booklet holding unit. Whether a print sheet process operation such as a cutting process by the trimmer is executable is also based on print sheet process settings made by the user for a job to be output.

As described above, the saddle stitching apparatus comprises a saddle stitcher which executes a saddle stitching process for sheets of a target job for which a user issues a saddle stitching process execution request together with a print execution request via the UI unit.

Figure 14:
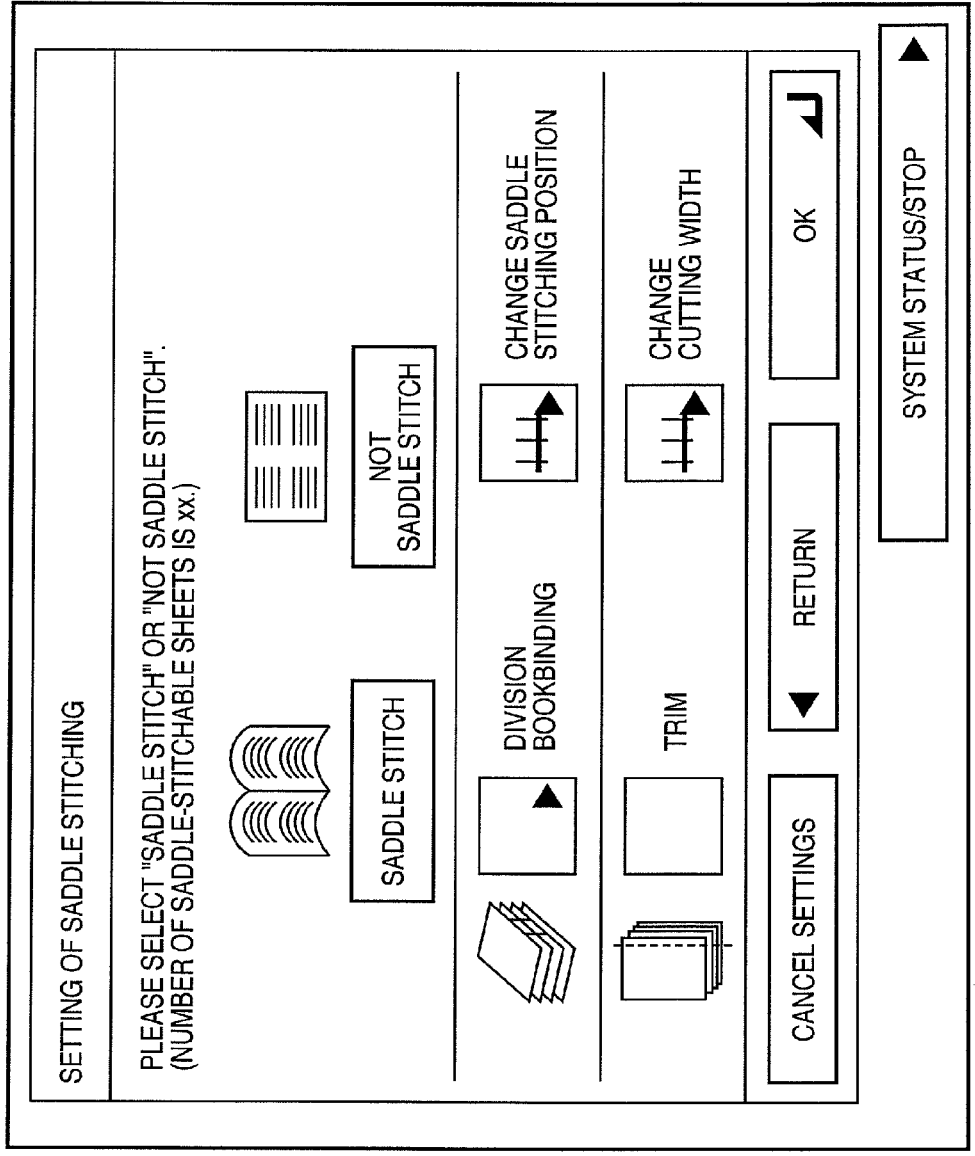
FIG. 14 is a view for explaining an example of display control on the UI unit to be controlled in the embodiment.

For example, when a user selects saddle stitching with the key 705 in the display of FIG. 7, the control unit 205 causes the UI unit to execute a display in FIG. 14. The control unit 205 controls to accept detailed settings of saddle stitching via the display in FIG. 14. For example, the control unit 205 determines whether to actually saddle-stitch sheets near their center with staples. The control unit 205 can also accept a setting such as division bookbinding, change of the saddle stitching position, execution/non-execution of cutting, or change of the cutting width from the user.

Assume that the user sets "saddle-stitch" and "cut" via the display in FIG. 14 executed by the UI unit under the control of the control unit 205. In this case, the control unit 205 controls the operation of the print system 1000 to form a target job into a print style as shown in FIG. 15 as the print result of saddle stitching. As represented by the print result of saddle stitching in FIG. 15, saddle stitches are put, and the edge is cut. By setting the positions of the saddle stitch and cutting edge in advance, they can be changed to desired positions.

Figure 16:
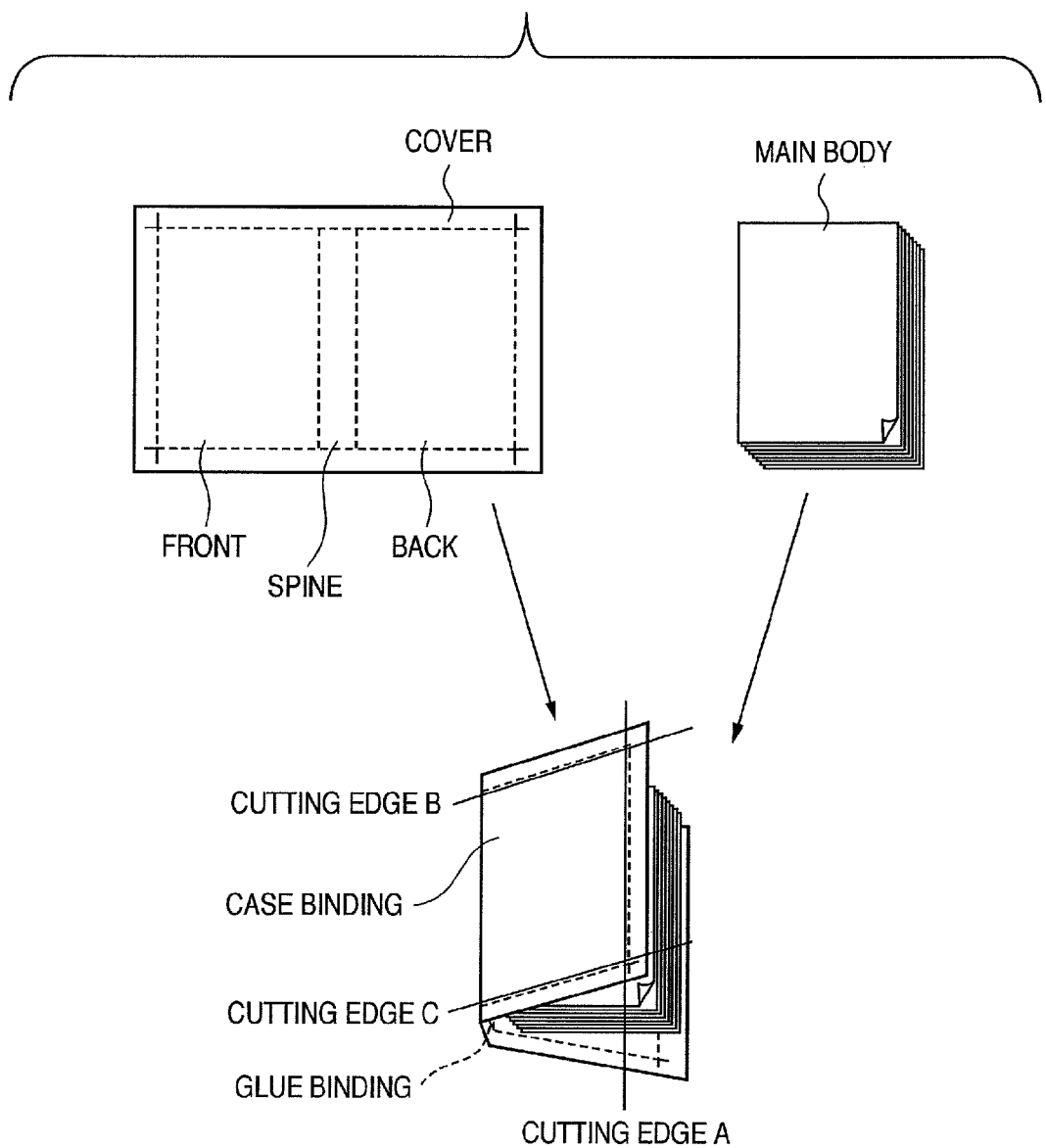
FIG. 16 is a view for explaining a control example when the print system 1000 to be controlled in the embodiment creates a printed material.

When the user requests execution of a case binding process with the key 707 in the display of FIG. 7, the control unit 205 controls the print system 1000 so as to form a target job into a print style as shown in FIG. 16 as the print result of case binding. As represented by the example in FIG. 16, the cutting widths of cutting edges A, B, and C can be set for a printed material subjected to case binding.

The print system 1000 can accept a target job print execution request and sheet process execution request even from an information processing apparatus serving as an example of an external apparatus. An example when a host computer uses the print system 1000 will be described.

For example, the print system 1000 is controlled as follows when operated by a host computer (e.g., the PC 103 or 104 in FIG. 1) which downloads program data for various processes and control examples in the embodiment from a data supply source (e.g., a WEB) or a specific storage medium. The control entity is the control unit of the PC.

Assume that an instruction to activate a printer driver for operating the print apparatus 100 of the print system 1000 is issued in response to a mouse or keyboard operation by a user. In response to the instruction, the CPU of the host computer displays a print setup window shown in FIG. 17A on the display unit of the host computer. FIGS. 17A and 17B are views showing examples of user interface windows controlled in the embodiment.

For example, the user presses a finishing key 1701 with the mouse on the operation window of FIG. 17A or 17B. Then, the CPU of the host computer controls the display unit to switch the print setup window to one as shown in FIG. 17B.

The CPU of the host computer allows the user to select a sheet process type to be executed by the inline type sheet processing apparatus 200 of the print system 1000 via the sheet process setting item 1702 on the print setup window of FIG. 17A or 17B.

Although not shown, the external apparatus including the host computer displays, as windows other than those in FIGS. 17A and 17B, display windows capable of inputting instructions equivalent to those inputtable via various display windows described in detail in the embodiment. In other words, the external apparatus can execute the same processes and control examples as those described in the embodiment.

The user selects a desired sheet process via the setting item 1702, and returns to the window in FIG. 17A or 17B to press the OK key.

In response to this, the CPU of the host computer associates, as one job, commands representing various printing conditions set by the user via the print setup window with a series of data to be printed by the printer unit 203, and transmits the job to the print system 1000 via the network 101.

After the external I/F unit 202 of the print system 1000 receives the job from the computer, the control unit 205 of the system controls the print system 1000 to process the job from the host computer on the basis of process components set by the user on the host computer.

The above configuration can obtain various effects described in the embodiment even for a job from an external apparatus or the like, and can further increase the use efficiency of the print system 1000.

The control unit of the print system 1000 according to the embodiment executes various control examples to be described below on the premise of the above-described constituent features.

The configurations described with reference to FIGS. 1 to 17B correspond to constituent features common to all examples in the embodiment. For example, various control examples described in the embodiment correspond to constituent features based on these configurations.

As described with reference to FIGS. 1 to 17B, the print system 1000 according to the embodiment can construct a printing environment suitable not only for the office environment but also for the POD environment.

For example, the print system 1000 employs a mechanism capable of coping with use cases and user needs which are assumed not in the office environment but in the POD environment.

For example, a POD company can receive orders of various print forms from customers in the POD environment.

More specifically, an inline sheet processing apparatus can implement finishing (e.g., a glue binding process or large-volume stacking process) which is not requested as a user need in the office environment. In other words, the embodiment can deal with even user needs other than needs (e.g., for stapling) in the office environment in consideration of the POD environment. For example, the print system 1000 can flexibly cope with the business form of a POD company which does business in the POD environment where the print system 1000 is delivered. For example, a plurality of inline sheet processing apparatuses are connectable to the print apparatus 100, and each inline sheet processing apparatus can independently operate as an independent housing, as described above. The number of connected sheet processing apparatuses is arbitrary, and the print system 1000 can flexibly add or change an inline sheet processing apparatus.

The embodiment designs the print system 1000 while paying attention to the operability of the user of the print system 1000. For example, the embodiment allows an operator to manually register the system configuration of the print system 1000 in the HDD 209. This configuration will be exemplified.

For example, a POD company wants to build the system configuration shown in FIGS. 8A and 8B as the system configuration of the print system 1000. In this case, the operator of the POD company connects three sheet processing apparatuses in FIGS. 8A and 8B purchased together with the print apparatus 100 to the print apparatus in the connection order shown in FIGS. 8A and 8B. Then, the operator presses the user mode key 505 of the operation unit 204. In response to this key operation, the control unit 205 causes the display unit 401 to execute a display in FIG. 18A.

Figure 18A:
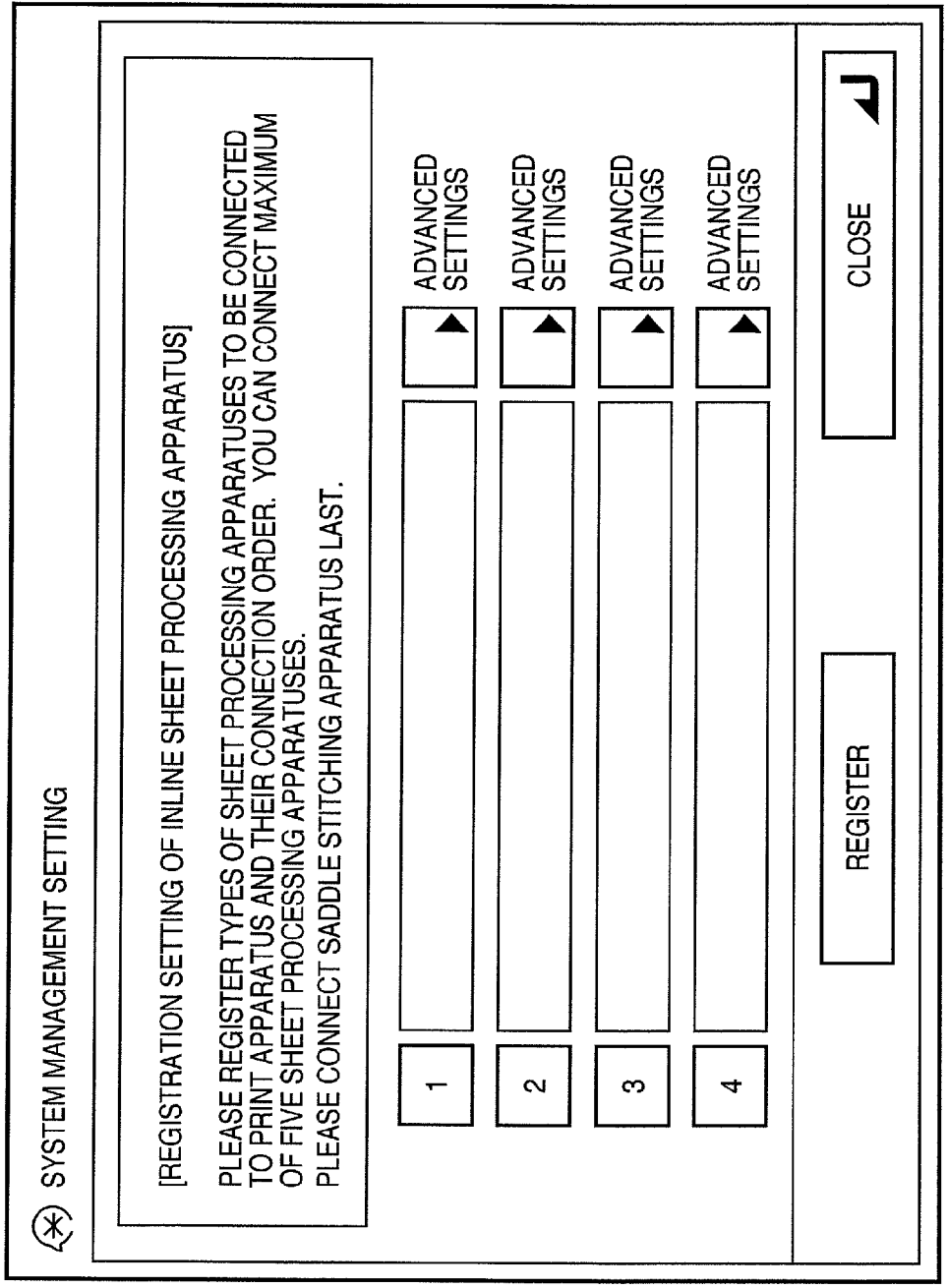
FIG. 18A is a view for explaining an example of display control on the UI unit to be controlled in the embodiment.

The display in FIG. 18A allows the operator to manually input system configuration information of the print system 1000. The control unit 205 allows the operator via displays in FIGS. 18A to 18D to determine the types of inline type sheet processing apparatuses to be connected to the print apparatus 100. In addition, the control unit 205 allows the operator via the displays in FIGS. 18A to 18D to determine the connection order of inline type sheet processing apparatuses to be connected to the print apparatus 100. If the operator presses an "advanced settings" key set for each setting item in the display of FIG. 18A, the control unit 205 displays a window (not shown). This window enables specifying sheet processing apparatuses used in the print system one by one. In the embodiment, since the print system follows the above-mentioned restrictions, the control unit 205 also notifies the operator of this information as guidance information. For example, the control unit 205 notifies the operator of a guidance "please register the types of sheet processing apparatuses to be connected to the print apparatus, and their connection order. You can connect a maximum of five apparatuses. Please connect a saddle stitching apparatus as a last apparatus." In this case, the maximum number of connected inline sheet processing apparatuses is five, but is not limited to this.

The control unit 205 controls the display unit 401 to determine sheet processing apparatuses for use one by one from the top setting item in FIG. 18A. The control unit 205 determines that the setting order itself from the top setting item is an actual apparatus connection order.

In this configuration, when the print system 1000 has the system configuration shown in FIGS. 8A and 8B, the control unit 205 prompts the operator to register the types of sheet processing apparatuses and their connection order, like the display in FIG. 18B. More specifically, the control unit 205 prompts the operator to set "large-volume stacker→glue binding apparatus→saddle stitching apparatus" sequentially from the top setting item, like the display in FIG. 18B. The control unit 205 determines that this setting order is an actual connection order, as shown in FIGS. 8A and 8B.

Figure 18C:
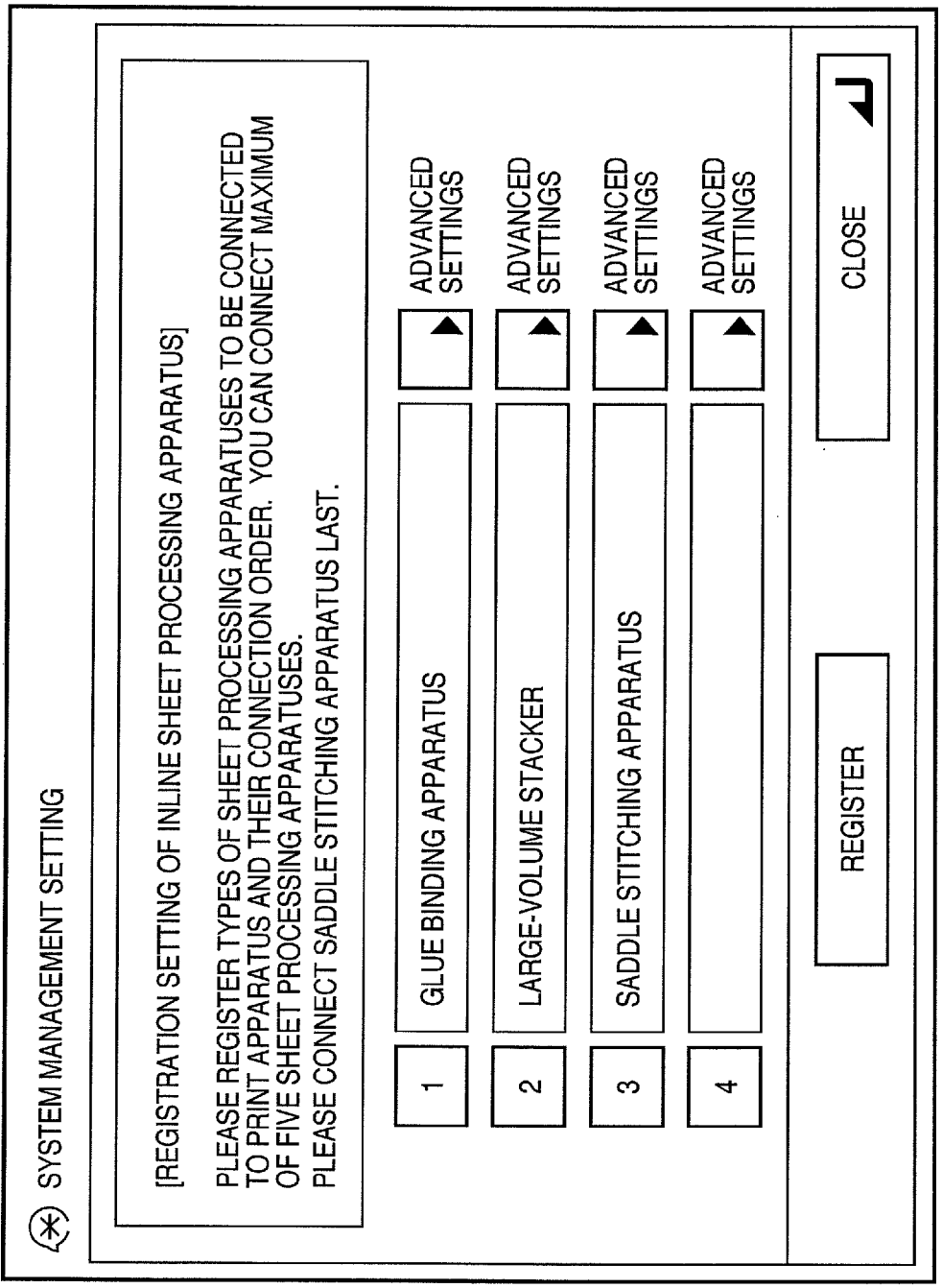
FIG. 18C is a view for explaining an example of display control on the UI unit to be controlled in the embodiment.
Figure 24:
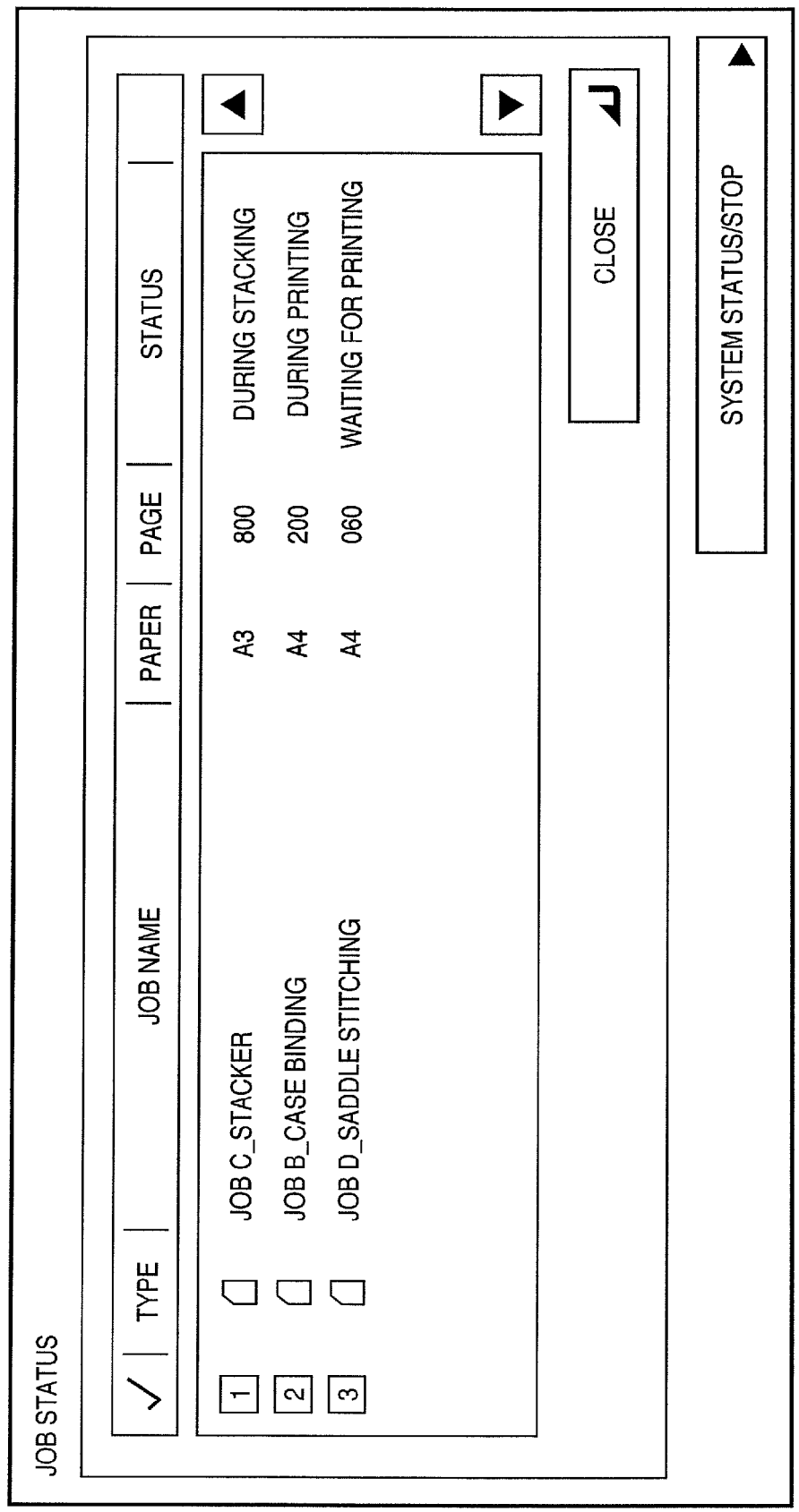
FIG. 24 is a view for explaining an example of display control on the UI unit to be controlled in the embodiment.

When the print system 1000 has the system configuration shown in FIGS. 9A and 9B, the control unit 205 prompts the operator to register the types of sheet processing apparatuses and their connection order, like the display in FIG. 18C. More specifically, the control unit 205 prompts the operator to set "glue binding apparatus→large-volume stacker→saddle stitching apparatus" sequentially from the top setting item, like the display in FIG. 18C. The control unit 205 determines that this setting order is an actual connection order, as shown in FIGS. 9A and 9B.

When the print system 1000 has the system configuration shown in FIGS. 10A and 10B, the control unit 205 prompts the operator to register the types of sheet processing apparatuses and their connection order, like the display in FIG. 18D. More specifically, the control unit 205 prompts the operator to set "large-volume stacker→saddle stitching apparatus" sequentially from the top setting item, like the display in FIG. 18D. The control unit 205 determines that this setting order is an actual connection order, as shown in FIGS. 10A and 10B.

This UI control to improve user friendliness assuming use cases on site is also one feature of the embodiment.

As described with reference to FIGS. 1 to 18D, the print system 1000 comprises various mechanisms toward practical use of a product capable of flexibly coping with various use cases and user needs in the POD environment and the like that are different from user needs in the office environment.

The print system 1000 does not merely have new functions and new configurations as described above. To maximize the effects of the print system 1000, the print system 1000 can execute various control examples as follows.

For example, the control unit of the print system causes the print system 1000 to execute the following control.

This control is a constituent feature corresponding to a concrete solution as to how to process a plurality of jobs accepted by the print system 1000 at high productivity.

In other words, this control is a control example of how to efficiently process a plurality of jobs by the system which copes with various user needs associated with the print style and accepts jobs of various sheet process execution requests in order to enhance the effects even in the POD environment. This control will be explained sequentially.

For example, the control unit of the print system 1000 accepts a plurality of job print execution requests from a user via the UI unit.

For example, when accepting a print start request from the user via the operation unit 204 corresponding to an example of the UI unit, the control unit 205 determines that it has received a request to print print data of a job in the copy mode or box mode.

When the job is in the copy mode, the control unit 205 stores a series of print data of pages to be processed from the scanner unit 201 in the HDD 209 in response to press of the start key 503. The control unit 205 reads out the print data in the page order from the HDD 209, and causes the printer unit 203 to print.

When the job is in the box mode, the control unit 205 receives a series of print data of pages to be processed from the scanner unit 201 or external I/F unit 202 and saves the data in the HDD 209 in advance. When accepting a print start request in the box mode from the user via the operation unit 204, the print data have already been input, and the control unit 205 starts the process from a step of reading out the print data from the HDD 209 and causing the printer unit 203 to print.

A print execution request is acceptable by a method different from the above one.

For example, the user presses the OK key in the display of FIG. 17A or 17B on the display unit of the information processing apparatus (e.g., the PC 103 or 104) in which data of the printer driver of the print apparatus 100 is installed as another example of the UI unit. In this case, when accepting print data of a job to be printed from the apparatus via the external I/F unit 202, the control unit 205 determines that it has received a print execution request. The control unit 205 also causes the printer unit 203 to print the data from the external apparatus via the HDD 209.

On the premise of the above configuration, according to the embodiment, the print system 1000 can process a job for which the user issues a print execution request via the UI unit of the print apparatus 100. The print system 1000 can also process a job for which the user issues a print execution request via the UI unit of the external apparatus, as illustrated in FIGS. 17A and 17B. The printer unit 203 can print print data of jobs input from these data input paths via the HDD 209. The control unit 205 controls the print system 1000 to perform this operation.

As described above, the print system 1000 configured to accept a plurality of jobs can accept, for each job together with a print execution request, a request to execute a sheet process for sheets of the job printed by the printer unit 203.

For example, the control unit 205 causes the operation unit 204 to execute the display in FIG. 7 when accepting a print execution request from a user via the operation unit 204 of the print apparatus 100. In addition, the control unit 205 allows the user to select a sheet process type to be executed for printed sheets as a setting of the job via the display in FIG. 7. After the user selects a desired sheet process type via the display in FIG. 7, the control unit 205 can accept a print start request from the user via the operation unit 204.

As another example, the control unit of an external apparatus causes the UI unit of the external apparatus to execute the displays in FIGS. 17A and 17B when accepting a print execution request from a user via the UI unit. Further, the control unit allows the user to select a sheet process type to be executed for printed sheets as a setting of the job via the displays in FIGS. 17A and 17B. After the user selects a desired sheet process type via the displays in FIGS. 17A and 17B, the control unit 205 can accept a print start request from the user via the UI unit.

In either operation sequence, the control unit can accept various print process conditions for specifying the printing conditions of a print process to be executed, in addition to settings associated with the sheet process. For example, the control unit can accept the settings of printing condition parameters (e.g., the number of copies, sheet size, print layout, and copy ratio) necessary for a print process preceding a sheet process. The control unit executes a print process under the conditions for target print data. The control unit 205 causes the printer unit 203 to execute a print process necessary for a target job under the accepted print process conditions.

By the above method, the control unit 205 controls the print apparatus 100 to sequentially accept a plurality of jobs for which a user issues requests to execute selected sheet processes, together with print execution requests. The control unit 205 controls the HDD 209 to hold data of the jobs (e.g., print process conditions associated with print data and a print process, and finishing setting conditions associated with sheet processes). While the printer unit 203 prints a job, the control unit 205 suspends printing of another job. Upon completion of processing the preceding job, the control unit 205 properly reads out print data of the succeeding standby job from the HDD 209, and causes the printer unit 203 to print. After executing the print process, the control unit 205 causes the inline type sheet processing apparatus 200 to execute a sheet process of a type designated by the user for the job. The control unit 205 executes this job control.

According to this method, assume that the control unit 205 accepts a plurality of job process requests. Assume also that the control unit 205 accepts four jobs whose sheet process execution requests are independently issued.

The following description corresponds to a control example executed by the control unit 205 when the print system 1000 has the system configuration shown in FIGS. 8A and 8B.

Of the four jobs, a job whose print execution request is accepted first via one of the above-mentioned UI units is "job A". A sheet process type to be executed by the sheet processing apparatus 200 for printed sheets of job A is a "case binding process". Job A requiring the case binding process after the print process is called "case binding job A".

A job whose print execution request is accepted via the UI unit immediately after job A is "job B". A sheet process type to be executed by the sheet processing apparatus 200 for printed sheets of job B is a "case binding process", similar to job A. Job B requiring the case binding process after the print process is called "case binding job B".

A job whose print execution request is accepted via the UI unit immediately after job B is "job C". A sheet process type to be executed by the sheet processing apparatus 200 for printed sheets of job C is a "stacking process (stack)", unlike jobs A and B. Job C requiring the large-volume sheet stacking process after the print process is called "stacker job C".

A job whose print execution request is accepted via the UI unit immediately after job C is "job D". A sheet process type to be executed by the sheet processing apparatus 200 for printed sheets of job D is a "saddle stitching process", unlike jobs A to C. Job D requiring the saddle stitching process after the print process is called "saddle stitching job D".

In this configuration, when the print system 1000 has the system configuration in FIGS. 8A and 8B, the control unit 205 controls the following sheet processing apparatuses to execute the sheet processes of the respective jobs.

For example, to process "case binding job A" by the system configuration in FIGS. 8A and 8B, the control unit 205 causes a "case binding apparatus" corresponding to the second inline finisher in FIGS. 8A and 8B to case-bind sheets of job A printed by the printer unit 203. The control unit 205 stacks the printed material (final product) of job A at the delivery destination Y of the case binding apparatus in the system configuration of FIG. 8B. An operator can take out the printed material of job A from the delivery destination Y in FIG. 8B.

Also, to process "case binding job B" by the system configuration in FIGS. 8A and 8B, the control unit 205 causes the "case binding apparatus" corresponding to the second inline finisher in FIGS. 8A and 8B to case-bind sheets of job B printed by the printer unit 203. The control unit 205 stacks the printed material (final product) of job B at the delivery destination Y of the case binding apparatus in the system configuration of FIG. 8B. The operator can take out the printed material of job B from the delivery destination Y in FIG. 8B.

To process "stacker job C" by the system configuration in FIGS. 8A and 8B, the control unit 205 causes a "large-volume stacker" corresponding to the first inline finisher in FIGS. 8A and 8B to stack sheets of job C printed by the printer unit 203. The control unit 205 stacks the printed material (final product) of job C at the delivery destination X of the large-volume stacker in the system configuration of FIG. 8B. The operator can take out the printed material of job C from the delivery destination X in FIG. 8B.

To process "saddle stitching job D" by the system configuration in FIGS. 8A and 8B, the control unit 205 causes a "saddle stitching apparatus" corresponding to the third inline finisher in FIGS. 8A and 8B to saddle-stitch sheets of job D printed by the printer unit 203. The control unit 205 stacks the printed material (final product) of job D at the delivery destination Z of the saddle stitching apparatus in the system configuration of FIG. 8B. The operator can take out the printed material of job D from the delivery destination Z in FIG. 8B.

In the above way, the control unit of the system comprehensively controls the print system 1000 to execute target sheet processes for respective jobs by a plurality of sheet processing apparatuses in the system.

On the premise of these constituent features, the control unit of the print system 1000 causes the UI unit to execute a display for allowing a user to confirm the progresses of jobs processed by the print system 1000.

For example, after the control unit 205 accepts the four jobs, the user presses the system monitor key 617 in the display of FIG. 6 executed by the display unit 401 under the control of the control unit 205. In response to this, the control unit 205 causes the UI unit to execute a display representing the progresses of jobs A to D for which the above-described process conditions are set and print execution requests are issued in the above-described order. For example, the control unit 205 causes the display unit 401 to display job process progress windows illustrated in FIGS. 19, 20, 22 to 25, and 28.

As illustrated in the job process progress windows such as a window 1900 in FIG. 19 and a window 2000 in FIG. 20, the control unit 205 controls the UI unit to explicitly represent the process order of jobs A to D, and notify the user of a sheet process type executed for each job.

A display item "figure" in the job process progress windows illustrated in FIGS. 19, 20, 22 to 25, and 28 is a display constituent component for notifying an operator of the process order of jobs by the print system 1000. A display item "type" in the job process progress windows illustrated in FIGS. 19, 20, 22 to 25, and 28 is a display constituent component for notifying the operator of a job type such as a PDL job or copy job. In addition to these display items, pieces of information such as "job name", "sheet size used for printing", "the number of pages of data to be printed", and "job status" are also displayed as display constituent components in the job process progress windows illustrated in FIGS. 19, 20, 22 to 25, and 28. The display of the window 1900 in FIG. 19 corresponds to an example in which the control unit 205 controls the display unit 401 to notify the operator to process jobs by the print system 1000 in the order of "job A→job B→job C→job D".

More specifically, "case binding job A" is to print a series of 200-page print data on A4-size sheets. "Case binding job B" is also to print a series of 200-page print data on A4-size sheets. "Stacker job C" is to print a series of 800-page print data on A3-size sheets. "Saddle stitching job D" is to print a series of 60-page print data on A4-size sheets.

Both jobs A and B require a case binding process. In executing the case binding process, print data of the main body can be processed by double-sided printing. Hence, the number of print sheets of the body necessary to bind one bundle is 200 pages/2=100 sheets.

Job C has a single-sided print setting. The number of print sheets necessary to execute a sheet process for one bundle by job C is 800 pages/1=800 sheets. In other words, job C requires stacking of as large as 800 sheets. To process even a job requiring the large-volume sheet stacking process, the print system 1000 utilizes the large-volume stacker as an inline finisher, which is also a feature of the embodiment.

Since job D is a saddle stitching print job, images of four pages are laid out on the obverse and reverse of one sheet. The number of print sheets necessary to execute a sheet process for one bundle by job D is 60 pages/4=15 sheets.

Since jobs A and B require a case binding process, one cover sheet is added to the number of body sheets of one bundle in a sheet process for one bundle. Strictly speaking, jobs A and B each require 100 body print sheets+one cover sheet=101 sheets.

As described above, the control unit 205 permits the print system 1000 to process jobs A to D in the order in which the jobs are accepted in accordance with print start requests from the operator via the UI unit.

Assuming the POD environment or the like, the embodiment enables the print system 1000 to execute control for maximizing the productivity of jobs processed by the print system 1000. An especially important feature of the embodiment will be explained.

For example, when the print system 1000 has the system configuration shown in FIGS. 8A and 8B, jobs by the print system 1000 are in statuses as shown in the window 1900 of FIG. 19.

In the display example of FIG. 19, the case binding process of job A is in progress by the case binding apparatus corresponding to the second inline sheet processing apparatus in the system configuration of FIGS. 8A and 8B. Jobs B, C, and D wait for printing because the print system 1000 is processing job A. The embodiment pays attention to one noteworthy point.

For example, in the office environment which is the main market where office-equipment makers carry on market competition, a configuration capable of executing simple sheet processes such as a stapling process is considered to have product specifications which satisfy demands in the office environment.

However, the embodiment proposes a configuration aiming at practical use of a product applicable not only to the office environment but also to the POD environment which is a new market where use cases and user needs are completely different from conventional ones. For example, the above-described case binding process as a glue binding process is a demand in the POD environment.

The case binding process corresponds to a function executable by the system in order to deal with various print forms requested in the POD environment. In other words, no case binding process need be supported in the office environment. The specifications of a product which supports this new function have the following matters to be examined, and the embodiment pays attention even to these matters.

For example, the process time necessary to complete the process of a job requiring the case binding process tends to be much longer than the process time necessary to complete the process of a job requiring finishing such as stapling because of the following factors.

For a job requiring a stapling process, work necessary to staple printed sheets of the job includes merely work to wait until sheets of one bundle are prepared and work to align the sheets of one bundle and staple them. In other words, finishing supported in the office environment is not complicated and does not take a long process time. However, for example, the case binding process corresponding to a new finishing function not supported in the office environment is likely to take a long process time even after the printer unit 203 ends the print process.

This is because the case binding process requires many preparations and complicated post-process operations, as described above. For example, the case binding process requires an operation to perform a post-process after stacking printed sheets within the case binding apparatus. Further, the case binding process requires a process step to melt or dry glue necessary for a gluing process in bookbinding, which is not executed in another finishing.

As is apparent from a comparison of the numbers of process sheets of job A, job B, and job D, the case binding process permits a much larger number of processible sheets of one bundle in comparison with another finishing.

In the embodiment, the print system 1000 permits a maximum of 20 print sheets to be stapled as one sheet bundle. The print system 1000 permits a maximum of 15 print sheets to be saddle-stitched as one sheet bundle. As for the case binding process, the print system 1000 permits a maximum of 200 print sheets to be case-bound as one sheet bundle. This specification pays attention to customer needs for a bound manual, guidebook, and the like as final products of the case binding process in the POD environment. The embodiment assumes that the print sheet volume of the body formed as one sheet bundle tends to be very large in the case binding process.

For this reason, when the system can execute the case binding process assuming even the POD environment, a long time may be taken till the completion of processing a job requiring the case binding process. In other words, the embodiment assumes a case in which the time during which a job or the like subsequent to the case binding job stands by is long. Further, a new configuration and new finishing simply employed for practical use of a product capable of coping with even the POD environment may influence the productivity of jobs.

The embodiment prevents generation of this situation. The embodiment focuses attention on new problems which may arise because an inline sheet processing apparatus can implement finishing corresponding to a new function when aiming at practical use of a product in a new market such as the POD environment. The configuration according to the embodiment solves problems which do not occur in the conventional office environment. This configuration will be explained with reference to FIG. 19 and the like.

For example, the print system 1000 has the system configuration shown in FIGS. 8A and 8B, and processes jobs A to D in the order shown in the display of FIG. 19. In this case, the control unit 205 causes the printer unit 203 to perform the print process of job B after the glue binding apparatus in FIGS. 8A and 8B completes the case binding process of job A. The control unit 205 causes the printer unit 203 to start the print process of job C after completing the print process and case binding process of job B. The control unit 205 causes the printer unit 203 to start the print process of job D after completing the print process and large-volume stacking process of job C.

The embodiment can process a plurality of jobs in the job acceptance order, and can also execute another control.

For example, the embodiment can execute control based on determination information such as system configuration information of the print system 1000 or information on sheet process types requested by respective accepted jobs.

More specifically, while the sheet processing apparatus 200 executes a sheet process operation necessary for a specific job among a plurality of jobs, the control unit 205 controls the printer unit 203 to start a print process necessary for a job subsequent to the job in parallel with the operation of the sheet processing apparatus 200.

In the system configuration of the print system 1000 shown in FIGS. 8A and 8B, the large-volume stacker is connected on the input side (upstream in the sheet conveyance direction) of the case binding apparatus. In this system configuration, all jobs accepted by the print apparatus 100 need not wait for the completion of case binding processes necessary for jobs A and B.

In other words, when the print system 1000 has the system configuration in FIGS. 8A and 8B, the system configuration of the embodiment allows parallel-executing a sheet process necessary for "stacker job C" even during execution of a case binding process for "case binding job A". Further, even if the large-volume stacker executes a stacking process for sheets bearing print data of job C while the case binding apparatus executes the case binding process of job A, this system configuration can execute a paper handling operation without any interference between the two processes.

On the premise of the above system configuration, the embodiment controls the system to change the process order and process jobs as follows in accordance with system configuration information and sheet process types necessary for respective jobs, instead of processing a plurality of jobs in their acceptance order.

For example, the control unit 205 controls to process jobs A to D in the order as shown in the window 2000 of FIG. 20, instead of processing jobs A to D in the order as shown in the window 1900 of FIG. 19. More specifically, as represented by the window 2000 of FIG. 20, the control unit 205 advances the print turn of "stacker job C" whose print execution request is accepted third among the four jobs, preceding to the print turn of "case binding job B" whose print execution request is accepted second.

As described above, according to the embodiment, the control unit of the print system 1000 can change the print order of jobs.

It should be noted that the configuration of the embodiment does not merely change the print order of jobs accepted by the print system 1000. More specifically, this configuration parallel-executes a sheet process necessary for a given job after a print process, and a print process necessary for another job. In addition, the control unit determines whether to execute parallel operations, depending on the system configuration and sheet process types necessary for respective jobs.

In the above-described control example, the control unit not only processes jobs A to D in the order as shown in the window 2000 of FIG. 20, but also controls them as follows.

For example, while causing the print system 1000 to execute a "case binding process by the case binding apparatus" necessary for job A after the print process of job A, the control unit 205 causes the printer unit 203 to start the print process of job C requiring a "stacking process by the large-volume stacker".

That is, the control unit 205 causes the printer unit 203 to execute the print operation of job C requiring a sheet process by the first sheet processing apparatus in the system configuration of FIGS. 8A and 8B, in parallel with a sheet process operation necessary for job A by the second sheet processing apparatus in the system configuration of FIGS. 8A and 8B.

The total time taken to obtain the final products of jobs A to D by the print system 1000 can be shortened by starting the print process of job C during execution of the sheet process of job A, like the above control, instead of processing jobs A to D in the process order by process procedures as shown in the display of FIG. 19.

The system configuration of the embodiment can shorten print standby times which may be generated in respective jobs as a whole, compared to a system configuration which starts printing of a given job after completing the sheet process of a preceding job. That is, the productivity of jobs by the whole system is increased.

As described above, when the print system accepts a job to be processed, the control unit of the print system 1000 causes the printer unit 203 to execute a print process necessary for the job (to be referred to as a preceding job). After the printer unit 203 performs the print process necessary for the preceding job, the control unit 205 causes the inline type sheet processing apparatus 200 of the print system 1000 to execute a sheet process necessary for the preceding job. During the process of the preceding job by the print system 1000, the print system 1000 can accept the print execution request of another job (to be referred to as a succeeding job hereinafter).

On the premise of this configuration, the control unit according to the embodiment controls a plurality of jobs as follows on the basis of system configuration information of the print system 1000, a sheet process type necessary for the preceding job, and a sheet process type necessary for the succeeding job.

For example, the control unit 205 permits the printer unit 203 of the print system 1000 to start a print process necessary for a succeeding job even while the inline type sheet processing apparatus of the print system 1000 executes a sheet process necessary for a preceding job. This configuration provides the effects described in the embodiment.

According to the embodiment, when executing this control, the control unit reads out, from the memory, system configuration information which defines the system configuration of the print system 1000, and confirms it. The control unit also reads out, from the memory, rule management data which defines a plurality of rules corresponding to this configuration. According to rules defined by the rule management data, the control unit controls the print system 1000 to permit or inhibit parallel-execution of the sheet process operation of a preceding job and the print operation of a succeeding job, as described above.

For example, the print system 1000 registers management data as illustrated in FIGS. 21A-21C in the HDD 209 in advance.

FIGS. 21A-21C show a management data group 2100 used by the control unit when the control unit determines a method of processing a plurality of jobs by the print system 1000 having the system configuration shown in FIGS. 8A and 8B.

The management data group 2100 is, e.g., an information group registered in the HDD 209 in advance. A system configuration information 2101 contained in the management data group 2100 is a system configuration information group which allows the control unit to specify the system configuration of the print system 1000.

The control unit 205 generates the system configuration information 2101 by either of the following two methods.

For example, when an operator is to install or add an inline sheet processing apparatus in the print system 1000, as illustrated in the displays of FIGS. 18A to 18D, he inputs system configuration information via the UI unit. The control unit 205 acquires this information via the signal line shown in FIG. 2 for communicating data from the operation unit 204 to the control unit 205. The control unit 205 generates, as the system configuration information 2101, data based on the system configuration information manually input by the operator, and stores the system configuration information 2101 in the HDD 209.

As another method, the control unit of a connected inline sheet processing apparatus automatically acquires information on the sheet processing apparatus without manually inputting information from the operator. In this case, a configuration unique to the inline finisher is utilized.

For example, an inline type sheet processing apparatus physically connects to the print apparatus 100. At this time, the sheet processing apparatus also electrically connects to the print apparatus. More specifically, the sheet processing apparatus can electrically exchange information with the print apparatus by connecting a signal line for communicating data between the sheet processing apparatus and the control unit 205, as shown in FIG. 2. This configuration is utilized. Assume that an inline type sheet processing apparatus connects to the print apparatus 100. In response to this connection, the control unit 205 automatically acquires, from the sheet processing apparatus 200 via the signal line, information necessary to generate system configuration information without manually inputting it from an operator. The control unit 205 generates the system configuration information 2101 on the basis of the automatically acquired information.

On the premise of this configuration, in addition to the system configuration information 2101 of the print system 1000, the management data group 2100 also contains job process rule definition information 2102 which defines a plurality of rules to process a plurality of jobs by the print system 1000 and is also registered in the HDD 209 in association with the system configuration information 2101.

The job process rule definition information 2102 in FIGS. 21A-21C is generated by either of the following methods.

For example, the control unit 205 refers to the system configuration information 2101 in FIG. 21A. The control unit 205 determines rules to process a plurality of jobs. As an information group which reflects the determined contents, the control unit 205 stores the job process rule definition information 2102 in the HDD 209 in association with the system configuration information 2101.

Alternatively, the control unit 205 registers the job process rule definition information 2102 paired with the system configuration information 2101 in the HDD 209, as program data created in advance as rule definition information determined in advance for each system configuration information 2101.

The embodiment employs this configuration. According to the latter method, it is necessary to define rules in advance for all possible system configurations in the print system 1000, and prepare corresponding rules in the memory in advance. The control unit 205 can flexibly select either method in consideration of the operation of the print system 1000 or the like. In other words, the data generation method and management method are arbitrary as long as the control unit of the embodiment can execute the following control.

In this configuration, the management data group 2100 shown in FIGS. 21A-21C has the following pieces of information as program codes which can be read out and referred to by the control unit 205 as management information used for control by the control unit 205. These pieces of information are pieces of management information when the print system 1000 has the system configuration in FIGS. 8A and 8B.

The system configuration information 2101 of the management data group 2100 describes pieces of information each corresponding to system configuration information of the print system 1000. In this example, the system configuration information 2101 contains (information 1) to (information 5). These pieces of information correspond to (information 1) to (information 5) described above with reference to FIGS. 8A and 8B. For the system configuration in FIGS. 8A and 8B, the following pieces of information are managed as (information 1) to (information 5).

The first information is "information representing that the inline sheet processing apparatus 200 connects to the print apparatus 100 in the print system 1000". This information is (information 1) in the system configuration information 2101 of FIG. 21A that is used by the control unit to process a plurality of jobs when the print system 1000 has the system configuration in FIGS. 8A and 8B.

The second information is "information representing that the number of inline sheet processing apparatuses in the print system 1000 is three". This information is (information 2) in the system configuration information 2101 of FIG. 21A that is used by the control unit to process a plurality of jobs when the print system 1000 has the system configuration in FIGS. 8A and 8B.

The third information is "information representing that the types of connected inline sheet processing apparatuses in the print system 1000 are the large-volume stacker, glue binding apparatus, and saddle stitching apparatus". This information is (information 3) in the system configuration information 2101 of FIG. 21A that is used by the control unit to process a plurality of jobs when the print system 1000 has the system configuration in FIGS. 8A and 8B.

The fourth information is "information representing that the types of sheet processes executable by the print system 1000 are a total of nine processes: stapling, punching, cutting, shift delivery, saddle stitching, folding, case binding, pad binding, and large-volume stacking". This information is (information 4) in the system configuration information 2101 of FIG. 21A that is used by the control unit to process a plurality of jobs when the print system 1000 has the system configuration in FIGS. 8A and 8B.

The fifth information is "information representing that the three inline sheet processing apparatuses in the print system 1000 connect to the print apparatus 100 in the order of the large-volume stacker, glue binding apparatus, and saddle stitching apparatus". This information is (information 5) in the system configuration information 2101 of FIG. 21A that is used by the control unit to process a plurality of jobs when the print system 1000 has the system configuration in FIGS. 8A and 8B.

The control unit of the print system 1000 executes the following control in accordance with the job process rule definition information 2102 defined on the basis of the system configuration information 2101 in FIG. 21A containing (information 1) to (information 5). The following control corresponds to a control example executed when the print system 1000 has the system configuration shown in FIGS. 8A and 8B.

The print system 1000 can accept a plurality of jobs for which a user issues print execution requests together with print execution requests via the operation unit 204 of the print apparatus 100 or the operation unit of an external apparatus such as the PC 103 or 104.

In other words, the control unit of the system controls the print system 1000 to properly accept the print request of a job after accepting the process request of another job.

When the print system 1000 accepts the print execution request of a target job, the print system 1000 may have already accepted another job whose print execution request have been issued at a previous timing. Considering this situation, a job whose print execution request has already been accepted is called a "preceding job". A job whose print execution request is accepted after the preceding job is called a "succeeding job". The job process rule definition information 2102 in FIGS. 21A-21C defines at least the following nine rules.

When the print system 1000 has the system configuration in FIGS. 8A and 8B, the control unit of the print system 1000 executes the following control examples according to the nine rules.

[Rule 1 When System 1000 Has System Configuration in FIGS. 8A and 8B]

A preceding job accepted by the print system 1000 having the system configuration in FIGS. 8A and 8B is a "job requiring a sheet process by the saddle stitching apparatus for sheets printed by the printer unit 203". After the control unit 205 causes the printer unit 203 to execute a print process necessary for the preceding job, the sheet process necessary for the preceding job is in execution by the saddle stitching apparatus.

In this situation, the print apparatus 100 of the print system 1000 having the system configuration in FIGS. 8A and 8B accepts the print execution request of a "job requiring a sheet process by the saddle stitching apparatus for sheets printed by the printer unit 203" as a succeeding job.

In this case, the control unit 205 executes control complying with a decision defined by rule 1 by referring to data of rule 1 in the job process rule definition information 2102 in FIG. 21A.

More specifically, the control unit 205 inhibits the printer unit 203 from executing the print operation of the succeeding job in parallel with the sheet process operation of the preceding job. In other words, the control unit 205 inhibits the printer unit 203 from starting the print process of the succeeding job requiring the sheet process by the saddle stitching apparatus (corresponding to the third inline finisher in FIG. 8B) while the saddle stitching apparatus (corresponding to the third inline finisher in FIG. 8B) executes the sheet process of the preceding job.

This control executed by the control unit 205 is control executed when the print system 1000 has the system configuration in FIGS. 8A and 8B, and corresponds to a control example defined by rule 1 in FIG. 21A.

[Rule 2 When System 1000 Has System Configuration in FIGS. 8A and 8B]

A preceding job accepted by the print system 1000 having the system configuration in FIGS. 8A and 8B is a "job requiring a sheet process by the saddle stitching apparatus for sheets printed by the printer unit 203". After the control unit 205 causes the printer unit 203 to execute a print process necessary for the preceding job, the sheet process necessary for the preceding job is in execution by the saddle stitching apparatus.

In this situation, the print apparatus 100 of the print system 1000 having the system configuration in FIGS. 8A and 8B accepts the print execution request of a "job requiring a sheet process by the glue binding apparatus for sheets printed by the printer unit 203" as a succeeding job.

In this case, the control unit 205 executes control complying with a decision defined by rule 2 by referring to data of rule 2 in the job process rule definition information 2102 in FIG. 21B.

More specifically, the control unit 205 permits the printer unit 203 to execute the print operation of the succeeding job in parallel with the sheet process operation of the preceding job. In other words, the control unit 205 permits the printer unit 203 to start the print process of the succeeding job requiring the sheet process by the glue binding apparatus (corresponding to the second inline finisher in FIG. 8B) while the saddle stitching apparatus (corresponding to the third inline finisher in FIG. 8B) executes the sheet process of the preceding job.

This control executed by the control unit 205 is control executed when the print system 1000 has the system configuration in FIGS. 8A and 8B, and corresponds to a control example defined by rule 2 in FIG. 21B.

[Rule 3 When System 1000 Has System Configuration in FIGS. 8A and 8B]

A preceding job accepted by the print system 1000 having the system configuration in FIGS. 8A and 8B is a "job requiring a sheet process by the saddle stitching apparatus for sheets printed by the printer unit 203". After the control unit 205 causes the printer unit 203 to execute a print process necessary for the preceding job, the sheet process necessary for the preceding job is in execution by the saddle stitching apparatus.

In this situation, the print apparatus 100 of the print system 1000 having the system configuration in FIGS. 8A and 8B accepts the print execution request of a "job requiring a sheet process by the large-volume stacker for sheets printed by the printer unit 203" as a succeeding job.

In this case, the control unit 205 executes control complying with a decision defined by rule 3 by referring to data of rule 3 in the job process rule definition information 2102 in FIG. 21B.

More specifically, the control unit 205 permits the printer unit 203 to execute the print operation of the succeeding job in parallel with the sheet process operation of the preceding job. In other words, the control unit 205 permits the printer unit 203 to start the print process of the succeeding job requiring the sheet process by the large-volume stacker (corresponding to the first inline finisher in FIG. 8B) while the saddle stitching apparatus (corresponding to the third inline finisher in FIG. 8B) executes the sheet process of the preceding job.

This control executed by the control unit 205 is control executed when the print system 1000 has the system configuration in FIGS. 8A and 8B, and corresponds to a control example defined by rule 3 in FIG. 21B.

[Rule 4 When System 1000 Has System Configuration in FIGS. 8A and 8B]

A preceding job accepted by the print system 1000 having the system configuration in FIGS. 8A and 8B is a "job requiring a sheet process by the glue binding apparatus for sheets printed by the printer unit 203". After the control unit 205 causes the printer unit 203 to execute a print process necessary for the preceding job, the sheet process necessary for the preceding job is in execution by the glue binding apparatus.

In this situation, the print apparatus 100 of the print system 1000 having the system configuration in FIGS. 8A and 8B accepts the print execution request of a "job requiring a sheet process by the saddle stitching apparatus for sheets printed by the printer unit 203" as a succeeding job.

In this case, the control unit 205 executes control complying with a decision defined by rule 4 by referring to data of rule 4 in the job process rule definition information 2102 in FIG. 21B.

More specifically, the control unit 205 inhibits the printer unit 203 from executing the print operation of the succeeding job in parallel with the sheet process operation of the preceding job. In other words, the control unit 205 inhibits the printer unit 203 from starting the print process of the succeeding job requiring the sheet process by the saddle stitching apparatus (corresponding to the third inline finisher in FIG. 8B) while the glue binding apparatus (corresponding to the second inline finisher in FIG. 8B) executes the sheet process of the preceding job.

This control executed by the control unit 205 is control executed when the print system 1000 has the system configuration in FIGS. 8A and 8B, and corresponds to a control example defined by rule 4 in FIG. 21B.

[Rule 5 When System 1000 Has System Configuration in FIGS. 8A and 8B]

A preceding job accepted by the print system 1000 having the system configuration in FIGS. 8A and 8B is a "job requiring a sheet process by the glue binding apparatus for sheets printed by the printer unit 203". After the control unit 205 causes the printer unit 203 to execute a print process necessary for the preceding job, the sheet process necessary for the preceding job is in execution by the glue binding apparatus.

In this situation, the print apparatus 100 of the print system 1000 having the system configuration in FIGS. 8A and 8B accepts the print execution request of a "job requiring a sheet process by the glue binding apparatus for sheets printed by the printer unit 203" as a succeeding job.

In this case, the control unit 205 executes control complying with a decision defined by rule 5 by referring to data of rule 5 in the job process rule definition information 2102 in FIG. 21B.

More specifically, the control unit 205 inhibits the printer unit 203 from executing the print operation of the succeeding job in parallel with the sheet process operation of the preceding job. In other words, the control unit 205 inhibits the printer unit 203 from starting the print process of the succeeding job requiring the sheet process by the glue binding apparatus (corresponding to the second inline finisher in FIG. 8B) while the glue binding apparatus (corresponding to the second inline finisher in FIG. 8B) executes the sheet process of the preceding job.

This control executed by the control unit 205 is control executed when the print system 1000 has the system configuration in FIGS. 8A and 8B, and corresponds to a control example defined by rule 5 in FIG. 21B.

Note that the control unit 205 processes "case binding job A" and "case binding job B" described with reference to FIGS. 18A to 18D and 19 according to rule 5 in FIG. 21B.

More specifically, rule 5 corresponds to a case in which the print system 1000 having the system configuration in FIGS. 8A and 8B accepts the print execution request of "case binding job B" serving as a succeeding job during the case binding process of "case binding job A" serving as a preceding job by the glue binding apparatus.

In this case, according to rule 5 in FIG. 21B, the control unit 205 inhibits the printer unit 203 from executing the print process of "case binding job B" during the case binding process of "case binding job A" by the glue binding apparatus (corresponding to the second inline finisher in FIG. 8B). The control unit 205 saves print data of all pages of job B in the HDD 209, and makes the start of printing job B stand by.

[Rule 6 When System 1000 Has System Configuration in FIGS. 8A and 8B]

A preceding job accepted by the print system 1000 having the system configuration in FIGS. 8A and 8B is a "job requiring a sheet process by the glue binding apparatus for sheets printed by the printer unit 203". After the control unit 205 causes the printer unit 203 to execute a print process necessary for the preceding job, the sheet process necessary for the preceding job is in execution by the glue binding apparatus.

In this situation, the print apparatus 100 of the print system 1000 having the system configuration in FIGS. 8A and 8B accepts the print execution request of a "job requiring a sheet process by the large-volume stacker for sheets printed by the printer unit 203" as a succeeding job.

In this case, the control unit 205 executes control complying with a decision defined by rule 6 by referring to data of rule 6 in the job process rule definition information 2102 in FIG. 21C.

More specifically, the control unit 205 permits the printer unit 203 to execute the print operation of the succeeding job in parallel with the sheet process operation of the preceding job. In other words, the control unit 205 permits the printer unit 203 to start the print process of the succeeding job requiring the sheet process by the large-volume stacker (corresponding to the first inline finisher in FIG. 8B) while the glue binding apparatus (corresponding to the second inline finisher in FIG. 8B) executes the sheet process of the preceding job.

This control executed by the control unit 205 is control executed when the print system 1000 has the system configuration in FIGS. 8A and 8B, and corresponds to a control example defined by rule 6 in FIG. 21C.

Note that the control unit 205 processes "case binding job A" and "stacker job C" described with reference to FIGS. 18A to 18D and 19 according to rule 6 in FIG. 21C.

More specifically, rule 6 corresponds to a case in which the print system 1000 having the system configuration in FIGS. 8A and 8B accepts the print execution request of "stacker job C" serving as a succeeding job during the case binding process of "case binding job A" serving as a preceding job by the glue binding apparatus.

In this case, according to rule 6 in FIG. 21C, the control unit 205 permits the printer unit 203 to execute the print process of "stacker job C" during the case binding process of "case binding job A" by the glue binding apparatus (corresponding to the second inline finisher in FIG. 8B). The control unit 205 reads out print data of job C from the HDD 209, and causes the printer unit 203 to start printing of job C while keeping the print process of job B waiting. The control unit 205 executes the following operation in parallel with an operation to complete the case binding process of job A by the case binding apparatus (corresponding to the second inline finisher in FIG. 8B).

Referring to FIG. 8B, the control unit 205 properly conveys sheets of job C printed by the printer unit 203 into the large-volume stacker via point A in FIG. 8B while the case binding apparatus (corresponding to the second inline finisher in FIG. 8B) in the print system 1000 executes the case binding process of sheets of job A. The control unit 205 also causes the large-volume stacker (corresponding to the first inline finisher in FIG. 8B) to execute the stacking process of sheets of job C during the case binding process of job A by the case binding apparatus (corresponding to the second inline finisher in FIG. 8B).

The control unit of the print system 1000 controls the print system 1000 to execute the print operation of a succeeding job in parallel with the sheet process operation of a preceding job, and also execute the sheet process operation of the succeeding job in parallel with the sheet process operation of the preceding job.

This control can further increase the productivity of jobs.

[Rule 7 When System 1000 Has System Configuration in FIGS. 8A and 8B]

A preceding job accepted by the print system 1000 having the system configuration in FIGS. 8A and 8B is a "job requiring a sheet process by the large-volume stacker for sheets printed by the printer unit 203". After the control unit 205 causes the printer unit 203 to execute a print process necessary for the preceding job, the sheet process necessary for the preceding job is in execution by the large-volume stacker.

In this situation, the print apparatus 100 of the print system 1000 having the system configuration in FIGS. 8A and 8B accepts the print execution request of a "job requiring a sheet process by the saddle stitching apparatus for sheets printed by the printer unit 203" as a succeeding job.

In this case, the control unit 205 executes control complying with a decision defined by rule 7 by referring to data of rule 7 in the job process rule definition information 2102 in FIG. 21C.

More specifically, the control unit 205 inhibits the printer unit 203 from executing the print operation of the succeeding job in parallel with the sheet process operation of the preceding job. In other words, the control unit 205 inhibits the printer unit 203 from starting the print process of the succeeding job requiring the sheet process by the saddle stitching apparatus (corresponding to the third inline finisher in FIG. 8B) while the large-volume stacker (corresponding to the first inline finisher in FIG. 8B) executes the sheet process of the preceding job.

This control executed by the control unit 205 is control executed when the print system 1000 has the system configuration in FIGS. 8A and 8B, and corresponds to a control example defined by rule 7 in FIG. 21C.

[Rule 8 When System 1000 Has System Configuration in FIGS. 8A and 8B]

A preceding job accepted by the print system 1000 having the system configuration in FIGS. 8A and 8B is a "job requiring a sheet process by the large-volume stacker (corresponding to the first inline finisher in FIG. 8B) for sheets printed by the printer unit 203". After the control unit 205 causes the printer unit 203 to execute a print process necessary for the preceding job, the sheet process necessary for the preceding job is in execution by the large-volume stacker.

In this situation, the print apparatus 100 of the print system 1000 having the system configuration in FIGS. 8A and 8B accepts the print execution request of a "job requiring a sheet process by the glue binding apparatus for sheets printed by the printer unit 203" as a succeeding job.

In this case, the control unit 205 executes control complying with a decision defined by rule 8 by referring to data of rule 8 in the job process rule definition information 2102 in FIG. 21C.

More specifically, the control unit 205 inhibits the printer unit 203 from executing the print operation of the succeeding job in parallel with the sheet process operation of the preceding job. In other words, the control unit 205 inhibits the printer unit 203 from starting the print process of the succeeding job requiring the sheet process by the glue binding apparatus (corresponding to the second inline finisher in FIG. 8B) while the large-volume stacker (corresponding to the first inline finisher in FIG. 8B) executes the sheet process of the preceding job.

This control executed by the control unit 205 is control executed when the print system 1000 has the system configuration in FIGS. 8A and 8B, and corresponds to a control example defined by rule 8 in FIG. 21C.

[Rule 9 When System 1000 Has System Configuration in FIGS. 8A and 8B]

A preceding job accepted by the print system 1000 having the system configuration in FIGS. 8A and 8B is a "job requiring a sheet process by the large-volume stacker for sheets printed by the printer unit 203". After the control unit 205 causes the printer unit 203 to execute a print process necessary for the preceding job, the sheet process necessary for the preceding job is in execution by the large-volume stacker.

In this situation, the print apparatus 100 of the print system 1000 having the system configuration in FIGS. 8A and 8B accepts the print execution request of a "job requiring a sheet process by the large-volume stacker for sheets printed by the printer unit 203" as a succeeding job.

In this case, the control unit 205 executes control complying with a decision defined by rule 9 in FIG. 21C by referring to data of rule 9 in the job process rule definition information 2102 in FIGS. 21A-21C.

More specifically, the control unit 205 inhibits the printer unit 203 from executing the print operation of the succeeding job in parallel with the sheet process operation of the preceding job. In other words, the control unit 205 inhibits the printer unit 203 from starting the print process of the succeeding job requiring the sheet process by the large-volume stacker (corresponding to the first inline finisher in FIG. 8B) while the large-volume stacker (corresponding to the first inline finisher in FIG. 8B) executes the sheet process of the preceding job.

This control executed by the control unit 205 is control executed when the print system 1000 has the system configuration in FIGS. 8A and 8B, and corresponds to a control example defined by rule 9 in FIG. 21C.

When the print system 1000 has the system configuration in FIGS. 8A and 8B, the control unit of the print system 1000 executes a plurality of job process operations like the above-described nine examples by reading out the management data group 2100 in FIGS. 21A-21C from the HDD 209 and referring to it.

As a mechanism for maximizing the productivity, the embodiment sets a special rule for a specific rule among the nine rules in FIGS. 21A-21C. An example of the specific rule is rule 4 illustrated in FIG. 21B.

Rule 4 in FIG. 21B inhibits the printer unit 203 from executing the print operation of a succeeding job in parallel with the sheet process operation of a preceding job. More specifically, when the print system 1000 has the system configuration in FIGS. 8A and 8B, the control unit 205 inhibits the printer unit 203 from starting the print process of the succeeding job requiring the sheet process by the saddle stitching apparatus (corresponding to the third inline finisher in FIG. 8B) while the glue binding apparatus (corresponding to the second inline finisher in FIG. 8B) executes the sheet process of the preceding job.

However, rule 4 in FIG. 21B defines a special rule when satisfying the following conditions. The special rule will be explained using "case binding job A" and "saddle stitching job D" described with reference to FIGS. 18A to 18D and 19.

When the print system 1000 has the system configuration in FIGS. 8A and 8B, all sheets (in the above example, 100 body sheets+one cover sheet=a total of 101 sheets) necessary for the case binding process of "case binding job A" serving as a preceding job are prepared in the gluing unit in the glue binding apparatus of FIG. 8B (see FIG. 12 and its description for the internal structure of the glue binding apparatus including the gluing unit). In this situation, a cover sheet serving as the final sheet necessary for the case binding process of job A has passed through the straight path (also called the through path) in the glue binding apparatus of FIG. 8B (see FIG. 12 and its description for the internal structure of the glue binding apparatus including the straight path). In this case, the straight path in the glue binding apparatus of FIG. 8B is free from preceding job A. Thus, according to the embodiment, the control unit 205 of the print system 1000 can also execute the following control.

When the print system 1000 has the system configuration in FIGS. 8A and 8B, the straight path (see FIG. 12 and its description for the internal structure of the glue binding apparatus including the straight path) in the glue binding apparatus of FIG. 8B that is occupied by sheets of case binding job A in order to perform the case binding process becomes available after the end of conveying sheets of job A through the straight path.

On the basis of the sheet process status of case binding job A in the glue binding apparatus, the control unit 205 causes the printer unit 203 to start the print process of saddle stitching job D corresponding to a job subsequent to job A even while the glue binding apparatus (corresponding to the second inline finisher in FIG. 8B) executes the case binding process of case binding job A.

After the straight path in the glue binding apparatus of FIG. 8B becomes free from sheets of job A, the control unit 205 properly conveys sheets of job D printed by the printer unit 203 into the saddle stitching apparatus via points A, B, and C in FIG. 8B while the glue binding apparatus executes the case binding process of job A. The control unit 205 also causes the saddle stitching apparatus (corresponding to the third inline finisher in FIG. 8B) to execute the saddle stitching process of sheets of job D while the glue binding apparatus (corresponding to the second inline finisher in FIG. 8B) executes the case binding process of job A.

By control based on the special rule for rule 4 in FIG. 21B that is applied on condition that the print system 1000 has the system configuration in FIG. 8B, the control unit 205 parallel-executes the case binding process for job A by the glue binding apparatus (corresponding to the second inline finisher in FIG. 8B), and the print process by the printer unit 203 for job D requiring the saddle stitching process by the saddle stitching apparatus (corresponding to the third inline finisher in FIG. 8B). In this case, the control unit 205 also controls the display contents of a job process status window to reflect the actual job process statuses of jobs A and D in the print system 1000. For example, the control unit 205 causes the display unit 401 to execute a display shown in FIG. 22 as a job process status window of display contents reflecting the parallel operations of jobs A and D based on the special rule for rule 4 in FIG. 21B. The control unit 205 allows an operator to accurately grasp each process status in detail, further enhancing the effects of the embodiment.

The embodiment can also define special rules for rules 7 and 8 in FIG. 21C which are equivalent to the special rule for rule 4 in FIG. 21B when the print system 1000 has the system configuration in FIGS. 8A and 8B. Examples of the special rules for rules 7 and 8 will be described below.

The special rule for rule 7 in FIG. 21C will be explained first. Assume that all sheets necessary for the stacking process of a preceding job by the large-volume stacker are conveyed from the straight path (through path) to the stack path in the large-volume stacker of FIG. 8B (see FIG. 11 and its description for the internal structure of the large-volume stacker including the straight path and stack path). At present, sheets of the preceding job are in process on the stack tray in the large-volume stacker of FIG. 8B (see FIG. 11 and its description for the internal structure of the large-volume stacker including the stack tray). In this case, the control unit 205 performs the following control.

On the basis of the special rule for rule 7 in FIG. 21C, the control unit 205 permits the following two operations while the large-volume stacker (corresponding to the first inline finisher in FIG. 8B) processes sheets of the preceding job after the straight path in the large-volume stacker becomes free from them. These two operations permit execution of one succeeding job. One operation is to cause the printer unit 203 to start the print process of a succeeding job requiring a sheet process by the saddle stitching apparatus (corresponding to the third inline finisher in FIG. 8B). The other operation is to properly convey sheets of the succeeding job printed by the printer unit 203 into the saddle stitching apparatus (corresponding to the third inline finisher in FIG. 8B) via points A, B, and C in FIG. 8B. In addition, the control unit 205 allows the saddle stitching apparatus (corresponding to the third inline finisher in FIG. 8B) to execute the sheet process of the succeeding job during the sheet process of the preceding job by the large-volume stacker (corresponding to the first inline finisher in FIG. 8B).

These operations are controlled as follows for jobs C and D illustrated in FIG. 19.

According to the special rule for rule 7 in FIG. 21C, the control unit 205 causes the printer unit 203 to start the print process of "saddle stitching job D" requiring a saddle stitching process by the saddle stitching apparatus (corresponding to the third inline finisher in FIG. 8B) while the large-volume stacker (corresponding to the first inline finisher in FIG. 8B) executes the sheet stacking process of job C after the straight path in the large-volume stacker becomes free from sheets of job C.

According to the special rule for rule 7 in FIG. 21C, after the straight path in the large-volume stacker (corresponding to the first inline finisher in FIG. 8B) becomes free from sheets of job C, the control unit properly conveys sheets of job D printed by the printer unit 203 into the saddle stitching apparatus (corresponding to the third inline finisher in FIG. 8B) via points A, B, and C in FIG. 8B while the stacker executes the sheet stacking process of job C. The control unit also causes the saddle stitching apparatus (corresponding to the third inline finisher in FIG. 8B) to execute the saddle stitching process of sheets of job D during the stacking process of job C by the large-volume stacker (corresponding to the first inline finisher in FIG. 8B).

By control based on the special rule for rule 7 in FIG. 21C, the control unit 205 parallel-executes the sheet stacking process for job C by the large-volume stacker (corresponding to the first inline finisher in FIG. 8B), and the print process by the printer unit 203 for job D requiring the saddle stitching process. In this case, the control unit 205 also displays a job status corresponding to this situation. For example, the control unit 205 causes the display unit 401 to execute a display shown in FIG. 23. The control unit 205 allows the operator to grasp each process status in detail, further enhancing the effects.

As described above, the embodiment can also cope with a configuration of setting the special rule for rule 7 in FIG. 21C when the print system 1000 has the system configuration in FIGS. 8A and 8B.

Next, the special rule for rule 8 in FIG. 21C will be explained.

Assume that all sheets necessary for the stacking process of a preceding job by the large-volume stacker (corresponding to the first inline finisher in FIG. 8B) are conveyed from the straight path (through path) to the stack path in the large-volume stacker of FIG. 8B (see FIG. 11 and its description for the internal structure of the large-volume stacker including the straight path and stack path). At present, sheets of the preceding job are in process on the stack tray of the large-volume stacker of FIG. 8B (see FIG. 11 and its description for the internal structure of the large-volume stacker including the stack tray). In this case, the control unit 205 performs the following control.

On the basis of the special rule for rule 8 in FIG. 21C, the control unit 205 permits the following two operations while the large-volume stacker (corresponding to the first inline finisher in FIG. 8B) executes the sheet process of the preceding job after the straight path in the large-volume stacker becomes free from them. These two operations permit execution of one succeeding job. One operation is to cause the printer unit 203 to start the print process of a succeeding job requiring a sheet process by the glue binding apparatus (corresponding to the second inline finisher in FIG. 8B). The other operation is to properly convey sheets of the succeeding job printed by the printer unit 203 into the glue binding apparatus (corresponding to the second inline finisher in FIG. 8B) via points A and B in FIG. 8B. In addition, the control unit 205 allows the glue binding apparatus (corresponding to the second inline finisher in FIG. 8B) to execute the sheet process of the succeeding job during the sheet process of the preceding job by the large-volume stacker (corresponding to the first inline finisher in FIG. 8B).

These operations are controlled as follows for jobs C and B illustrated in FIG. 19.

According to the special rule for rule 8 in FIG. 21C, the control unit 205 causes the printer unit 203 to start the print process of "case binding job B" requiring a case binding process by the glue binding apparatus while the stacker executes the sheet stacking process of job C after the straight path in the large-volume stacker becomes free from sheets of job C.

According to the special rule for rule 8 in FIG. 21C, after the straight path in the large-volume stacker (corresponding to the first inline finisher in FIG. 8B) becomes free from the sheets of job C, the control unit properly conveys the sheets of job B printed by the printer unit 203 into the glue binding apparatus (corresponding to the second inline finisher in FIG. 8B) via points A and B in FIG. 8B while the stacker executes the sheet stacking process of job C. The control unit also causes the glue binding apparatus (corresponding to the second inline finisher in FIG. 8B) to execute the case binding process of sheets of job B during the stacking process of job C by the large-volume stacker (corresponding to the first inline finisher in FIG. 8B).

By control based on the special rule for rule 8 in FIG. 21C, the control unit 205 parallel-executes the sheet stacking process for job C by the large-volume stacker (corresponding to the first inline finisher in FIG. 8B), and the print process by the printer unit 203 for job D requiring the case binding process. In this case, the control unit 205 also displays a job status corresponding to this situation. For example, the control unit 205 causes the display unit 401 to execute a display shown in FIG. 24. The control unit 205 allows the operator to grasp each process status in detail, further enhancing the effects.

The embodiment can also cope with a configuration of setting the special rule for rule 8 in FIG. 21C when the print system 1000 has the system configuration in FIGS. 8A and 8B.

As described in the three special rules for rules 4, 7, and 8 in FIGS. 21B and 21C, the effects of the embodiment can be maximized by providing control operations according to more detailed rules. Especially in the above-described cases of rules 4, 7, and 8 in FIGS. 21B and 21C, the control unit 205 executes a printed material conveyance operation halfway via a feeding path common to preceding and succeeding jobs, as control associated with the sheet feeding path in the print system 1000 to convey a printed material from the printer unit 203 to the printed material delivery destination. Further, the control unit 205 controls the sheet conveyance operation in the print system 1000 to change the conveyance destination halfway between the printed materials of the preceding and succeeding jobs. On the premise of this configuration, the control unit 205 causes the printer unit 203 to start the print process of the succeeding job immediately after introducing the printed material of the preceding job from the common feeding path to a feeding path used by only the preceding job. By this operation, the control unit 205 executes the above-described control examples according to the special rules for rules 4, 7, and 8 in FIGS. 21B and 21C.

The embodiment controls the print system 1000 to change the process order of jobs A to D before the start of printing job A illustrated in FIG. 19 by applying two rules 2 and 6 in FIGS. 21B and 21C. The print system 1000 can process jobs A to D in FIG. 19 in the process order and process timings in the display of FIG. 25.

In other words, the control unit 205 controls jobs A to D illustrated in FIG. 19 as follows on condition that the print system 1000 has the system configuration in FIGS. 8A and 8B.

Figure 25:
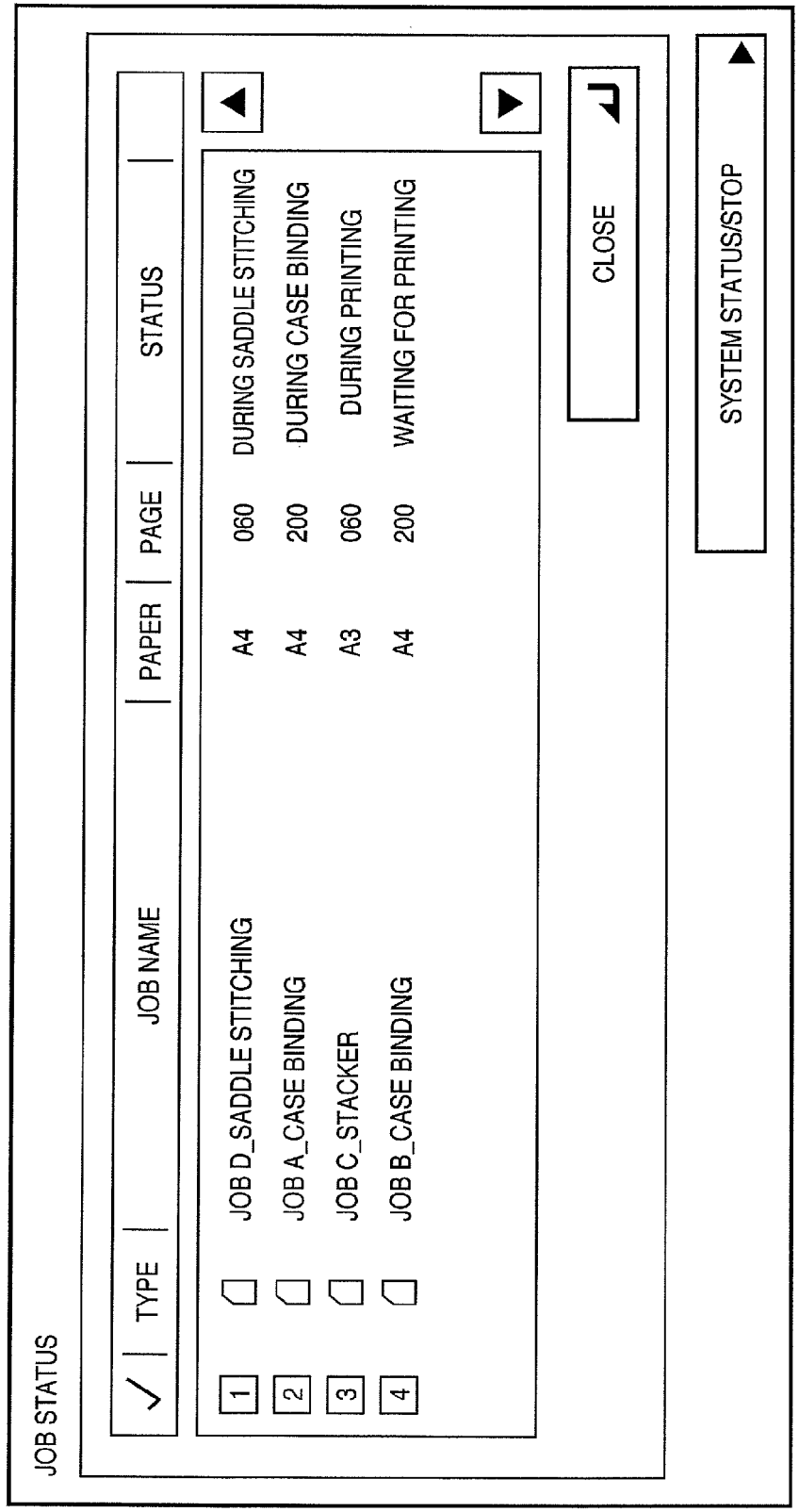
FIG. 25 is a view for explaining an example of display control on the UI unit to be controlled in the embodiment.

For example, the control unit 205 causes the printer unit 203 to print first "saddle stitching job D" whose print execution request is accepted fourth among the four jobs. The control unit 205 causes the printer unit 203 to start the print process of "case binding job A" corresponding to a job whose print execution request is accepted first during the saddle stitching operation of sheets of job D by the saddle stitching apparatus (corresponding to the third inline finisher in FIG. 8B). The control unit 205 causes the printer unit 203 to start the print process of "stacker job C" corresponding to a job whose print execution request is accepted third during the case binding process operation of sheets of job A by the glue binding apparatus (corresponding to the second inline finisher in FIG. 8B). The control unit 205 causes the printer unit 203 to finally print "case binding job B" whose print execution request is accepted second. To maximize the productivity, the control unit 205 applies the special rule for rule 8 in FIG. 21C in processing the final job B. For example, according to the special rule for rule 8 in FIG. 21C, the control unit 205 controls the print system 1000 to cause the printer unit 203 to start the print process of job B immediately after the straight path in the large-volume stacker (corresponding to the first inline finisher in FIG. 8B) becomes free from sheets of job C. In this example, the control unit 205 changes the process order of the four jobs whose print execution requests are accepted by the print apparatus 100 in the acceptance order of jobs A, B, C, and D, to a process order of jobs D, A, C, and B by using information of the management data group 2100 in FIGS. 21A-21C. Also by using information of the management data group 2100 in FIGS. 21A-21C, the control unit 205 causes the print system 1000 to parallel-execute a plurality of types of operations necessary for the four jobs changed in process order, as described above. In this way, the control unit 205 uses information of the management data group 2100 in FIGS. 21A-21C in the HDD 209 to control change of the process order of jobs and parallel execution of a plurality of types of operations necessary for the jobs. Even in this case, the control unit 205 causes the display unit 401 to execute the display of a job process status window which allows the operator to identify a changed process order of jobs and the types of parallel operations executed for these jobs. An example of this window is a job process status window shown in FIG. 25. As shown in the display of FIG. 25, the control unit 205 causes the display unit 401 to display the job process status window which has display contents reflecting a changed process order of jobs A to D and explicitly expresses the types of parallel operations executed for the jobs. In other words, the control unit 205 controls the display unit 401 to switch (update) the display contents of the job process status window representing the statuses of jobs A to D from those of FIG. 19 to those of FIG. 25.

As described in the above control, when three inline finishers are connected and three jobs requiring sheet processes by the respective inline finishers are accepted, the control unit 205 controls to process these jobs according to the rules in the management table of FIGS. 21A-21C, like the above-described control. The control unit 205 allows the print system 1000 to execute various parallel operations.

That is, the control unit 205 controls the print system 1000 to simultaneously (parallel-) execute the following three operations for the respective jobs.

(Operation 1) A sheet process operation by an inline sheet processing apparatus connected third to the print apparatus 100. This operation is executed for sheets of a job requiring this sheet process.

(Operation 2) A sheet process operation by an inline sheet processing apparatus connected second to the print apparatus 100. This operation is executed for sheets of a job requiring this sheet process.

(Operation 3) A print process by the printer unit 203 for a job requiring a sheet process operation by an inline sheet processing apparatus connected first to the print apparatus 100.

The effects of the embodiment can be further enhanced by simultaneously executing at least three independent operations including a plurality of sheet process operations and one print operation by the print system 1000.

According to the embodiment, the control unit 205 controls the print system 1000 so that the printer unit 203 can properly start the print process of a succeeding job waiting for printing inhibited from starting, upon completion of the sheet process of a preceding job.

In this example, sheet processes by the saddle stitching apparatus are (1) a stapling process, (2) a punching process, (3) a cutting process, (4) shift delivery, (5) a saddle stitching process, and (6) a folding process. A sheet process corresponding to one of (1) to (6) is a sheet process by the saddle stitching apparatus.

In this example, sheet processes by the glue binding apparatus are (1) a case binding process and (2) a pad binding process. A sheet process corresponding to either of (1) and (2) is a sheet process by the glue binding apparatus.

In this example, a sheet process by the large-volume stacker is (1) a sheet stacking process (including a large-volume stacking process). A sheet process corresponding to (1) is a sheet process by the large-volume stacker.

This is because the rules correspond to sheet processes executable by the respective sheet processing apparatuses, as illustrated in FIGS. 1 to 17B. In other words, these rules are applicable when a sheet processing apparatus capable of executing a sheet process different from those of the sheet processing apparatuses described with reference to FIGS. 1 to 17B is used as an inline type sheet processing apparatus.

In the embodiment, the control unit 205 utilizes information acquired from each unit described below when confirming the status of each job such as a preceding job or succeeding job.

For example, the control unit 205 utilizes information from a plurality of sensors on each of sheet feeding paths corresponding to print medium feeding paths in the print system 1000 (see FIGS. 8A to 10B). The control unit 205 also utilizes information from a soft counter for specifying the current number of sheets printed by the printer unit 203. The control unit 205 also utilizes page information and print setting information of an input job. From these pieces of information, the control unit 205 confirms whether the sheet process of the preceding job is in execution. A concrete example of this operation will be explained using "case binding job A" illustrated in FIG. 19.

The control unit 205 acquires the number of pages of case binding job A by the following method. If the job comes from the scanner unit 201, the control unit 205 uses information from the document sensor of the ADF of the scanner unit 201. After feeding all original document sheets to be read as the original document of job A from the ADF to the reader unit, the number of original document sheets of job A is determined. In other words, the number of pages of job A is determined after reading the final original document sheet of job A.

If job A is data from an external apparatus, the control unit 205 uses information acquired by storing print data of job A from the external apparatus in the HDD 209. For example, the control unit 205 receives data from the PC 103 or 104 as PDL print data via the external I/F 202. The control unit 205 expands the PDL data of each page into bitmap image data, and stores the bitmap image data in the HDD 209. The control unit 205 keeps executing a series of storage processes until it receives all print data from the external apparatus. The number of pages of job A is determined when all print data are received. In other words, the number of pages is determined by specifying the number of pages of bitmap image data stored in the HDD 209.

In the example of FIG. 19, the control unit 205 confirms that job A has 200 pages by the above method. In confirming the process status of job A, the control unit 205 also utilizes information of printing conditions set by a user for job A.

Job A is a case binding job having double-sided print setting for the body part (main body). The number of print sheets used as sheets of one bundle of the body is 200 pages/2 surfaces=100 sheets, and a total of 101 sheets including a cover are necessary. By this method, the control unit 205 acquires information on job A.

The control unit 205 also confirms the sheet conveyance status of job A, which will be described in the system configuration of FIG. 8B. For example, after the printer unit 203 reads out the first page of job A from the HDD 209, the control unit 205 causes the counter to count the number of print sheets. The control unit 205 specifies the sheet conveyance status from information from sensors individually arranged in respective apparatuses near coupling portions (e.g., points A, B, and C in FIG. 8B) where the sheet feeding paths of preceding and succeeding apparatuses connect to each other. Assume that 100 sheets pass through the discharge rollers 310 (see FIG. 3) of the print apparatus 100 and points A and B in FIG. 8B after the start of counting the number of print sheets. After the 100th sheet passes through point B from the glue binding apparatus, the control unit 205 confirms this information from the sensor of the glue binding apparatus that is installed near point B. The control unit 205 also acquires the conveyance status of the final sheet of job A, i.e., one cover sheet corresponding to the 101st sheet from the sensor arranged on the inserter path of FIG. 12. According to this method, the control unit 205 determines that all sheets necessary for the case binding process of job A are introduced into the case binding apparatus. In other words, the control unit 205 determines that all print sheets necessary for the print process of job A are conveyed from the print apparatus 100 into the sheet processing apparatus. After making this determination, the control unit 205 confirms whether case binding job A undergoes a sheet process by the sheet processing apparatus after printing by the printer unit 203.

By the above method, the control unit 205 confirms the progress of a job, e.g., confirms whether the print process of each of target jobs is in execution by the print apparatus 100, or whether a sheet process is in execution by the sheet processing apparatus.

The embodiment is also applicable even by adopting a method different from the above one. That is, the present invention incorporates a configuration of confirming the process progress of a job by any method as long as control complying with information of FIGS. 21A-21C, information of FIGS. 26A-26C, 27A and 27B (to be described later), and the process of a flowchart (to be described later) is executable in accordance with the configuration of the print system 1000.

The flowchart (to be described later) executed by the control unit of the print system 1000 uses information of the management data group 2100 illustrated in FIGS. 21A-21C.

In a system configuration different from that shown in FIGS. 8A and 8B, the control unit 205 does not execute control based on the program described in the management data group 2100 of FIGS. 21A-21C. The control unit 205 reads out system configuration information and job rule definition data corresponding to the system configuration from the HDD 209, and applies a process based on the information to the flowchart (to be described later).

If the print system 1000 has not the system configuration in FIGS. 8A and 8B but that in FIGS. 9A and 9B, the control unit 205 registers data of a management table group 2600 as illustrated in FIGS. 26A-26C in the HDD 209 in advance. The control unit 205 executes control based on the information of FIGS. 26A-26C in response to acceptance of a job to be processed by the print apparatus of the print system 1000 having the system configuration in FIGS. 9A and 9B.

Rules defined in the management table group 2600 of FIGS. 26A-26C and control examples according to the rules in correspondence with the system configuration of FIGS. 9A and 9B are apparent from the descriptions of FIGS. 8A, 8B, and 21A-21C, and a detailed description thereof will be omitted. When the print system 1000 has the system configuration in FIGS. 9A and 9B, the control unit suffices to execute at least the following control on the basis of information of the management table group 2600 of FIGS. 26A-26C.

For example, when the print system 1000 has the system configuration in FIGS. 9A and 9B, a preceding job accepted by the print apparatus 100 of the print system 1000 is a "job requiring a sheet process by the saddle stitching apparatus". A succeeding job accepted by the print apparatus 100 after the preceding job is a "job requiring a sheet process by the saddle stitching apparatus" (corresponding to rule 1 in FIG. 26A).

A preceding job accepted by the print apparatus 100 of the print system 1000 having the system configuration in FIGS. 9A and 9B is a "job requiring a sheet process by the glue binding apparatus". A succeeding job accepted by the print apparatus 100 after the preceding job is a "job requiring a sheet process by the saddle stitching apparatus" (corresponding to rule 4 in FIG. 26B).

A preceding job accepted by the print apparatus 100 of the print system 1000 having the system configuration in FIGS. 9A and 9B is a "job requiring a sheet process by the glue binding apparatus". A succeeding job accepted by the print apparatus 100 after the preceding job is a "job requiring a sheet process by the glue binding apparatus" (corresponding to rule 5 in FIG. 26B).

A preceding job accepted by the print apparatus 100 of the print system 1000 having the system configuration in FIGS. 9A and 9B is a "job requiring a sheet process by the glue binding apparatus". A succeeding job accepted by the print apparatus 100 after the preceding job is a "job requiring a sheet process by the large-volume stacker" (corresponding to rule 6 in FIG. 26C).

A preceding job accepted by the print apparatus 100 of the print system 1000 having the system configuration in FIGS. 9A and 9B is a "job requiring a sheet process by the large-volume stacker". A succeeding job accepted by the print apparatus 100 after the preceding job is a "job requiring a sheet process by the saddle stitching apparatus" (corresponding to rule 7 in FIG. 26C).

A preceding job accepted by the print apparatus 100 of the print system 1000 having the system configuration in FIGS. 9A and 9B is a "job requiring a sheet process by the large-volume stacker". A succeeding job accepted by the print apparatus 100 after the preceding job is a "job requiring a sheet process by the large-volume stacker" (corresponding to rule 9 in FIG. 26C).

In a case corresponding to one of rules 1, 4, 5, 6, 7, and 9 in FIGS. 26A-26C, the control unit 205 inhibits the print apparatus 100 of the print system 1000 from executing the print operation of a succeeding job in parallel with the sheet process operation of a preceding job by the inline finisher of the print system 1000. In other words, the control unit 205 inhibits the print apparatus 100 of the print system 1000 from starting the print process of the succeeding job while the inline finisher of the print system 1000 executes the sheet process operation of the preceding job.

A case corresponding to none of rules 1, 4, 5, 6, 7, and 9 in FIGS. 26A-26C in the print system 1000 having the system configuration of FIG. 9B is, e.g., the following situation.

For example, a preceding job accepted by the print apparatus 100 of the print system 1000 having the system configuration in FIGS. 9A and 9B is a "job requiring a sheet process by the saddle stitching apparatus". A succeeding job accepted by the print apparatus 100 after the preceding job is a "job requiring a sheet process by the glue binding apparatus" (corresponding to rule 2 in FIG. 26B).

A preceding job accepted by the print apparatus 100 of the print system 1000 having the system configuration in FIGS. 9A and 9B is a "job requiring a sheet process by the saddle stitching apparatus". A succeeding job accepted by the print apparatus 100 after the preceding job is a "job requiring a sheet process by the large-volume stacker" (corresponding to rule 3 in FIG. 26B).

A preceding job accepted by the print apparatus 100 of the print system 1000 having the system configuration in FIGS. 9A and 9B is a "job requiring a sheet process by the large-volume stacker". A succeeding job accepted by the print apparatus 100 after the preceding job is a "job requiring a sheet process by the glue binding apparatus" (corresponding to rule 8 in FIG. 26C).

In a case corresponding to one of rules 2, 3, and 8 in FIGS. 26B and 26C, the control unit 205 permits the print apparatus 100 of the print system 1000 to execute the print operation of a succeeding job in parallel with the sheet process operation of a preceding job by the inline finisher of the print system 1000. In other words, the control unit 205 permits the print apparatus 100 of the print system 1000 to start the print process of the succeeding job while the inline finisher of the print system 1000 executes the sheet process operation of the preceding job.

The control unit 205 can execute the above control when the print system 1000 has the system configuration in FIGS. 9A and 9B.

If the print system 1000 does not have the system configuration shown in FIGS. 8A and 8B and that in FIGS. 9A and 9B but that in FIGS. 10A and 10B, the control unit 205 registers data of a management data group 2700 as illustrated in FIGS. 27A and 27B in the HDD 209 in advance. The control unit 205 can use this information when accepting a job to be processed by the print apparatus of the print system 1000 having the system configuration in FIGS. 10A and 10B.

Rules defined in the management data group 2700 of FIGS. 27A and 27B and control examples according to the rules in correspondence with the system configuration of FIGS. 10A and 10B are apparent from the descriptions of FIGS. 8A, 9B, and 21A-21C, and a detailed description thereof will be omitted. When the print system 1000 has the system configuration in FIGS. 10A and 10B, the control unit 205 controls the print system 1000 to execute at least the following control on the basis of information of the management data group 2700 of FIGS. 27A and 27B.

For example, a preceding job accepted by the print apparatus 100 of the print system 1000 having the system configuration in FIGS. 10A and 10B is a "job requiring a sheet process by the saddle stitching apparatus". A succeeding job accepted by the print apparatus 100 after the preceding job is a "job requiring a sheet process by the saddle stitching apparatus" (corresponding to rule 1 in FIG. 27A).

A preceding job accepted by the print apparatus 100 of the print system 1000 having the system configuration in FIGS. 10A and 10B is a "job requiring a sheet process by the large-volume stacker". A succeeding job accepted by the print apparatus 100 after the preceding job is a "job requiring a sheet process by the saddle stitching apparatus" (corresponding to rule 3 in FIG. 27B).

A preceding job accepted by the print apparatus 100 of the print system 1000 having the system configuration in FIGS. 10A and 10B is a "job requiring a sheet process by the large-volume stacker". A succeeding job accepted by the print apparatus 100 after the preceding job is a "job requiring a sheet process by the large-volume stacker" (corresponding to rule 4 in FIG. 27B).

In a case corresponding to one of rules 1, 3, and 4 in FIGS. 27A and 27B, the control unit 205 inhibits the print apparatus 100 of the print system 1000 from executing the print operation of a succeeding job in parallel with the sheet process operation of a preceding job by the inline finisher of the print system 1000. In other words, the control unit 205 inhibits the print apparatus 100 of the print system 1000 from starting the print process of the succeeding job while the inline finisher of the print system 1000 executes the sheet process operation of the preceding job.

A case corresponding to none of rules 1, 3, and 4 in FIGS. 27A and 27B in the print system 1000 having the system configuration of FIG. 10B is, e.g., the following situation.

For example, a preceding job accepted by the print apparatus 100 of the print system 1000 having the system configuration in FIGS. 10A and 10B is a "job requiring a sheet process by the saddle stitching apparatus". A succeeding job accepted by the print apparatus 100 after the preceding job is a "job requiring a sheet process by the large-volume stacker" (corresponding to rule 2 in FIG. 27B).

In a case corresponding to rule 2 in FIG. 27B, the control unit 205 permits the print apparatus 100 of the print system 1000 to execute the print operation of a succeeding job in parallel with the sheet process operation of a preceding job by the inline finisher of the print system 1000. In other words, the control unit 205 permits the print apparatus 100 of the print system 1000 to start the print process of the succeeding job while the inline finisher of the print system 1000 executes the sheet process operation of the preceding job.

The control unit 205 can execute the above control when the print system 1000 has the system configuration in FIGS. 10A and 10B.

As described above, each control for increasing the productivity of a plurality of jobs in the embodiment is switchable every time the system configuration of the print system 1000 changes. This can further enhance the effects of the embodiment.

The control unit 205 controls the print system 1000 not only to switch the job order and promote a job (advance the job order), as described above, but also to parallel-execute a plurality of types of operations of jobs.

The print system 1000 of the embodiment can further execute the following special control.

For example, sheets of a preceding job jam in an inline finisher while the inline finisher of the print system 1000 executes the sheet process of the preceding job. In this manner, a factor of interrupting the sheet process of the preceding job occurs in the inline finisher of the print system 1000 that executes the sheet process necessary for the preceding job. Even in this situation, if a job requiring a sheet process by another inline finisher at an upstream position in the sheet conveyance direction from the suffering inline finisher exists as a succeeding job, the control unit 205 controls the print system 1000 to execute a print process and sheet process (finishing) necessary for the succeeding job even while the interruption factor remains unsolved.

An example of this control will be described in a case in which the print system 1000 has the system configuration in FIGS. 8A and 8B.

Assume that a jam of sheets of a preceding job or an error occurs in the glue binding apparatus (corresponding to the second inline finisher in FIG. 8B) after the end of the print process of the preceding job by the print apparatus 100. Concrete examples of this error include over stacking of printed materials at the delivery destination (corresponding to delivery destination Y in FIG. 8B) in the glue binding apparatus. Concrete examples of this error include the absence of glue (glue absence error) necessary for a gluing process by the glue binding apparatus. Concrete examples of this error include the cutting dust receptacle full (cutting dust error) generated in a cutting process by the cutter. At present, the print system 1000 suffers an error of a preceding job in the glue binding apparatus (corresponding to the second inline finisher in FIG. 8B). In this situation of the print system 1000, the error of the preceding job in the glue binding apparatus (corresponding to the second inline finisher in FIG. 8B) is not canceled. Even in this situation, the control unit 205 confirms whether the HDD 209 of the print apparatus 100 holds a succeeding job requiring a sheet process by the large-volume stacker (corresponding to the first inline finisher in FIG. 8B) positioned upstream from the error-generated glue binding apparatus (corresponding to the second inline finisher in FIG. 8B). As a result of this confirmation, the control unit 205 determines that the HDD 209 holds a succeeding job requiring a stacking process by the large-volume stacker of FIG. 8B positioned upstream from the glue binding apparatus of FIG. 8B in which the preceding job generates the error. If the control unit 205 makes this determination, it permits the printer unit 203 to start the print process of the succeeding job even while the preceding job generates the error in the glue binding apparatus of FIG. 8B (i.e., the operator has not canceled the error of the preceding job in the inline finisher). In addition, the control unit 205 permits the large-volume stacker of FIG. 8B to execute a sheet process (stacking process in this example) necessary for the succeeding job after the print process necessary for the succeeding job even while the preceding job generates the error in the glue binding apparatus of FIG. 8B (i.e., the operator has not canceled the error of the preceding job in the inline finisher).

This control will be explained in more detail using "case binding job A" illustrated in FIG. 19, "case binding job B" whose print execution request is accepted by the print apparatus 100 after job A, "stacker job C" whose print execution request is accepted by the print apparatus 100 after job B, and "saddle stitching job D" whose print execution request is accepted by the print apparatus 100 after job C.

The control unit 205 causes the print apparatus 100 to execute a print process necessary for job A whose print execution request is accepted first. In response to execution of the print process necessary for job A, the control unit 205 causes the glue binding apparatus in FIG. 8B (corresponding to the second inline finisher in FIG. 8B) to start a case binding process for printed media of job A having undergone the print process. Then, based on status information from the CPU of the glue binding apparatus in FIG. 8B (corresponding to the second inline finisher in FIG. 8B), the control unit 205 confirms that a factor of interrupting the case binding process of job A occurs in the glue binding apparatus in FIG. 8B (corresponding to the second inline finisher in FIG. 8B) while the glue binding apparatus in FIG. 8B (corresponding to the second inline finisher in FIG. 8B) executes the case binding process necessary for job A. The factor of interrupting the case binding process of job A is, e.g., "jam of a cover sheet for covering a body sheet bundle of job A" on the inserter path (see FIG. 12) in the glue binding apparatus of FIG. 8B. Another example of this factor is "jam of body sheets of job A" on any of the straight path, main body path, and stacking unit in the glue binding apparatus of FIG. 8B. Still another example of this factor is a factor (e.g., "glue absence error", "cutting dust full error", or "tray full error") in failing to execute a process necessary to complete the case binding process of job A by the glue binding apparatus in FIG. 8B. In this example, the control unit 205 confirms generation of the factor of interrupting the case binding process of job A on condition that it receives, via an internal signal line from the glue binding apparatus in FIG. 8B, a notification that "jam of a cover sheet for covering a body sheet bundle of job A" occurs on the inserter path in the glue binding apparatus of FIG. 8B. In response to this, the control unit 205 controls the glue binding apparatus in FIG. 8B to immediately suspend (interrupt) the case binding process of job A. At the same time, the control unit 205 starts monitoring whether the operator cancels the factor of interrupting the case binding process of job A. The control unit 205 controls the print system 1000 to maintain at least the interrupt of the case binding process of job A until the operator cancels the factor of interrupting the case binding process of job A. In this example, cancellation of the factor of interrupting the case binding process of job A is "removal of the jammed cover sheet for case-binding job A from the inserter path (see FIG. 12) in the glue binding apparatus of FIG. 8B". While maintaining the interrupt of the case binding process of job A, the control unit 205 confirms finishing types necessary for jobs B, C, and D whose print execution requests are accepted after job A, and confirms information of the management data group 2100 in FIGS. 21A-21C. Based on these pieces of information, the control unit 205 searches the HDD 209 for a job for which the start of printing by the print system 1000 is permitted while maintaining the interrupt of the case binding process of job A. In this example, the control unit 205 searches jobs waiting for printing sequentially from the first job, for a succeeding job requiring a sheet process by an inline finisher upstream from the glue binding apparatus which is to execute the case binding process of job A. For example, job B is not a "succeeding job requiring a sheet process by an inline finisher upstream from the glue binding apparatus in FIG. 8B which is to execute the case binding process of job A". The control unit 205 determines that job B is a "job for which the start of a print process is inhibited while maintaining the interrupt of the case binding process of job A". Based on this determination result, the control unit 205 controls to inhibit the start of printing job B and maintain the current print standby state. Then, the control unit 205 checks job C. In this example, job C is a "succeeding job requiring a sheet process by an inline finisher upstream from the glue binding apparatus in FIG. 8B which is to execute the case binding process of job A". The control unit 205 determines that job C is a "job for which the start of a print process is permitted while maintaining the interrupt of the case binding process of job A". Based on this determination result, the control unit 205 permits the start of the print process of job C while maintaining the interrupt of the case binding process of job A. In this example, the control unit 205 causes the print apparatus 100 to start the print process of job C while the operator has not canceled the factor of interrupting the case binding process of job A. Immediately after the print process of job C, the control unit 205 causes the large-volume stacker in FIG. 8B to perform the large-volume stacking process of the printed material of job C while the operator has not canceled the factor of interrupting the case binding process of job A. In this fashion, the control unit 205 controls the print system 1000 to execute the print process and finishing of a succeeding job free from any influence of a factor of interrupting finishing of a preceding job by an inline finisher even while the operator has not canceled the factor of interrupting finishing of the preceding job.

The control unit 205 can execute the above control on the basis of the management data group 2100 of FIGS. 21A-21C and status information from each apparatus in the system. The control unit 205 can display a job status corresponding to the control on the UI unit. For example, when executing the above control, the control unit 205 causes the display unit 401 to execute a display shown in FIG. 28. In the above example, the control unit 205 starts the print process of job C while maintaining the print standby state of jobs B and D when a cover sheet of job A jams in the glue binding apparatus of FIG. 8B. The control unit 205 controls the display unit 401 to faithfully reflect the current statuses of jobs A to D including error information of job A, and the process order of these four jobs. In other words, this control is to control the display unit 401 to switch (update) the display contents of the job process status window representing the statuses of jobs A to D from those of FIG. 19 to those of FIG. 28. Assume that the control unit 205 receives, from the glue binding apparatus in FIG. 8B during the period between the start and completion of processing job C, information representing that the operator cancels "jam of a cover sheet of job A" which is the factor of interrupting the case binding process of job A. In response to this, the control unit 205 controls the print system 1000 to restart the case binding process of job A immediately after the completion of processing job C. Also, the control unit 205 controls the print system 1000 to sequentially execute the processes of jobs B and D immediately after the completion of the case binding process of job A that restarts for job A. In executing the processes of jobs B and D, the control unit 205 controls the print system 1000 to execute parallel operations of jobs B and D similarly to the above-described control example by applying the special rule for rule 4 in FIGS. 21A-21C. This control can maximize the productivity.

This control can further enhance the effects of the embodiment.

Similar to the control examples illustrated in FIGS. 8A to 10B, 21A-21C, 26A-26C, 27A, and 27B, the control executed by the control unit of the print system 1000 means executing the following control.

For example, the control unit 205 creates the management data group 2100 in FIGS. 21A-21C, holds it in the HDD 209, and uses the management data group 2100 for the above control in accordance with the system configuration of the print system 1000 in FIGS. 8A and 8B. For example, the control unit 205 creates the management table group 2600 in FIGS. 26A-26C, holds it in the HDD 209, and uses the management table group 2600 for the above control in accordance with the system configuration of the print system 1000 in FIGS. 9A and 9B. For example, the control unit 205 creates the management data group 2700 in FIGS. 27A and 27B, holds it in the HDD 209, and uses the management data group 2700 for the above control in accordance with the system configuration of the print system 1000 in FIGS. 10A and 10B.

The control unit 205 discriminates the management data used for the control in accordance with each system configuration which can be built as the system configuration of the print system 1000.

This will be described in more detail. For example, the system configuration information 2101 in FIG. 21A, system configuration information 2601 in FIG. 26A, and system configuration information 2701 in FIG. 27A, which are candidates used for the control by the control unit 205, have different contents. The job process rule definition information 2102 in FIGS. 21A-21C, job rule definition data 2602 in FIGS. 26A-26C, and job rule definition data 2702 in FIGS. 27A and 27B, which are candidates used for the control by the control unit 205, have different contents of rules defined by them. These data are program data describing contents based on respective system configurations of the print system 1000.

On the premise of this configuration, the control unit of the print system 1000 controls various operations of jobs on the basis of the system configuration of the print system 1000 and information of jobs accepted by the print system 1000. For example, the control unit 205 executes the following control in the embodiment.

In the above control example, preceding and succeeding jobs are defined. The following control example will be described using preceding and succeeding jobs, too. The control unit 205 executes the following control example on the basis of criterion information which contains at least one of information of a preceding job, that of a succeeding job, the system configuration information, and job rule definition data and is necessary for job control.

On the premise of the above-mentioned constituent features, assume that preceding and succeeding jobs satisfy a specific condition defined by the above-described job rule definition data managed in the memory according to the embodiment. In this case, the control unit 205 permits execution of the following process while executing a sheet process necessary for the preceding job after the printer unit 203 performs a necessary print process of print data of the preceding job.

For example, the control unit 205 permits the printer unit 203 to execute a necessary print process of print data of the succeeding job while executing a sheet process necessary for the preceding job.

Assume that preceding and succeeding jobs do not satisfy a specific condition defined by the job rule definition data. In this case, the control unit 205 inhibits the printer unit 203 from executing a necessary print process of print data of the succeeding job while executing a sheet process necessary for the preceding job.

The print system 1000 of the embodiment can execute the series of selective control operations. In the series of control operations, the control unit of the print system 1000 executes the following control.

For example, the preceding job requires the print process of its data, and a specific type of sheet process defined by the job rule definition data for sheets on which data of the preceding job are printed by the print process. In this case, the control unit 205 controls the printer unit 203 to execute a print process necessary for the succeeding job during execution of the sheet process necessary for the preceding job on the basis of a rule defined by the job rule definition data.

In more detail, the control unit 205 executes the following control in the series of control operations.

For example, the preceding job requires a specific type of sheet process defined by the job rule definition data after the print process of print data of the preceding job. This case will be defined as condition 1, and the specific type of sheet process necessary for the preceding job will be referred to as sheet process A.

In addition, the succeeding job requires not sheet process A but another specific type of sheet process defined by the job rule definition data after the print process of print data of the succeeding job. This case will be defined as condition 2, and the specific type of sheet process necessary for the succeeding job will be referred to as sheet process B.

Similar to the above-described case, the control unit 205 determines that both conditions 1 and 2 are satisfied. In this case, the control unit 205 controls the printer unit 203 to start a print process necessary for the succeeding job requiring sheet process B after printing while executing sheet process A necessary for the preceding job.

Control associated with the method of processing preceding and succeeding jobs will be explained in detail. The control unit 205 causes the printer unit 203 to execute a print process necessary for the preceding job. In the print process, the control unit 205 stores print data of the preceding job in the HDD 209. The control unit 205 causes the printer unit 203 to read out the print data of the preceding job from the HDD 209 and print the print data under print process conditions set by a user for the preceding job. After the printer unit 203 starts the print process of the preceding job, the control unit 205 waits for the completion of the print process necessary for the preceding job by the printer unit 203. Upon completion of the print process necessary for the preceding job, the control unit 205 causes the sheet processing apparatus 200 of the print system 1000 to start sheet process A necessary for the preceding job.

At this time, the control unit 205 causes the inline finisher of the print system 1000 that can execute sheet process A, to execute sheet process A requested by the user via the UI unit for sheets bearing the print data of the preceding job. After the inline finisher of the print system 1000 starts sheet process A of the preceding job, the control unit 205 causes the printer unit 203 to start a print process necessary for the succeeding job requiring sheet process B after printing. That is, the control unit 205 causes the printer unit 203 to start the print process necessary for the succeeding job while the inline finisher executes sheet process A of the preceding job. In this way, the control unit 205 controls to parallel-execute the sheet process operation of the preceding job necessary after the print process and the print operation of the succeeding job. The control unit 205 delivers and holds the printed material (final product) of the preceding job having undergone sheet process A at the delivery destination of the inline finisher capable of executing sheet process A. As a result, all the processes of the preceding job are complete. Then, the control unit 205 stores print data of the succeeding job in the HDD 209 in the print process of the succeeding job.

The control unit 205 causes the printer unit 203 to read out the print data of the succeeding job from the HDD 209 and print the print data under print process conditions set by the user for the succeeding job. After the printer unit 203 starts the print process of the succeeding job, the control unit 205 waits for the completion of the print process necessary for the succeeding job by the printer unit 203. Upon completion of the print process necessary for the succeeding job, the control unit 205 causes the sheet processing apparatus 200 of the print system 1000 to start sheet process B necessary for the succeeding job. At this time, the control unit 205 causes the inline finisher of the print system 1000 that can execute sheet process B, to execute sheet process B requested by the user via the UI unit for sheets bearing the print data of the succeeding job. The control unit 205 delivers and holds the printed material (final product) of the succeeding job having undergone sheet process B at the delivery destination of the inline finisher capable of executing sheet process B. As a result, all the processes of the succeeding job are complete.

The above-described series of control operations can execute the following three operations in parallel.

(Operation X) An operation to execute a specific type of sheet process necessary for a preceding job by an inline finisher capable of executing the sheet process necessary for the preceding job after the print process of the preceding job.

(Operation Y) An operation to cause the printer unit 203 to execute a print process necessary for a succeeding job requiring a specific type of sheet process after the print process.

(Operation Z) An operation to execute the specific type of sheet process necessary for the succeeding job by an inline finisher capable of executing the sheet process necessary for the succeeding job after the print process of the succeeding job.

In some cases, operation Z is not executed in parallel with operation X. For example, operation X ends before the end of operation Y as a result of starting operation Y in parallel with operation X. In any case, the control unit 205 starts operation Y in parallel with operation X.

The control unit of the print system 1000 executes the above-described series of control operations when satisfying both conditions 1 and 2.

In other words, when satisfying both conditions 1 and 2, the control unit of the print system 1000 permits execution of operation Y in parallel with operation X, or execution of operations Y and Z in parallel with operation X.

When not satisfying both conditions 1 and 2, the control unit of the print system 1000 inhibits execution of the series of control operations, and executes the following control.

For example, a sheet process necessary after a print process for a succeeding job accepted after a preceding job requiring sheet process A is not sheet process B but the same sheet process A as that of the preceding job (which will be referred to as condition 3 hereinafter). In other words, the preceding job satisfies condition 1, and the succeeding job satisfies not condition 2 but condition 3. In this case, the control unit 205 executes the following control.

For example, the control unit 205 inhibits the printer unit 203 from starting a print process necessary for the succeeding job requiring sheet process A after printing while executing sheet process A necessary for the preceding job. In this case, the control unit 205 waits for the end of the print process and sheet process A of the preceding job. Then, the control unit 205 starts the print process of the succeeding job. After the end of printing the succeeding job, the control unit 205 causes an inline finisher capable of executing sheet process A to execute sheet process A necessary for the succeeding job. By this scheduling, the control unit 205 processes preceding and succeeding jobs.

As described above, when not satisfying both conditions 1 and 2, the control unit of the print system 1000 inhibits execution of operation Y in parallel with operation X, or execution of operation Y and operation Z in parallel with operation X.

The print system 1000 of the embodiment can execute the series of selective control operations. In the series of control operations, the control unit of the print system 1000 executes the following control.

For example, when the print system 1000 comprises one or more inline finishers, an inline finisher which executes a sheet process necessary for a preceding job after a print process is defined as X. This inline finisher will be referred to as finisher X, and this case will be referred to as condition X.

Under condition X, assume that an inline finisher which executes a sheet process necessary for a succeeding job after a print process is not inline finisher X. For example, an inline finisher which executes the sheet process necessary for the succeeding job after the print process is one cascade-connected to the input side of inline finisher X. This inline finisher will be referred to as finisher Y, and this case will be referred to as condition Y.

When satisfying both conditions X and Y, as described above, the control unit 205 causes the printer unit 203 to start the print process of the succeeding job requiring a sheet process by finisher Y after printing while executing a sheet process by finisher X necessary for a preceding job. This control will be explained in the above control example. When satisfying both conditions X and Y, the control unit of the embodiment permits execution of operation Y in parallel with operation X, or execution of operations Y and Z in parallel with operation X.

Assume that both conditions X and Y are not satisfied. For example, an inline finisher which executes a sheet process necessary for a succeeding job after a print process is the same inline finisher X as that of a preceding job. This case will be referred to as condition Z.

In other words, conditions X and Z are satisfied. In this case, the control unit 205 inhibits the printer unit 203 from starting a print process necessary for a succeeding job requiring a sheet process by finisher X after printing while executing a sheet process by finisher X necessary for a preceding job.

In the above control example, when not satisfying both conditions X and Y, the control unit of the embodiment inhibits execution of operation Y in parallel with operation X, or execution of operation Y and operation Z in parallel with operation X.

In this way, the print system 1000 of the embodiment can execute the series of selective control operations.

Various control examples executed by the control unit on the basis of the system configuration information, job rule definition data, and information of a job to be processed illustrated in FIGS. 21A-21C, 26A-26C, 27A, and 27B and the like will be described in more detail by referring to the following control in FIG. 29.

[Description of Flowchart Concerning Job Control Executed by Control Unit When Print System 1000 Processes Jobs]

Among various control examples executed by the control unit of the print system in FIGS. 1 to 28, control concerning how to process a plurality of jobs by the print system 1000 will be explained with reference to the flowchart of FIG. 29.

In the embodiment, the control unit 205 of the print apparatus 100 executes this process. The control unit 205 executes this process by reading out program data for executing the process of the flowchart from the ROM 207 in FIG. 2 which stores computer-readable program data for executing various processes and control examples of the embodiment.

Figure 29:
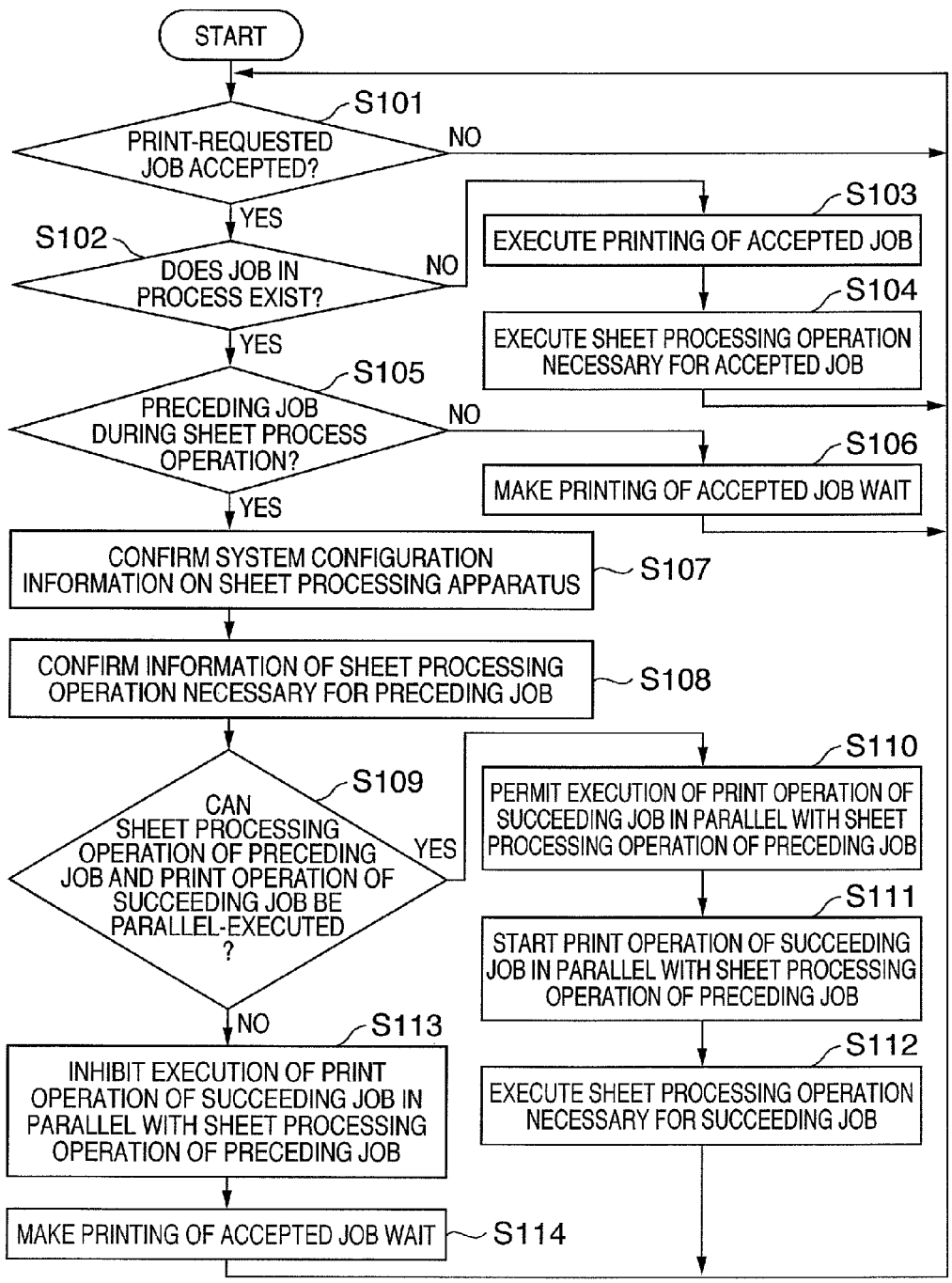
FIG. 29 is a flowchart for explaining a control example for a plurality of jobs to be processed by the print system 1000 to be controlled in the embodiment.

In step S101 of FIG. 29, the control unit 205 confirms whether the print apparatus 100 accepts a job whose print execution request is issued.

For example, the control unit 205 determines, on the basis of a user operation to the start key 503 of the operation unit 204, whether it has received the print execution request from a user via the operation unit 204 of the print apparatus 100 serving as an example of the UI unit in the embodiment. Alternatively, the control unit 205 determines whether it has received the print execution request from the user via the operation unit of an external apparatus serving as another example of the UI unit in the embodiment, as illustrated in FIGS. 17A and 17B.

The control unit 205 stores, in the HDD 209, all print data of a job to be processed that is input via the scanner unit 201 or external I/F unit 202 after issuing the print execution request. The control unit 205 reads out the print data from the HDD 209, and causes the printer unit 203 to print. The control unit 205 stores process condition data of the job in the HDD 209 in correspondence with the print data. The process condition data contains process condition data concerning the sheet size, copy ratio, print layout, single/double-sided print setting, and the like in printing. The process condition data also contains information on a sheet process type for specifying what kind of sheet process is to be executed for sheets of the job to be printed.

The control unit 205 repeats the process in step S101 of FIG. 29 until the print apparatus 100 accepts a job whose print request is issued. In other words, if the print apparatus 100 accepts a job whose print request is issued, the control unit 205 shifts the process from step S101 to step S102 in FIG. 29.

If the print apparatus 100 accepts a job whose print execution request is issued, the control unit 205 confirms in step S102 whether there is a job in process by the print system 1000 including the print apparatus 100, other than the accepted job. For example, the control unit 205 confirms whether there is a job whose print data is stored in the HDD 209, a job during printing by the printer unit 203, a job waiting for printing in the HDD 209, or a job during a sheet process by the sheet processing apparatus 200.

If the control unit 205 confirms in step S102 that there is no job in process, it advances the process from step S102 to step S103. In step S103, the control unit 205 causes the printer unit 203 to execute the print process of print data of the job accepted in step S101 under the process conditions of the job. After causing the printer unit 203 to execute the print process necessary for the job in step S103, the control unit 205 shifts to the process in step S104. In step S104, the control unit 205 causes a sheet processing apparatus specified by the process conditions of the job to execute a sheet process, which is designated by the process conditions of the job and is necessary for the job, for sheets of the job printed in step S103. For example, when the print system 1000 has the system configuration in FIGS. 8A and 8B, the control unit 205 causes the inline sheet processing apparatus 200 to execute the following sheet process. When the sheet process type requested by the job is a stacking process, the control unit 205 causes the large-volume stacker in FIGS. 8A and 8B to stack printed sheets of the job. When the job requests a glue binding process such as a case binding process or pad binding process, the control unit 205 causes the glue binding apparatus in FIGS. 8A and 8B to glue and bind printed sheets of the job. When the job requests a sheet process such as stapling, punching, cutting, shift delivery, saddle stitching, or folding, the control unit 205 causes the saddle stitching apparatus in FIGS. 8A and 8B to execute the sheet process necessary for the job. When the print system 1000 executes various finishing processes, the control unit 205 utilizes system configuration information of the management table illustrated in FIG. 21A-21C, 26A-26C, or 27A and 27B.

If the control unit 205 confirms in step S102 that there is a job in process, it advances the process from step S102 to step S105. In this example, a "job in process" will be referred to as a "preceding job" in correspondence with various control examples described above. That is, if the process shifts to step S105, the target job accepted in step S101 is a "succeeding job".

In step S105, the control unit 205 confirms the current process status of the preceding job in order to specify whether the sheet process operation of the preceding job in process is in execution by the print system 1000. For example, the control unit 205 confirms the data storage operation status of the HDD 209, the print operation status of the printer unit 203, or the sheet conveyance status in the print apparatus and sheet processing apparatuses of the print system 1000. By this method, the control unit 205 confirms whether the sheet process operation of the preceding job is in execution by the sheet processing apparatus of the print system 1000. Further, the control unit 205 checks information of the preceding job for this confirmation. Also, the control unit 205 also checks information from a plurality of sheet sensors arranged at a plurality of portions on the sheet feeding path in the print apparatus of the print system 1000 and the sheet feeding paths in the respective sheet processing apparatuses.

If the current process status of the preceding job represents in step S105 that the sheet process operation is not in execution by the sheet processing apparatus of the print system 1000, the control unit 205 shifts the process from step S105 to step S106. As an example of this situation, when the current process status of the preceding job represents that printing is execution by the printer unit 203 of the print apparatus 100, the control unit 205 shifts the process from step S105 to step S106.

In step S106, the control unit 205 makes wait the print operation of the succeeding job accepted in step S101. In other words, in step S106, the control unit 205 makes the succeeding job wait for printing. More specifically, the control unit 205 holds print data of all pages of the succeeding job in the HDD 209, and makes the succeeding job wait for printing until the process of the preceding job is complete.

If the current process status of the preceding job represents in step S105 that the sheet process operation is in execution by the sheet processing apparatus of the print system 1000, the control unit 205 shifts the process from step S105 to step S107. In this case, for example, the current process status of the preceding job represents that sheets of the preceding job are in process by the sheet processing apparatus 200 after the printer unit 203 performs a print process necessary for the preceding job. When "case binding job A" illustrated in FIG. 19 is a "preceding job" and the print system 1000 has the system configuration in FIGS. 8A and 8B, the above case corresponds to a situation in which a case binding process for sheets of job A is in execution by the gluing unit of the glue binding apparatus in FIGS. 8A and 8B after the printer unit 203 performs the print process of case binding job A. In this situation, the control unit 205 shifts the process from step S105 to S107.

In step S107, the control unit 205 confirms the system configuration information of the print system 1000 containing information on the inline type sheet processing apparatus 200 connected to the print apparatus 100 of the print system 1000. In this example, the control unit 205 confirms the system configuration of the print system 1000 in step S107 by reading out, from the HDD 209, system configuration information of the management table illustrated in FIG. 21A-21C, 26A-26C, or 27A and 27B in the above control examples. For example, when the system has the system configuration in FIGS. 8A and 8B, the control unit 205 confirms (information 1) to (information 5) contained in the system configuration information 2101 of the management data group 2100 in FIGS. 21A-21C that is stored in the HDD 209. Based on these pieces of information, the control unit 205 confirms a system configuration representing how many and what kinds of inline finishers connect to the print apparatus 100 in the print system 1000 having the system configuration in FIGS. 8A and 8B, and also representing their connection order. The remaining description of the system configuration information has been described above, and will be omitted.

After confirming the system configuration of the print system 1000 in step S107, the control unit 205 confirms information of a sheet process operation necessary for the preceding job in step S108.

For example, in step S108, the control unit 205 confirms what kind of sheet process is necessary for the preceding job whose sheet process operation is in execution by the inline sheet processing apparatus of the print system 1000.

In this confirmation, the control unit 205 refers to process condition data of the preceding job that is saved in the HDD 209 together with print data of the preceding job. Based on sheet process setting information contained in the process condition data, the control unit 205 specifies what kind of sheet process is set in the preceding job.

In other words, if the print apparatus 100 accepts the print execution request of the preceding job from the user via the operation unit 204 of the print apparatus 100, the control unit 205 confirms in step S108 what kind of sheet process is set via a display 700 of FIG. 7. If the print apparatus 100 accepts the print execution request of the preceding job from the user via the operation unit of the external apparatus, the control unit 205 confirms in step S108 what kind of sheet process is set via a setting item 1702 in the display of FIG. 17B.

By the same method as the above one, the control unit 205 confirms in step S107 what kind of sheet process is necessary for the succeeding job to be processed.

The control unit 205 confirms in step S108 the sheet process type necessary for the preceding job and that necessary for the succeeding job, and then shifts the process to step S109. In step S109, the control unit 205 confirms whether the print system 1000 can parallel-execute the sheet process operation of the preceding job and the print operation of the succeeding job.

A series of confirmation processes executed by the control unit 205 in steps S107 to S109 corresponds to each control example described using the management table in FIG. 21A-21C, 26A-26C, or 27A and 27B.

For example, when the HDD 209 stores the management data group 2100 in FIGS. 21A-21C, the control unit 205 confirms the system configuration information 2101 of the management data group 2100 in FIGS. 21A-21C in step S107. By confirming the system configuration information 2101 in FIG. 21A, the control unit 205 specifies that the print system 1000 has the system configuration shown in FIGS. 8A and 8B. In step S108, the control unit 205 confirms the job process rule definition information 2102 of the management table in FIGS. 21A-21C. Based on the sheet process type necessary for the preceding job and that necessary for the succeeding job, the control unit 205 specifies which of rules defined by the job process rule definition information 2102 is to be applied. After determining an application rule in the job process rule definition information 2102 of FIGS. 21A-21C, the control unit 205 controls the operation of the succeeding job in the print system 1000 according to the decision of the rule.

If the control unit 205 determines that one of rules 1, 4, 5, 7, 8, and 9 in the job process rule definition information 2102 of FIGS. 21A-21C is applied in the print system 1000 having the system configuration in FIGS. 8A and 8B, it determines NO in step S109. If the control unit 205 determines that one of rules 2, 3, and 6 in the job process rule definition information 2102 of FIGS. 21B and 21C is applied, it determines YES in step S109.

By this method, the control unit 205 performs the processes in steps S107 to S109 even in the control example of FIG(s). 26A-26C or 27A and 27B.

For example, when system configuration information of management data in the HDD 209 is the system configuration information 2601 in FIG. 26A, the control unit 205 determines that the print system 1000 has the system configuration in FIGS. 9A and 9B. If the control unit 205 determines that one of rules 1, 4, 5, 6, 7, and 9 in the job rule definition data 2602 of FIGS. 26A-26C is applied, it determines NO in step S109. If the control unit 205 determines that one of rules 2, 3, and 8 in the job rule definition data 2602 of FIGS. 26B and 26C is applied, it determines YES in step S109.

Alternatively, when system configuration information of management data in the HDD 209 is the system configuration information 2701 in FIG. 27A, the control unit 205 determines that the print system 1000 has the system configuration in FIGS. 10A and 10B. If the control unit 205 determines that one of rules 1, 3, and 4 in the job rule definition data 2702 of FIGS. 27A and 27B is applied, it determines NO in step S109. If the control unit 205 determines that rule 2 in the job rule definition data 2702 of FIG. 27B is applied, it determines YES in step S109.

By this method, the control unit 205 determines in step S109 whether the print system 1000 can parallel-execute the sheet process operation of the preceding job and the print operation of the succeeding job. If NO in step S109 through this confirmation process, the control unit 205 shifts the process from step S109 to step S113.

In step S113, the control unit 205 inhibits the printer unit 203 from executing the print operation of the succeeding job in parallel with the sheet process operation of the preceding job by the inline sheet processing apparatus of the print system 1000. In step S114, the control unit 205 handles the succeeding job as a job waiting for printing. In other words, in step S114, the control unit 205 executes the same process as that in step S106.

If YES in step S109, the control unit 205 shifts the process from step S109 to step S110.

In step S110, the control unit 205 permits the printer unit 203 to execute the print operation of the succeeding job in parallel with the sheet process operation of the preceding job by the inline sheet processing apparatus of the print system 1000. In other words, the control unit 205 permits the printer unit 203 to start the print process of the succeeding job while the inline sheet processing apparatus of the print system 1000 executes the sheet process of the preceding job.

In step S111, the control unit 205 causes the printer unit 203 to actually start the print operation of the succeeding job in parallel with the sheet process operation of the preceding job by the inline sheet processing apparatus of the print system 1000. After the printer unit 203 performs the print process of the succeeding job in step S111, the control unit 205 shifts the process to step S112. In step S112, the control unit 205 causes an inline sheet processing apparatus of the print system 1000 that can execute a sheet process necessary for the succeeding job, to execute the sheet process for printed sheets of the succeeding job.

The control unit 205 can execute the above-described series of processes. More specifically, when the print system 1000 has the system configuration in FIGS. 8A and 8B, the control unit 205 allows the print system 1000 to execute control corresponding to various control examples illustrated in FIGS. 8B and 21A-21C and the like. When the print system 1000 has the system configuration in FIGS. 9A and 9B, the control unit 205 allows the print system 1000 to execute control corresponding to various control examples illustrated in FIGS. 9B and 26A-26C and the like. When the print system 1000 has the system configuration in FIGS. 10A and 10B, the control unit 205 allows the print system 1000 to execute control corresponding to various control examples illustrated in FIGS. 10B, 27A and 27B and the like. The print system 1000 can also adopt a configuration other than system configurations illustrated in FIGS. 8A to 10B. In this case, the control unit 205 executes the process of the flowchart in FIG. 29 according to a rule complying with the system configuration. That is, the process of the flowchart in FIG. 29 is applicable to any system configuration.

The above configuration provides the effects described in the embodiment.

By employing various mechanisms described above, the embodiment can maximize the effects obtained by the print system 1000 of the embodiment. Still another example of this control will be illustrated below.

For example, various control examples include control corresponding to a concrete solution to how to process a plurality of jobs by the print system 1000 using inline finishers unique to the print system 1000 while increasing productivity. This control is also a mechanism capable of fully enhancing the effects even in the POD environment. As described above, the embodiment adopts a mechanism which not only aims at practical use of a product in consideration of only the POD environment, but also pays attention to the office environment. As an example of this mechanism, the print system 1000 can execute the following control.

A series of processes executed in S105 to S114 of the flowchart of FIG. 29, and job control based on the rules of FIGS. 21A-21C, 26A-26C, 27A and 27B can be regarded as control to maximize the productivity of jobs. A mode in which the print system 1000 executes this control is defined as a "high-productivity mode (also called a high-speed mode)". Control to sequentially process jobs A to D in the order in which their print execution requests are accepted from a user is defined as a "normal mode (also called a standard mode)".

On the premise of this configuration, in the following control example, the operator of the print system 1000 can select these two modes via the UI unit provided by the embodiment.

Assume that the user presses the user mode key 505 of the operation unit 204 of the print apparatus 100 serving as an example of the UI unit. In response to this operation, the control unit 205 causes the display unit 401 of the operation unit 204 to execute a display 3000 in FIG. 30. By operating a key 3001 in the display of FIG. 30, the user can determine which of the "standard mode" and "high-speed mode" is used to operate the print system 1000.

For example, the user sets "permit printing of a succeeding job during finishing of a preceding job" to "OFF" by operating the key 3001. In this case, the control unit 205 sets the standard mode as the operation mode of the print system 1000.

When the user selects the standard mode via the display of FIG. 30, as illustrated in FIG. 30, the control unit 205 controls to execute the following process sequence in the flowchart of FIG. 29.

If YES in step S102 of FIG. 29 when the "standard mode" is set, the control unit 205 controls to shift the process not to step S107 but to step S106. That is, if YES in S102, the control unit 205 controls to skip the process in S105 and shift to the process in S106 regardless of whether the sheet process of a preceding job is in execution or not by the inline finisher of the print system 1000.

In other words, the control unit 205 performs the following control in the standard mode even if a sheet process necessary for the preceding job is in execution by the print system and a sheet process necessary for the succeeding job is different from that necessary for the preceding job.

For example, the control unit 205 causes the printer unit 203 to start a print process necessary for the succeeding job upon completion of all processes of the preceding job including a sheet process necessary for the preceding job without executing a print process necessary for the succeeding job by the printer unit 203.

When the "high-speed mode" is set and parallel processes are possible, printing can start ahead of the schedule. This can increase the availability of the print apparatus with high performance.

That is, when the user selects the "high-speed mode" via the display of FIG. 30 executed by the display unit 401 of the operation unit 204, the control unit 205 controls to execute the following process sequence in the flowchart of FIG. 29.

When the "high-speed mode" is set, the control unit 205 must determine whether the sheet process of the preceding job is in execution. For example, if YES in S102, the control unit 205 shifts the process to S107 and subsequent steps.

In other words, the control unit 205 performs the following control when a sheet process necessary for the preceding job is in execution by the print system and a sheet process necessary for the succeeding job is different from that necessary for the preceding job.

For example, the control unit 205 causes the printer unit 203 to start a print process necessary for the succeeding job during execution of a sheet process necessary for the preceding job.

This configuration can build a flexible printing environment coping with the use environment of the system in which the print system 1000 is used in the standard mode in the office environment and the high-speed mode in the POD environment. This configuration can further enhance the effects described in the embodiment.

FIG. 31 shows an example of the timing chart representing the timings when the print system 1000 processes a plurality of jobs in each of the "high-productivity mode (high-speed mode)" and "normal mode (standard mode)".

When the operation mode of the print system 1000 is the "standard mode", the control unit 205 controls the print system 1000 to process jobs A to D at timings in an order represented by the "sequence of the standard mode" in FIG. 31.

When the operation mode of the print system 1000 is the "high-speed mode", the control unit 205 controls the print system 1000 to process jobs A to D at timings in an order represented by the "sequence of the high-speed mode" in FIG. 31.

When the administrator of the print system 1000 requests handling of relatively simple, sequential jobs, the "standard mode" can be selected to meet this need.

In the "sequence of the standard mode" in FIG. 31, "print (printing of a preceding job)"→"post-process (a sheet process by an inline finisher)"→"printing of the next job (printing of a succeeding job)" can be sequentially performed. By utilizing this control, even if a jam or error occurs in the print system 1000, only sheets of one job in process stay in each of the print apparatus 100 and sheet processing apparatus 200. Even a user not skilled in the operation of the print system such as an operator on site in the POD environment can easily recover the print system 1000. In other words, an improper operation or the like by a user unfamiliar with the operation can be prevented.

This configuration can further enhance the effects of the embodiment.

The constituent features described in the embodiment in detail with reference to FIGS. 1 to 31 can provide the following effects.

For example, the embodiment can mitigate problems as mentioned in the Description of the Related Art. Especially, the embodiment can build a convenient printing environment adaptable not only to the office environment but also to the POD environment. The embodiment can provide a mechanism of minimizing intervention work by an operator that may occur in the POD environment due to, e.g., the specifications of a print apparatus. The embodiment can implement efficient work by reducing the work load of the operator. The embodiment can provide a mechanism capable of flexibly coping with various needs from various users as much as possible in consideration of various situations and use environments. The embodiment can minimize problems such as a decrease in productivity of jobs subjected to a print process by the system, and maximize the productivity of jobs when building a convenient, flexible printing environment capable of coping with use cases and user needs in the POD environment. The embodiments can provide various mechanisms for practical use of a product. The embodiments can also deal with the following situation and attain the following effects.

In a print apparatus use case applied in the current office environment, a mechanism is adopted in which the print apparatus processes a plurality of jobs in the order in which it accepts them from a PC or reader. This is because a plurality of users share one print apparatus in the office environment and jobs come from different users at different places in the office. In this situation, if the job process order changes without permission, a user who is to receive the printed material of each job cannot grasp his material. A trouble may occur if a user prints in preference to another user.

On the other hand, in the POD (Print On Demand) environment, a user who directly receives a job processed by the print apparatus is assumed to be an operator engaged in the POD environment. A user who requests printing is a customer, and one who delivers a printed material as a final product to the customer is the operator who gets the fee from the customer and is engaged in the POD environment. In the POD environment, a job client and a user who processes the job by the print system are assumed to be different. In this POD environment, it is important how to efficiently process many jobs by the print system within a time limit based on designation from the client. In other words, in the POD environment, a job accepted by the print system is expected to be under the control of an operator on site in the POD environment where he operates the print apparatus. It does not pose any problem if the operator changes the job order in accordance with the time limits of jobs at his discretion. Change of the job order is more likely to increase the availability of the print apparatus, reduce the total cost by efficient operation, and please the manager who does business in the POD environment.

The print system of the present invention can cope with even this situation by configuring the print system as described in the embodiments. The above-mentioned effects can be further enhanced.

In the future, the POD environment may adopt a configuration in which a post-processing apparatus (inline finisher) directly connects to an image forming apparatus and performs a sequence process depending on the sheet conveyance system and software for the print apparatus. Particularly in the POD environment, a case of connecting various inline finishers may occur to meet various customer needs. That is, the POD environment may employ a sheet processing apparatus (called an inline finisher in the above description) which connects to the print apparatus electrically and physically and can execute different types of sheet processes.

In the future, a variety of inline finishers may appear, or the POD environment may also employ a use method of using inline finishers not by replacing them but by (cascade-) connecting all of them and switching the process in accordance with the job type. In other words, the POD environment may adopt a configuration other than one in which the above-described inline finishers are alternatively selected or sequentially connected in accordance with sheet processes. In the POD environment, for example, a system configuration may become commercially available in which a plurality of inline finishers are cascade-connected to satisfy various customer needs. At the same time, the POD environment may adopt a configuration in which one of sheet processing apparatuses conveys a sheet to a subsequent sheet processing apparatus without any process. In this way, the possibility should be examined that the digital print system suited to the POD environment and the like employs a sheet processing apparatus which executes a sheet process and also supplies sheets from the print apparatus to a subsequent sheet processing apparatus.

The embodiment provides a configuration coping with even the above situation. More specifically, the print system comprises a plurality of sheet processing apparatuses (also called inline finishers in the embodiment) which can execute different sheet processes and are electrically and physically connectable to the print apparatus. On the premise of this system configuration, when these inline finishers are available, the control unit of the system controls the system to process a plurality of jobs using these apparatuses. The control unit controls to change the process order of target jobs from their acceptance order, as described above. In the embodiment, the control unit 205 of the print apparatus 100 executes various control examples illustrated using FIGS. 8B to 10B and the like in the respective system configurations of FIGS. 8A to 10B.

This configuration can improve efficient operation of the printing environment simultaneously using several sheet processing apparatuses, and increase the throughput of jobs when viewed from the overall system. Such job management is executable as efficient operation of the POD environment.

The embodiment can put a product capable of dealing with this situation into practical use. For this purpose, the control unit of the print system executes the control described in the embodiment. The embodiment can satisfy various use cases and needs assumed in the POD environment.

The above-described methods of processing a plurality of target jobs by the print system under the control of the control unit of the print system will be explained again as follows. These methods will be explained in a control example of executing the following job process control by the control unit 205 of the print apparatus 100 as an example of the control unit of the print system 1000.

The print system 1000 of the embodiment controlled by the control unit 205 comprises the print apparatus 100 having the printer unit 203 capable of executing the print process of data in the HDD 209 capable of storing data of jobs, as described above.

The print system 1000 can utilize more than one sheet processing apparatuses each having a sheet processing unit capable of executing a sheet process for sheets of a job printed by the printer unit 203. The print system 1000 can selectively supply sheets from the printer unit to the sheet processing unit of each of the sheet processing apparatuses.

These sheet processing apparatuses used as inline finishers in the print system 1000 execute the sheet processes of their functions for sheets of a job to which execution of sheet processes by these apparatuses is requested. Each sheet processing apparatus has a sheet conveyance function of receiving, from an upstream apparatus, sheets of a job subjected to a sheet process by another sheet processing apparatus downstream in the sheet conveyance direction, and transferring the sheets to the downstream apparatus. Each sheet processing apparatus holds, at its sheet holding unit, the printed material of a job having undergone a sheet process by the sheet processing apparatus, and allows a user to take out the printed material from the holding unit without transferring the printed material to another sheet processing apparatus.

The control unit 205 executes various control examples as illustrated in FIGS. 1 to 3 and 8A to 10B to the print system 1000 having the above system configuration.

The control unit 205 executes the following control in the print system 1000 having these constituent features.

For example, the control unit 205 controls to accept a desired sheet process execution request from the user together with a print execution request via the user interface unit (to be referred to as a UI unit hereinafter) of an external information processing apparatus such as a computer or the UI unit of the print apparatus. The control unit 205 sequentially stores print data (PDL data or scan data) of process-requested jobs from the reader unit or host computer in the hard disk 209 of the print apparatus 100.

On the premise of this configuration, the print system 1000 of the embodiment can accept a plurality of jobs each of which requires a print process by the printer unit of the print apparatus and a sheet process for sheets printed by the print process.

For example, the control unit accept the process request of a given job (to be referred to as job A hereinafter) as an example of jobs. The control unit accepts the process request of another job (to be referred to as job B hereinafter) after job A. In this situation, the control unit 205 controls the printer unit 203 to execute a print process necessary for job B while the print system 1000 executes a sheet process necessary for job A. That is, the control unit 205 executes the following control while the print system 1000 executes a sheet process necessary for job A when the control unit 205 accepts a plurality of jobs including jobs A and B. The control unit 205 permits the printer unit 203 to start a print process necessary for job B in parallel with a sheet process necessary for job A.

To the contrary, the control unit 205 inhibits the printer unit 203 from starting a print process necessary for job B when the control unit 205 accepts a plurality of jobs including jobs A and B and the print system 1000 does not execute a sheet process necessary for job A. An example of this situation is a case in which the printer unit 203 is printing print data of job A stored in the hard disk 209 of the print apparatus 100.

In other words, the print system 1000 comprises sheet processing apparatuses A and B as apparatuses each having a sheet processing unit capable of executing a sheet process for sheets of a job printed by the printer unit 203. In this fashion, the print system 1000 comprises a plurality of sheet processing apparatuses. The print system 1000 can supply sheets from the printer unit to these apparatuses.

In this configuration, the control unit 205 controls the print execution timings of jobs to be processed by the print apparatus 100 including jobs A and B on the basis of information on the sheet processing apparatuses. For example, the control unit 205 executes the following control.

An example of sheet processing apparatus A is the glue binding apparatus in this control example. The glue binding apparatus comprises a glue binding unit capable of executing a case binding process requiring the gluing process of sheets of a job when attaching a cover sheet to a bundle of sheets of the job printed by the printer unit 203 and binding the sheets.

An example of sheet processing apparatus B capable of executing a sheet process different from that by sheet processing apparatus A is the large-volume stacker in this control example. The large-volume stacker comprises a stacking unit capable of stacking many sheets of jobs printed by the printer unit (e.g., a stacking unit capable of stacking 5,000 printed sheets).

In this configuration, the control unit 205 confirms that job A to be processed is a job of a type requiring a case binding process by the case binding unit of sheet processing apparatus A after a print process by the printer unit. A job of the type requiring a case binding process by the case binding apparatus will be referred to as a job of the first type. Further, the control unit 205 confirms that job B accepted after job A is a job of a type requiring a sheet stacking process by the stacking unit of sheet processing apparatus B after a print process by the printer unit 203. A job of the type requiring a sheet stacking process by the large-volume stacker will be referred to as a job of the second type.

In the above case, the control unit 205 controls the print system 1000 to execute a print process necessary for job B by the printer unit 203 before the case binding unit of sheet processing apparatus A completes a case binding process necessary for job A.

In this case, job A to be processed is a job of the first type requiring a sheet process by the sheet processing unit of sheet processing apparatus A after a print process by the printer unit. Also in this case, job B accepted by the print apparatus after job A is a job of the second type requiring a sheet process by the sheet processing unit of sheet processing apparatus B after a print process by the printer unit.

In this case (condition), the control unit permits the printer unit to start a print process necessary for job B before the sheet processing unit of sheet processing apparatus A completes a sheet process necessary for job A.

To the contrary, job A is a job of not the second type but the first type, and job B is a job of not the second type but the first type.

In this case (condition), the control unit inhibits the printer unit from starting a print process necessary for job B before the sheet processing unit of sheet processing apparatus A completes a sheet process necessary for job A.

In the above-described control, the control unit controls the system as follows.

For example, when the print system 1000 can use a plurality of sheet processing apparatuses, the control unit 205 permits the printer unit to execute a print process necessary for job B while the print system executes a sheet process necessary for job A. For example, the control unit 205 executes control illustrated in FIGS. 8A to 10B, 21A-21C, 26A-26C, 27A and 27B.

When the print system 1000 cannot use a plurality of sheet processing apparatuses, the control unit 205 inhibits the printer unit 203 from starting a print process necessary for job B while the print system 1000 executes a sheet process necessary for job A. This case corresponds to a situation in which the number of inline sheet processing apparatuses connected to the print apparatus 100 of the print system 1000 is 0 or 1.

In other words, the control unit 205 controls the print system 1000 as follows in the above-described control.

For example, when the print system 1000 can execute a plurality of types of sheet processes, the control unit 205 permits the printer unit 203 to execute a print process necessary for job B while the print system executes a sheet process necessary for job A. For example, the control unit 205 executes control illustrated in FIGS. 8A to 10B, 21A-21C, 26A-26C, 27A and 27B.

When the print system 1000 cannot execute a plurality of types of sheet processes, the control unit 205 inhibits the printer unit 203 from starting a print process necessary for job B while the print system 1000 executes a sheet process necessary for job A. This case corresponds to a situation in which the print system cannot execute a sheet process of a type designated by a user selectively from nine types of sheet processes in the control example illustrated in FIG. 7, and can execute only one type of sheet process.

Still in other words, the control unit 205 controls the print system 1000 as follows in the above-described control.

When the case binding unit of sheet processing apparatus A is to execute a case binding process necessary for a job printed by the printer unit 203, the print system 1000 can supply sheets bearing print data of the job to the case binding unit via sheet processing apparatus B. That is, a job requiring a stacking process by sheet processing apparatus B neither uses sheet processing apparatus A nor requires a sheet feeding process to sheet processing apparatus A.

The control unit processes this job as follows by reading out, from the HDD, determination information for specifying the apparatus configuration status of the system and referring to the determination information.

Assume that job B to be processed requires not a sheet process by sheet processing apparatus A but a sheet process by sheet processing apparatus B. In this case, the control unit 205 permits the printer unit 203 to execute a print process necessary for job B while the print system 1000 executes a sheet process necessary for job A.

When job B to be processed requires a sheet process by sheet processing apparatus A, the control unit 205 inhibits the printer unit 203 from executing a print process necessary for job B while the system executes a sheet process necessary for job A.

The HDD serving as an example of a nonvolatile memory stores the following types of information as "determination information for specifying the apparatus configuration status of the system" read out and referred to by the control unit.

(1) Sheet processing apparatus connection/non-connection information for specifying whether the system comprises a sheet processing apparatus capable of processing sheets from the print apparatus of the system.

(2) Sheet processing apparatus performance information on a sheet process executable by a sheet processing apparatus when the system comprises the sheet processing apparatus.

(3) Cascade connection status specifying information for specifying the connection order of sheet processing apparatuses when the system comprises a plurality of sheet processing apparatuses.

Together with information of a job to be processed, the control unit 205 uses these types of information as determination information necessary to control a plurality of jobs in the print system 1000. The control unit 205 executes the above control.

The control unit 205 implements this control by the control example illustrated in FIG. 21A-21C, 26A-26C, or 27A and 27B in the configuration described above in the embodiment.

On the premise of this control, the control unit 205 allows the print system 1000 to execute the following control.

For example, the print apparatus 100 accepts a job to be processed in addition to jobs A and B. This job will be referred to as job C. In this situation, when job C satisfies a predetermined condition, the control unit 205 performs the following control while inhibiting execution of the print process of job B.

In this case, the control unit 205 allows the printer unit 203 to execute a print process necessary for job C while the print system executes a sheet process necessary for job A. In this case, job C satisfying the predetermined condition is a "job which requires not a case binding process by the case binding apparatus but a sheet stacking process by sheet processing apparatus B after a print process".

In this control, the control unit 205 of the embodiment uses information in the memory of the print system that stores apparatus configuration information of the print system and information on a sheet process necessary for each of jobs to be processed by the print system.

In other words, in the above control, these pieces of information are necessary to determine whether to execute a print process for job B in parallel with execution of a sheet process necessary for job A. Based on these pieces of information, the control unit 205 controls to permit or inhibit execution of a print process necessary for job B in parallel with execution of a sheet process necessary for job A. Even when inhibiting execution of the print process of job B in parallel with the sheet process of job A, the control unit 205 controls job C on the basis of these pieces of information in the above-described manner.

More specifically, the control unit controls on the basis of these pieces of information to permit or inhibit execution of the print process of job C subsequent to job B by the printer unit during execution of the sheet process of job A.

In this control example, this case corresponds to a situation in which "job C requires not a case binding process by the case binding apparatus but a sheet stacking process by sheet processing apparatus B after a print process". In this case, the control unit permits the printer unit to execute the print process of job C subsequent to job B during execution of the sheet process of job A.

In contrast, assume that the situation does not correspond to the above case. For example, "job C requires not a stacking process by sheet processing apparatus B but a case binding process by the case binding apparatus". In this case, the control unit inhibits the printer unit from executing the print process of job C subsequent to job B during execution of the sheet process of job A.

The control unit executes this control on the basis of information of a preceding job, system configuration information, and the like every time the print apparatus sequentially receives succeeding jobs. In other words, the control unit controls a plurality of jobs as follows.

For example, if job B accepted immediately after job A during binding by the case binding apparatus is a job to the case binding apparatus, printing of job B stands by. In this situation, if job C accepted immediately after job B requires a stacking process by the stacker on the input side of the case binding apparatus, printing of job C starts. If job D accepted immediately after job C is a job to the saddle stitching apparatus on the output side of the case binding apparatus, printing of job D starts after the straight path becomes free.

In this way, the control unit 205 controls to sequentially process succeeding jobs such as jobs C and D before the completion of the case binding process of job A while printing of job B stands by.

Based on information on the progress of a sheet process necessary for a preceding job and information on a sheet process necessary for a succeeding job, the control unit 205 can execute passing printing of a succeeding job while keeping printing of a specific succeeding job waiting during execution of the sheet process of the preceding job. The control unit can execute this control to further enhance the effects.

The above configuration can provide various effects. As described above, the embodiment executes various control examples for handling a plurality of jobs. A configuration capable of executing all these control examples can obtain all effects including the above-mentioned ones. However, the present invention is not limited to a configuration which always executes all these control examples. This is because the apparatus and system of the present invention are superior to those assumed in the prior arts as long as the apparatus and system can execute control concerning at least any job processing method among various control examples of the embodiment. User friendliness can improve to achieve effects. Hence, the present invention includes any configuration capable of executing at least one control among control examples associated with various job processes described in the embodiment.

In addition, the control unit can accept the print execution request of a job to be processed and the execution request of a sheet process necessary for the job from a user via the display unit of the user interface unit of the print apparatus.

The control unit can also accept the print execution request of a job to be processed and the execution request of a sheet process necessary for the job from the user via the display unit of the user interface unit of a computer capable of transmitting data to the print apparatus. The control unit allows the printer unit to execute a print process necessary for a job whose data to be printed is stored in the HDD via the reader unit, in parallel with the sheet process of a preceding job printed prior to the job. The control unit can accept a sheet process execution request via a print setup window displayable on the display unit of a PC in response to a printer driver activation instruction by a user operation to the PC capable of transmitting print data to the print apparatus. The control unit allows the printer unit to execute a print process necessary for a job whose sheet process execution request is issued via the window, in parallel with the sheet process of a preceding job printed prior to the job. As an example of the UI window subjected to display control in the embodiment, a printer driver UI window as shown in FIGS. 17A and 17B is available. By allowing a process by an external job, the use efficiency of the system can further increase, i.e., the effects can be further enhanced.

The control unit 205 controls the sheet processing apparatuses of the print system to execute a plurality of types of sheet processes including at least any of the following sheet processes as sheet processes for sheets of a job printed by the printer unit 203: (1) a stapling process, (2) a punching process, (3) a case binding process, (4) a pad binding process, (5) a saddle stitching process, (6) a large-volume sheet stacking process, and (7) a cutting process. If the sheet processing apparatus can execute other types of sheet processes (a total of nine types of sheet processes including these sheet processes are explained in the above control example) and the control unit 205 can execute the job control, the effects can be further enhanced.

When accepting a standard mode execution request from a user via the UI unit, as described with reference to FIG. 30, the control unit 205 processes jobs A and B as follows.

For example, when a sheet process necessary for job A is in execution by the print system 1000 and a sheet process necessary for job B is different from that necessary for job A, the control unit 205 inhibits the printer unit 203 from executing a print process necessary for job B. After executing the sheet process necessary for job A, the control unit 205 allows the printer unit 203 to execute the print process necessary for job B.

In contrast, when accepting a high-speed mode execution request from the user via the UI unit, like the control example illustrated in FIG. 30, the control unit 205 processes a plurality of jobs including jobs A and B as follows.

For example, when a sheet process necessary for job A is in execution by the print system 1000 and a sheet process necessary for job B is different from that necessary for job A, the control unit 205 causes the printer unit 203 to start the print process of job B in parallel with the sheet process operation of job A during execution of the sheet process of job A.

The control unit 205 executes this selection control in the print system 1000. This implements flexible operation conforming to a use environment such that the high-speed mode is used in the POD environment and the standard mode is used in the office environment. The effects described in the embodiment can be further enhanced.

The control unit 205 also executes the following display control to the UI unit provided by the embodiment.

For example, the control unit 205 executes the following display control when the UI unit displays a list of the process statuses of jobs to be processed by the print system 1000.

For example, for a job whose sheet process is in execution, the user can confirm that the sheet process is in execution. For a job whose print process is in execution, the user can also confirm that the print process is in execution. The control unit 205 controls the UI unit to execute a display representing the process conditions of jobs in this display form. For example, in the previous embodiment, the control unit 205 causes the UI unit to execute each of the displays in FIGS. 19, 20, 22 to 25, and 28 in response to a request from the user.

This configuration can improve the operability of an operator in a printing environment such as the POD environment where it is important to process a plurality of jobs within a short period. That is, this configuration can further enhance the effects described in the embodiment.

The control unit 205 can also execute the following control in processing a plurality of jobs including jobs A and B.

For example, the user can input, via the UI unit, system configuration information which is accepted from the user via the UI unit and is necessary for the control unit 205 to specify the order in which a plurality of sheet processing apparatuses of the print system 1000 connect to the print apparatus. Based on this information, the control unit 205 determines whether to cause the printer unit 203 to execute a print process necessary for job B in parallel with a sheet process necessary for job A, as described above.

The control unit 205 can also execute the following control in processing a plurality of jobs including jobs A and B.

For example, when sheet processing apparatuses connect to the print apparatus 100, the control unit 205 acquires, from the sheet processing apparatuses, system configuration information necessary for the control unit 205 to specify the order in which a plurality of sheet processing apparatuses of the print system 1000 connect to the print apparatus. Based on the information acquired from the sheet processing apparatuses, the control unit 205 determines whether to cause the printer unit 203 to execute a print process necessary for job B in parallel with a sheet process necessary for job A, as described above.

This configuration can further enhance the effects in terms of the operation such that the effects can be attained without generating any malfunction in the system. This configuration can further enhance the effects described in the embodiment.

The control unit 205 can also execute the following control in processing a plurality of jobs including jobs A and B.

As defined in the POD environment 10000 of FIG. 1, an inline type sheet processing apparatus (corresponding to the sheet processing apparatus 200 in FIG. 1) can execute the sheet process of a job printed by the print apparatus 100 in the printing environment 10000. In the printing environment 10000, a near-line type sheet processing apparatus (corresponding to the sheet processing apparatus 107, 108, or 109 in FIG. 1) can execute the sheet process of a job printed by the print apparatus 100. In the printing environment 10000, an offline type sheet processing apparatus (corresponding to the sheet processing apparatus 110 in FIG. 1) can execute the sheet process of a job printed by the print apparatus 100. In this configuration, the control unit 205 performs the following control when both jobs A and B require a sheet process by the inline type sheet processing apparatus. For example, the control unit 205 allows the printer unit 203 to execute a print process necessary for job B in parallel with a sheet process necessary for job A. This configuration can increase the use efficiency of the inline type sheet processing apparatus. This configuration can further enhance the effects described in the embodiment.

The control unit 205 also executes the following control.

In various control examples described above, the control unit 205 uses the following criteria in executing control of jobs A and B.

(Criterion 1) Information of the sheet processing apparatus 200. An example of this information is information used when the control unit 205 specifies whether the print system 1000 comprises the sheet processing apparatus 200. Another example of this information is information used when the control unit 205 specifies the number of sheet processing apparatuses and the types of sheet processes executable by them when the print system 1000 comprises the sheet processing apparatus 200. Still another example of this information is information used when the control unit 205 specifies the order in which a plurality of sheet processing apparatuses connect to the print apparatus 100 when the print system 1000 comprises a plurality of sheet processing apparatuses. The apparatus configuration information of the print system 1000 is criterion 1.

(Criterion 2) Information for specifying a sheet process type necessary for job A.

(Criterion 3) Information for specifying the process status of job A (job progress such as "during storage of data in the HDD 209", "during printing by the printer unit 203", or "during a sheet process by the sheet processing apparatus 200").

(Criterion 4) Information for specifying a sheet process type necessary for job B.

The control unit 205 executes at least either of the following control examples for jobs A and B on the basis of the criterion information.

(Control 1) The control unit 205 inhibits the printer unit 203 from executing a print process necessary for job B during execution of a sheet process necessary for job A.

(Control 2) The control unit 205 permits the printer unit 203 to execute the print process necessary for job B during execution of the sheet process necessary for job A.

On the premise of this configuration, the control unit 205 permits storing, in the HDD 209, print data of all pages of another job (e.g., job C) whose print execution request is accepted after job B, regardless of whether to execute control 1 or 2.

In other words, when executing control 1, the control unit 205 controls the print system 1000 to process jobs A, B, and C as follows.

For example, the control unit 205 causes the printer unit 203 to execute a print process necessary for job B while the sheet processing apparatus 200 executes a sheet process necessary for job A. The control unit 205 stores print data of all pages of job B in the HDD 209. At this time, the control unit 205 stores print data of all pages of job C in the HDD 209.

In this fashion, when executing control 1, the control unit 205 controls the print system 1000 to simultaneously (parallel-) execute (1) sheet process operation of job A, (2) print operation of print data of job B, and (3) print data storage operation of job C.

When executing control 2, the control unit 205 controls the print system 1000 to process jobs A, B, and C as follows.

For example, the control unit 205 inhibits the printer unit 203 from executing a print process necessary for job B while the sheet processing apparatus 200 executes a sheet process necessary for job A. The control unit 205 stores print data of all pages of job B in the HDD 209. The control unit 205 properly stores print data of all pages of job C in the HDD 209.

In this way, when executing control 2, the control unit 205 controls the print system 1000 to simultaneously (parallel-) execute (1) sheet process operation of job A and (2) print data storage operation of job C without executing print operation of print data of job B.

The control unit 205 properly executes the print process of job C after the printer unit 203 completes the print process of job B. Also at this time, the control unit 205 executes the same control as that described above for jobs B and C.

In other words, the control unit 205 permits the printer unit 203 to start a print process necessary for job C while the sheet processing apparatus 200 executes a sheet process necessary for job B. Alternatively, the control unit 205 inhibits the printer unit 203 from starting a print process necessary for job C while the sheet processing apparatus 200 executes a sheet process necessary for job B. As criteria used at this time, the control unit 205 uses the following criteria in addition to criterion 1.

(Criterion A) Information for specifying a sheet process type necessary for job B.

(Criterion B) Information for specifying the process status of job B (job progress such as "during storage of data in the HDD 209", "during printing by the printer unit 203", or "during a sheet process by the sheet processing apparatus 200").

(Criterion C) Information for specifying a sheet process type necessary for job C.

The control unit 205 executes the above control, as needed, every time the print apparatus 100 accepts a new job for which a print execution request and sheet process execution request are issued. This can minimize the time taken to complete all the processes of jobs, further increase the productivity of jobs, and further enhance the effects.

An application of the above control also implements the following control.

Assume that job A requires a large-volume sheet stacking process by the large-volume stacker when the print system 1000 has the system configuration in FIGS. 8A and 8B. Job B requires a glue binding process by the glue binding apparatus. The order in which the print execution requests of these jobs are accepted is job A→job B. That is, the control unit 205 stores print data of job A in the HDD 209, and then stores print data of job B in the HDD 209. Jobs A and B require a print process. Further, assume that the printer unit 203 is printing a job other than jobs A and B when accepting the print execution requests of the print processes of jobs A and B. In this case, the control unit 205 makes printing of jobs A and B stand by in the HDD 209.

In this situation, to process jobs A and B in the order named upon completion of the preceding job, the control unit 205 inhibits the printer unit 203 from executing the print process of job B during a large-volume sheet stacking process necessary for job A after the print process of the job A. The control unit 205 executes this control because a sheet processing apparatus to execute a sheet process necessary for job B exists on the input side of an apparatus to execute a sheet process necessary for job A. This control example complies with rule 8 in FIGS. 18A to 18D.

Even in this situation, the control unit 205 may execute the following control instead of the above control.

For example, the control unit 205 changes the print order of jobs A and B by the printer unit 203. That is, the control unit 205 changes the print order from "job A→job B" into "job B→job A". The control unit 205 controls the printer unit 203 to execute a print process necessary for job A while the case binding apparatus executes a case binding process necessary for job B. The control unit 205 executes this control because printing of another job is in execution and printing of jobs A and B has not started in this situation. If the print order changes at this timing, the control unit 205 need not inhibit execution of the print process of a succeeding job during the sheet process of a preceding job. By changing the process order of jobs waiting for printing, the control unit 205 controls to execute the print process of a succeeding job during the sheet process of a preceding job. The above-described control is adoptable by utilizing a situation in which a plurality of jobs wait for printing because of the presence of another print job, and changing the process order of jobs in this situation. This can maximize the period during which the sheet process operation of a preceding job and the print operation of a succeeding job can be parallel-executed, without suspending the process because jobs A and B are processed in the order named. That is, the effects can be further enhanced. The above configuration makes the following control executable.

For example, when the print system comprises three or more sheet processing apparatuses, as illustrated in FIGS. 8A, 8B, 9A, and 9B and the like, a sheet process operation is executed which is necessary for a job (to be referred to as job X hereinafter) requiring a sheet process executable by a sheet processing apparatus at the most downstream position in the system. During this operation, a sheet process operation is executed which is necessary for a job (to be referred to as job Y hereinafter) requiring a sheet process executable by a sheet processing apparatus at the second downstream position in the system. During this operation, the printer unit 203 executes a print process necessary for a job (to be referred to as job Z hereinafter) requiring a sheet process executable by a sheet processing apparatus at the third downstream position in the system. The control unit controls the print system 1000 to simultaneously (parallel-) execute these two types of sheet process operations and the print operation, i.e., a total of three operations.

In executing this control, the control unit performs the following control when the print system 1000 has the system configuration in FIGS. 8A and 8B.

For example, the control unit 205 causes the saddle stitching apparatus to execute a saddle stitching process necessary for job X requiring the saddle stitching process by the saddle stitching apparatus corresponding to the third sheet processing apparatus in the system of FIGS. 8A and 8B. During this operation, the control unit 205 causes the case binding apparatus to execute a case binding process necessary for job Y requiring the case binding process by the case binding apparatus corresponding to the second sheet processing apparatus in the system of FIGS. 8A and 8B. During this operation, the control unit 205 causes the printer unit 203 to start a print process necessary for job Z requiring a sheet process by the large-volume stacker corresponding to the third sheet processing apparatus in the system of FIGS. 8A and 8B. The control unit 205 controls the system to parallel-execute the three operations in the system configuration of FIGS. 8A and 8B.

In executing this control, the control unit performs the following control when the print system 1000 has the system configuration in FIGS. 9A and 9B.

For example, the control unit 205 causes the saddle stitching apparatus to execute a saddle stitching process necessary for job X requiring the saddle stitching process by the saddle stitching apparatus corresponding to the third sheet processing apparatus in the system of FIGS. 9A and 9B. During this operation, the control unit 205 causes the large-volume stacker to execute a sheet stacking process necessary for job Y requiring the sheet stacking process by the large-volume stacker corresponding to the second sheet processing apparatus in the system of FIGS. 9A and 9B. During this operation, the control unit 205 causes the printer unit 203 to start a print process necessary for job Z requiring a case binding process by the case binding apparatus corresponding to the third sheet processing apparatus in the system of FIGS. 9A and 9B. The control unit 205 controls the system to parallel-execute the three operations in the system configuration of FIGS. 9A and 9B.

In various control examples illustrated in FIGS. 8A to 10B, a plurality of inline finishers are sheet processing apparatuses which execute different types of sheet processes. However, the embodiment is not limited to this. For example, the system may be configured by cascade-connecting two large-volume stackers to the print apparatus 100. The embodiment permits a system configuration of connecting a plurality of inline type sheet processing apparatuses capable of executing the same type of sheet process, as an example of the system configuration of the print system 1000. Even in this configuration, the control example illustrated in FIG. 29 and the like is executable. For example, a preceding job requires a sheet process by a sheet processing apparatus (to be referred to as a sheet processing apparatus 200b according to FIG. 3 and the like) connected second to the print apparatus 100 when counted from the upstream side in the sheet conveyance direction. A succeeding job requires a sheet process by a sheet processing apparatus (to be referred to as a sheet processing apparatus 200a according to FIG. 3 and the like) connected first to the print apparatus 100 when counted from the upstream side in the sheet conveyance direction. In this case, after the printer unit 203 executes a print process necessary for the preceding job, the sheet process of the preceding job is in execution by the sheet processing apparatus 200b. The control unit 205 permits the printer unit 203 to start a print process for the succeeding job requiring a sheet process by the sheet processing apparatus 200a while the sheet processing apparatus 200b executes the sheet process operation of the preceding job. This can provide the above-described effects even to a POD company requiring the print system 1000 having a system configuration of cascade-connecting a plurality of inline finishers capable of executing the same sheet process.

Since the print system 1000 can execute various control examples, the effects of the embodiment can be further enhanced. In the embodiment, the print apparatus 100 incorporates the control unit 205 which executes various control examples described in the embodiment with reference to FIGS. 1 to 31. Alternatively, the print system 1000 may be configured such that a control unit incorporated in an apparatus (e.g., the inline finisher or PC 103) other than the print apparatus 100 executes all or some of control examples disclosed in the embodiment which are executed by the control unit 205.

The print system 1000 capable of executing control illustrated in FIGS. 1 to 31 comprises various mechanisms for obtaining the effects intended by the embodiment.

Other Embodiments

A host computer (e.g., the PC 103 or 104) may use an externally installed program to achieve the functions shown in the drawings in the embodiment. In this case, data for displaying the same operation windows as those described in the embodiment including operation windows are externally installed to provide various user interface windows on the display unit of the host computer. This process is described with reference to the configuration based on the UI windows of FIGS. 17A and 17B. In this configuration, the present invention is also applicable to a case in which an output apparatus receives a set of information including a program from a storage medium such as a CD-ROM, flash memory, or FD, or from an external storage medium via a network.

As described above, the object of the present invention is also achieved by supplying a storage medium which records software program codes for implementing the functions of the above-described embodiment to a system or apparatus, and reading out and executing the program codes stored in the storage medium by the computer (CPU or MPU) of the system or apparatus.

In this case, the program codes read out from the storage medium implement new functions of the present invention, and the storage medium which stores the program codes constitutes the present invention.

The program form is arbitrary such as an object code, a program executed by an interpreter, or script data supplied to an OS as long as a program function is attained.

The storage medium for supplying the program includes a flexible disk, hard disk, optical disk, magneto-optical disk, MO, CD-ROM, CD-R, CD-RW, magnetic tape, nonvolatile memory card, ROM, and DVD.

In this case, the program code read out from the storage medium implements the functions of the above-described embodiment, and the storage medium which stores the program codes constitutes the present invention.

As another program supply method, the program can be supplied by connecting a client computer to an Internet homepage via the browser of the client computer, and downloading the computer program of the present invention or a compressed file containing an automatic installing function from the homepage to a recording medium such as a hard disk. The program can also be implemented by grouping program codes which form the program of the present invention into a plurality of files, and downloading the files from different homepages. That is, claims of the present invention also incorporate a WWW server, FTP server, and the like which prompt a plurality of users to download the program files for implementing functional processes of the present invention by a computer.

The program of the present invention can be encrypted, stored in a storage medium such as a CD-ROM, and distributed to a user. A user who satisfies predetermined conditions is prompted to download decryption key information from a homepage via the Internet. The user executes the encrypted program using the key information, and installs the program in the computer.

The functions of the above-described embodiment are implemented when the computer executes the readout program codes. Also, the functions of the above-described embodiment are implemented when an OS (Operating System) or the like running on the computer performs some or all of actual processes on the basis of the instructions of the program codes.

The functions of the above-described embodiment are also implemented when the program codes read out from the storage medium are written in the memory of a function expansion board inserted into the computer or the memory of a function expansion unit connected to the computer, and the CPU of the function expansion board or function expansion unit performs some or all of actual processes on the basis of the instructions of the program codes.

The present invention may be applied to a system including a plurality of devices or an apparatus formed by a single device. The present invention can also be achieved by supplying a program to the system or apparatus. In this case, the system or apparatus can obtain the effects of the present invention by proving, to the system or apparatus, a storage medium which stores a program represented by software for achieving the present invention.

The present invention is not limited to the above embodiments, and various modifications (including organic combinations of embodiments) can be made without departing from the scope of the invention, and are not excluded from the scope of the invention.

Various examples and embodiments of the present invention have been described. It is apparent to those skilled in the art that the scope of the invention is not limited to a specific description in the specification, but is defined by the following claims.

The scope of the following claims is to be accorded the broadest interpretation so as to encompass all such equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-013090, filed Jan. 20, 2006 and No. 2006-331142 filed Dec. 7, 2006, which are hereby incorporated by reference herein in their entirety.

What is claimed is:

1. A print system comprising:
   a printing apparatus that stores data of a plurality of jobs and executes a printing process of a job among the plurality of jobs, which include a first job and a second job; and
   a first sheet processing apparatus connected to the printing apparatus and that executes a first type of sheet process for a sheet conveyed from the printing apparatus;
   a second sheet processing apparatus connected to the first sheet processing apparatus and that executes a second type of sheet process for a sheet conveyed from the first sheet processing apparatus; and
   a controller unit that permits, in a case where the second job requires the first sheet processing apparatus to execute the first type of sheet process, the printing apparatus to execute the printing process of the second job while the second sheet processing apparatus is executing the second type of sheet process for the first job, and that inhibits, in a case where the second job requires the second sheet processing apparatus to execute the second type of sheet process, the printing apparatus from executing the printing process of the second job while the first sheet processing apparatus is executing the first type of sheet process for the first job.

2. The system according to claim 1, wherein the controller unit inhibits the printing unit from executing the printing process of the second job when the first sheet processing apparatus is not executing the first type of sheet process for the first job.

3. The system according to claim 1, wherein the controller unit controls, on the basis of information on the first and second sheet processing apparatuses, print execution timings of the plurality of jobs, including the first and second jobs, to be processed by the printing apparatus.

4. The system according to claim 1, wherein the controller unit inhibits, in a case where the second job requires the first sheet processing apparatus to execute the first type of sheet process, the printing apparatus from executing the printing process of the second job while the first sheet processing apparatus is executing the first type of sheet process for the first job.

5. The system according to claim 1, wherein:
   the first sheet processing apparatus is a stacking unit that stacks a plurality of sheets for a job,
   the second sheet processing apparatus is a glue binding unit that executes a glue binding process that binds a bundle of sheets for a job,
   the controller unit allows the printing apparatus to execute the printing process of the second job before the glue binding unit completes the second type of sheet processing for the first job when the first job requires the glue binding unit to execute the second type of sheet process, and the second job requires the stacking unit to execute the first type of sheet process.

6. The system according to claim 1, wherein:
   the controller unit inhibits, in a case where the second job requires the second sheet processing apparatus to execute the second type of sheet process, the printing apparatus from executing the printing process of the second job while the second sheet processing apparatus is executing the second type of sheet process for the first job.

7. The system according to claim 1, wherein when a third job, which follows the second job, satisfies a predetermined condition, the controller unit allows the printing apparatus to execute a printing process of the third job while the first sheet processing apparatus is executing the first type of sheet process for the first job, and while inhibiting the printing unit apparatus from executing the printing process of the second job.

8. The system according to claim 1, wherein the controller unit permits execution of the printing process of the second job in parallel with execution of a sheet process for the first job, on the basis of information containing at least one of apparatus configuration information of the print system or information on a sheet process for each of the plurality of jobs to be processed, and is necessary to determine whether to execute the printing process of the second job in parallel with the execution of the sheet process for the first job.

9. The system according to claim 1, wherein:
the printing apparatus has a user interface unit with a display,
the controller unit is configured to accept a print execution request of a job and an execution request of a sheet process for a job from a user via the display of the user interface unit.

10. The system according to claim 1, wherein the controller unit is configured to accept a print execution request of a job and an execution request of a sheet process for a job from a user via a display of a user interface unit of a computer connectable to the printing apparatus.

11. The system according to claim 1, wherein the controller unit is configured to allow the printing apparatus to execute a printing process of a next job whose data to be printed is stored in the printing apparatus via a document reading unit, in parallel with a sheet process for a sheet output by executing a prior job prior to the next job.

12. The system according to claim 1, wherein the controller unit is configured to allow the printing apparatus to execute a printing process of one job with a sheet process execution request issued via a print setup window displayable on a display unit of a host computer in response to a printer driver activation instruction by a user operation to the host computer connectable to the printing apparatus, in parallel with a sheet process of a sheet conveyed by the print apparatus prior to the one job.

13. The system according to claim 1, further comprising a plurality of additional sheet processing apparatuses configured to receive a sheet output from the printing apparatus and that execute a plurality of types of sheet processes, including at least one of a stapling process, a punching process, a case binding process, a pad binding process, a saddle stitching process, a large-volume sheet stacking process, or a cutting process as a sheet process for a sheet printed by the printing apparatus.

14. The system according to claim 1, further comprising:
a user interface unit for receiving instructions from a user,
wherein the controller unit is configured to allow the printing apparatus to execute the printing process of the second job, after executing a sheet process for the first job while without causing the printing apparatus to execute the printing process of the second job when a specific request is received from the user via the user interface unit.

15. The system according to claim 1, further comprising:
a user interface unit for displaying a list of process statuses of a plurality of jobs to be processed,
wherein the controller unit causes the user interface unit to execute a display representing process conditions of the plurality of jobs in a display form of allowing a user to confirm, for a job whose sheet process is in execution, that the sheet processing is in execution, and for a job whose printing process is in execution, that the printing process is in execution.

16. The system according to claim 1, further comprising:
a user interface unit for receiving instructions from a user,
a plurality of sheet processing apparatuses connected to the printing apparatus,
wherein the controller unit is configured to determine whether to cause the printing apparatus to execute the printing process of the second job in parallel with a sheet process for the first job, on the basis of system configuration information received from the user via the user interface unit and is necessary to specify an order in which the plurality of sheet processing apparatuses are arranged in relation to the printing apparatus.

17. The system according to claim 1, further comprising:
a plurality of sheet processing apparatuses connected to the printing apparatus,
wherein the controller unit is configured to determine whether to cause the printing apparatuses to execute the printing process of the second job in parallel with a sheet process for the first job, on the basis of system configuration information acquired from the plurality of sheet processing apparatuses connected to the printing apparatus, and is necessary to specify an order in which the plurality of sheet processing apparatuses are arranged in relation to the printing apparatus.

18. The system according to claim 1, further comprising a plurality of sheet processing apparatuses, including an inline type configured to receive sheets from the printing apparatus without any intervention from an operator, and a near-line type and an offline type both configured to receive sheets from the printing apparatus with an assistance from the operator, connected to the printing apparatus.

19. The system according to claim 1, wherein the controller unit is configured to allow the printing apparatuses to store print data of a third job, which follows the second job, regardless of whether the printing apparatus is executing the printing process of the first or second job.

20. The system according to claim 1, wherein the controller unit allows changing of a print order of the first and second jobs when the controller unit inhibits the execution of the printing process of the second job while the first sheet processing unit is executing the first type of sheet process for the first job.

21. The system according to claim 1, further comprising:
a third sheet processing apparatus connected to the second sheet processing apparatus,
wherein the controller unit concurrently allows the printing apparatus to execute a printing process of a third job, which follows the second job, while the first sheet processing apparatus is executing the first type of sheet processing for the first job and the second sheet processing apparatus is executing the second type of sheet processing for the second job.

22. The system according to claim 1, wherein the first sheet processing apparatus is configured to convey a sheet from the printing apparatus to the second sheet processing apparatus.

23. The system according to claim 1, wherein the first sheet processing apparatus is configured to convey a sheet from the printing apparatus to the second sheet processing apparatus via a sheet conveying path of the first sheet processing apparatus.

24. A job processing method for a print system comprising a printing apparatus that stores data of a plurality of jobs and executes a printing process of a job among the plurality of jobs, which includes a first job and a second job following the first job, a first sheet processing apparatus connected to the printing apparatus and that executes a first type of sheet process for a sheet conveyed from the printing apparatus, a second sheet processing apparatus connected to the first sheet processing apparatus and that executes a second type of sheet process for a sheet conveyed from the first sheet processing apparatus, and a controller, the method comprising the step of:

permitting with the controller, in a case where the second job requires the first type of sheet process by the first sheet processing apparatus, the printing apparatus to execute the printing process of the second job while the second sheet processing apparatus is executing the second type of sheet process for the first job, and inhibiting by the controller, in a case where the second job requires to execute the second type of sheet process by the second sheet processing apparatus, the printing apparatus from executing the printing process of the second job while the first sheet processing apparatus is executing the first type of sheet process for the first job.

25. A non-transitory computer-readable storage medium storing a computer program that causes a computer to perform the method claimed in claim 24.

26. A printing apparatus connectable to a first sheet processing apparatus capable of executing a first type of sheet process for a sheet conveyed from the printing apparatus, wherein the first sheet processing apparatus is connectable to a second sheet processing apparatus capable of executing a second type of sheet process for a sheet conveyed from the first sheet processing apparatus, the printing apparatus comprising:

a storage unit that stores data of a plurality of jobs; and a controller unit that executes a printing process of a job among the plurality of jobs, the plurality of jobs including a first job and a second job following the first job, wherein the controller unit permits, in a case where the second job requires the first sheet processing apparatus to execute the first type of sheet process, the printing apparatus to execute the printing process of the second job while the second sheet processing apparatus is executing the second type of sheet process for the first job, and inhibits, in a case where the second job requires the second sheet processing apparatus to execute the second type of sheet process, the printing apparatus from executing the printing process of the second job while the first sheet processing apparatus is executing the first type of sheet process for the first job.

* * * * *